United States Patent
Kojima et al.

(10) Patent No.: US 6,425,961 B1
(45) Date of Patent: Jul. 30, 2002

(54) COMPOSITE HARD MAGNETIC MATERIAL AND METHOD FOR PRODUCING THE SAME

(75) Inventors: Akinori Kojima; Akihiro Makino; Yutaka Yamamoto, all of Niigata-ken (JP); Akihisa Inoue, 11-806 Kawauchijutaku, 35 Motohasekura, Kawauchi, Aoba-ku, Sendai-shi, Miyagi-ken (JP)

(73) Assignees: Alps Electric Co., Ltd., Tokyo; Akihisa Inoue, Miyagi-Ken, both of (JP)

( * ) Notice: Subject to any disclaimer, the term of this patent is extended or adjusted under 35 U.S.C. 154(b) by 0 days.

(21) Appl. No.: 09/312,576

(22) Filed: May 14, 1999

(30) Foreign Application Priority Data

May 15, 1998 (JP) ............................ 10-134034
Nov. 17, 1998 (JP) ............................ 10-344930

(51) Int. Cl.[7] .......................... H01F 1/053; H01F 1/057
(52) U.S. Cl. ......................... 148/302; 75/244
(58) Field of Search ............... 148/302; 252/62.54, 252/62.55; 75/244

(56) References Cited

U.S. PATENT DOCUMENTS 5,049,208 A    9/1991  Yajima et al.
5,482,575 A  * 1/1996  Barzsi et al. ............... 148/302
5,725,792 A    3/1998  Panchanathan
6,004,407 A  * 12/1999 Kojima et al. ............... 148/302

FOREIGN PATENT DOCUMENTS

| EP | 0 772 211 A | 5/1997 |
| JP | 61-170004 | 7/1986 |
| JP | 2-22803 | 1/1990 |
| JP | 2-109304 | 4/1990 |
| JP | 9-143641 | 6/1997 |
| JP | 9-316565 | 12/1997 |
| WO | WO 90/08593 | 8/1990 |
| WO | WO 92/15995 | 9/1992 |

* cited by examiner

Primary Examiner—John Sheehan
(74) Attorney, Agent, or Firm—Brinks Hofer Gilson & Lione

(57) ABSTRACT

The present invention provides a method for producing a composite hard magnetic material, wherein a composite powder—prepared by mixing; a composite hard magnetic material produced by consolidating a composite powder prepared by mixing an alloy powder having an amorphous phase containing a main component Co and at least Sm, and an alloy powder comprising an amorphous phase as a principal phase and containing at least Fe and/or Co, rare earth elements R and B; an alloy powder having an amorphous phase containing a main component Co and at least Sm; and an alloy powder having an amorphous phase containing at least Fe and/or Co, rare earth elements R and B—is consolidated by taking advantage of softening phenomenon caused by crystallization of the amorphous phase in the alloy powder comprising an amorphous phase as a principal phase.

31 Claims, 41 Drawing Sheets

H=0    12    11

H=0    12    11

Fe86Nb2Pr7B5
1023K

COMPOSITE HARD MAGNETIC MATERIAL AND METHOD FOR PRODUCING THE SAME

BACKGROUND OF THE INVENTION

1. Field of the Invention

The present invention relates to a composite hard magnetic material provided with excellent magnetization and temperature characteristics as well as good magnetic characteristics, and a method for producing the same.

2. Description of the Related Art

While a Sm—Co system sintered magnet, Fe—Nd—B system sintered magnet and Fe—Nd—B system sintered magnet have been known in the art as magnetic materials having good performance superior to ferrite magnets, many researches are now under way aiming at novel alloy magnets such as a Fe—Sm—N system magnet having improved performance.

However, these magnetic materials require 10 atomic percentage (referred to at % hereinafter) or more of Nd or 8 at % or more of Sm to be contained, rendering a higher production cost than ferrite magnets owing to their higher content of expensive rare earth elements.

Although the ferrite magnets is more cheaply produced than these rare earth magnets, magnetic characteristics of the former have not been satisfactory, facilitating a demand for developing inexpensive magnetic materials that exhibit superior hard magnetism to the ferrite magnets.

For solving the problems as described above, the inventors of the present invention have invented hard magnetic materials (nano-composite Fe—M—B system magnets), as disclosed in Japanese Unexamined Patent Publication No.9-143641, that can be produced with low cost and have excellent hard magnetic characteristics containing one or more of elements among Fe, Co and Ni as main component as well as elements R comprising one or a plurality of rare earth elements, elements M comprising one or a plurality of Zr, Nb, Ta and Hf, and boron B, wherein 50% or more, preferably 60% or more, of the texture is composed of a fine crystalline phase with a mean crystal grain size of 100 nm or less with a balance of amorphous phases, the fine crystalline being mainly composed of bcc-Fe, Fe—B compounds including solid solution elements and/or $Fe_{14}R_2B_1$ (R represents one or more elements among rare earth elements).

The inventors of the present invention have also invented hard magnetic materials (nano-composite Sm—Co system magnets), as hard magnetic materials provided with excellent hard magnetic characteristics disclosed in Japanese Examined Patent Publication No. 9-332134, having an amorphous phase and a fine crystalline phase containing Co as a main component as well as at least one or a plurality of elements Q among P, C, Si and B; Sm; one or a plurality of elements M among Nb, Zr, Ta and Hf; one or a plurality of elements R among Sc, Y, La, Ce, Pr, Nd, Pm, Eu, Gd, Tb, Dy, Ho, Er, Tm, Yb and Lu; and one or a plurality of elements X among Al, Ge, Ga, Cu, Ag, Pt and Au.

The nano-composite Fe—M—B system magnet as described above is an inexpensive magnet that have large remanent magnetization (Ir) and good magnetization characteristics besides having superior corrosion resistance to conventional Nd—Fe—B magnets. However, the magnet has so small coercive force (iHc) of about 2 to 5 kOe that permeance coefficient is largely decreased when coercive force is decreased at high temperature. Accordingly, when the magnet is used for a constituting material of a sensor such as a throttle position sensor (an angle sensor) that is usually used at high a temperature, the sensor output tends to drift because magnetization is varied due to temperature changes.

While the coercive force (iHc) is large, temperature change of magnetization characteristics is small and corrosion resistance is good in the nano-composite Sm—Co magnets, their remnant magnetization (Ir) as well as remanence ratio are so unsatisfactory that they can not be used for the constituting materials of the foregoing sensor that requires high magnetization characteristics, along with being high cost owing to their high content of expensive rare earth elements as in the Fe—Nd—B system sintered magnets.

SUMMARY OF THE INVENTION

Accordingly, the object of the present invention for solving the problems as hitherto described is to provide a hard magnetic material that contains relatively a small amount of expensive rare earth elements and has excellent magnetization and temperature characteristics as well as good hard magnetic characteristics, and a method for producing the same.

For the purpose of providing a hard magnetic material containing relatively a small amount of expensive rare earth elements and has excellent magnetization and temperature characteristics as well as good hard magnetic characteristics and a method for producing the same, the nano-composite Fe—M—B system magnets and nano-composite Sm—Co system magnets are especially noticed. It have been therefore presumed through collective studies and considerations that the foregoing problems would be solved by producing the hard magnetic materials using both of nano-composite Fe—M—B system hard magnetic powders and nano-composite Sm—Co system hard magnetic powders.

Usually, when a hard magnetic material is produced by mixing two kinds of hard magnetic powders having different compositions with each other, steps representing the characteristics of the two kinds of hard magnetic powders are thought to be formed in the B-H loop of this hard magnetic material. Accordingly, a B-H loop without any steps can not be obtained when a hard magnetic material is produced using two kinds of the hard magnetic powders having different compositions with each other, rendering a difficulty in obtaining a hard magnetic material having an averaged characteristics between one hard magnetic powder and the other hard magnetic powder. Therefore, no production methods of the hard magnetic material using both of the nano-composite Fe—M—B system and nano-composite Sm—Co system hard magnetic powders have not yet been established, thereby the foregoing assumption have never been proved nor applied for practical uses.

It was made clear, through further studies and considerations for completing the present invention, that a composite hard magnetic material, containing relatively a small amount of expensive rare earth elements and have excellent magnetization and temperature characteristics along with being provided with good hard magnetic characteristics without any steps in the B-H loop could be obtained by mixing, followed by consolidating, an alloy powder comprising an amorphous phase as a principal phase and containing at least Co and Sm, and an alloy powder comprising an amorphous phase as a principal phase and containing at least Fe and/or Co, rare earth elements R and B.

Accordingly, the object of the present invention is to provide a composite hard magnetic material, wherein a composite powder prepared by mixing an alloy powder comprising an amorphous phase as a principal phase and containing at least Co and Sm, and an alloy powder comprising an amorphous phase as a principal phase and containing at least Fe and/or Co, rare earth elements R and B are mixed and consolidated.

Preferably, the composite powder is consolidated by taking advantage of a phenomenon occurred when the phase in the alloy powder comprising an amorphous phase as a principal phase is crystallized.

In the composite hard magnetic material according to the present invention, a hard magnetic powder containing a main component Co and at least Sm and comprising a fine crystalline phase as a principal phase with a mean crystal grain size of 100 nm or less, and a hard magnetic powder containing at least Fe and/or Co, rare earth elements R, and B and comprising a fine crystalline phase as a principal phase with a mean crystal grain size of 100 nm or less are mixed and consolidated.

It is preferable that the composite hard magnetic material according to the present invention has a remnant magnetization (Ir) of 0.6T or more, the ratio between saturation magnetization (Is) and remnant magnetization (Ir) of 0.6T or more and coercive force (iHc) of 2 to 9 kOe.

According to the composite hard magnetic material of the present invention as hitherto described, the alloy powder comprising an amorphous phase as a principal phase and containing at least Co and Sm, or the hard magnetic powder containing a main component Co and at least Sm and comprising a fine crystalline phase as a principal phase with a mean crystal grain size of 100 or less is represented by the following composition formula:

$$(Co_{1-f}T_f)_{100-x-y-z-t}M_xSm_yR_zQ_t$$

wherein T denotes one or two elements of Fe and Ni; M denotes one or a plurality of elements among Nb, Zr, Ta and Hf; R denotes one or a plurality of elements among Sc, Y, La, Ce, Pr, Nd, Pm, Eu, Gd, Tb, Dy, Ho, Er, Tm, Yb and Lu; and Q denotes one or a plurality of elements among P, C, Si and B; f being in the range of $0 \leq f < 0.5$, x being in the range of $0 \leq x \leq 4$, y being in the range of $8 \leq y \leq 16$, z being in the range of $0 \leq z \leq 5$, t being in the range of $0.5 \leq t \leq 10$ and x+y+z being in the range of $8 \leq x+y+z \leq 16$ in at %, respectively.

According to the composite hard magnetic material of the present invention as hitherto described, the alloy powder comprising an amorphous phase as a principal phase and containing at least Co and Sm, or the hard magnetic powder containing a main component Co and at least Sm and comprising a fine crystalline phase as a principal phase with a mean crystal grain size of 100 or less is represented by the following composition formula:

$$(Co_{1-f}T_f)_{100-x-y-z-t-u}M_xSm_yR_zQ_tX_u$$

wherein T denotes one or two elements of Fe and Ni; M denotes one or a plurality of elements among Nb, Zr, Ta and Hf; R denotes one or a plurality of elements among Sc, Y, La, Ce, Pr, Nd, Pm, Eu, Gd, Tb, Dy, Ho, Er, Tm, Yb and Lu; Q denotes one or a plurality of elements among P, C, Si and B; and X denotes one or a plurality of elements among Al, Ge, Ga, Ag, Pt and Au; f being in the range of $0 \leq f < 0.5$, x being in the range of $0 \leq x \leq 4$, y being in the range of $8 \leq y \leq 16$, z being in the range of $0 \leq z \leq 5$, t being in the range of $0.5 \leq t \leq 10$, u being in the range of $0 \leq u \leq 5$ and x+y+z being in the range of $8 \leq x+y+z \leq 16$ in at %, respectively.

In the composite hard magnetic material according to the present invention as hitherto described, f representing the composition ratio of the powder above is in the range of $0.2 \leq f < 0.5$ in at %.

Also, the composite hard magnetic material as hitherto described essentially contains Nb.

The composite hard magnetic material as hitherto described at least contains an alloy powder comprising an amorphous phase a principal phase and containing at least Fe and/or Co, rare earth elements R, and B, or Fe and/or Co, rare earth elements R and B;

the hard magnetic powder having a fine crystalline phase as a principal phase with a mean particle size of 100 nm or less being represented by the following composition formula:

$$T_gM_hR_jB_k$$

wherein T represents one or more elements essentially consisting of Fe or Co among Fe, Co and Ni; M represents one or more elements among Zr, Nb, Ta, Hf, Ti, V, Mo and W; R represents one or more elements among rare earth elements; and B represents boron; g, h, j and k indicating composition ratios are in the range of $50 \leq g$, $0 \leq h \leq 15$, $3 \leq j \leq 20$ and $2 \leq k \leq 20$ in at %, respectively.

Also, g, h, j and k indicating the composition ratios in the composition formula of the powder above are in the range of $80 \leq g \leq 93$, $0.5 \leq h \leq 5$, $3 \leq j \leq 10$ and $3 \leq k \leq 7$ in the composite hard magnetic material as hitherto described.

Further, g, h, j and k indicating the composition ratios in the composition formula of the powder above are in the range of $86 \leq g \leq 93$, $0.5 < h \leq 3$, $3 \leq j \leq 7$ and $3 \leq k \leq 5$ in the composite hard magnetic material as hitherto described.

The composite hard magnetic material as hitherto described at least contains an alloy powder comprising an amorphous phase as a principal phase and containing at least Fe and/or Co, rare earth elements R, and B, or Fe and/or Co, rare earth elements R and B;

the hard magnetic powder having a fine crystalline phase as a principal phase with a mean particle size of 100 nm or less being represented by the following composition formula:

$$T_gM_hR_jB_kE_m$$

wherein T represents one or more elements essentially consisting of Fe or Co among Fe, Co and NI; M represents one or more elements among Zr, Nb, Ta, Hf, Ti, V, Mo and W; R represents one or more elements among rare earth elements; B represents boron; and E represents one or more elements among Cr, Al, Pt, Ru, Rh, Pd, Os, Ir, Cu, Ag, Au, Sc, Zn, Sn, Re and Mn; g, h, j, k and m indicating composition ratios are in the range of $50 \leq g$, $0 \leq h \leq 15$, $3 \leq j \leq 20$, $2 \leq k \leq 20$ and $0 \leq m \leq 10$ in at %, respectively.

Also, g, h, j, k and m indicating composition ratios in the composition formula of the powder above are in the range of $80 \leq g \leq 93$, $0.5 \leq h \leq 5$, $3 \leq j \leq 10$, $3 \leq k \leq 7$ and $m \leq 5$ in at %, respectively, in the composite hard magnetic material according to the present invention as hither to described.

Further, g, h, j, k and m indicating composition ratios in the composition formula of the powder above are in the range of $86 \leq g \leq 93$, $0.5 \leq h \leq 3$, $3 \leq j \leq 7$, $3 \leq k \leq 5$ and $0.1 \leq m \leq 5$ in at %, respectively, in the composite hard magnetic material according to the present invention as hither to described.

The composite hard magnetic material according to the present invention as hitherto described at least contains an alloy powder comprising an amorphous phase as a principal phase and containing at least Fe and/or Co, rare earth elements R, and B, or Fe and/or Co, rare earth elements R and B;

the hard magnetic powder having a fine crystalline phase as a principal phase with a mean particle size of 100 nm or less being represented by the following composition formula:

$$T_g M_h R_j B_k G_n$$

wherein T represents one or more elements essentially consisting of Fe or Co among Fe, Co and NI; M represents one or more elements among Zr, Nb, Ta, Hf, Ti, V, Mo and W; R represents one or more elements among rare earth elements; B represents boron; and G represents one or more elements among C, Ga, Ge, P, Sb, In, B and As; g, h, J, k and n indicating composition ratios are in the range of $50 \leq g$, $0 \leq h \leq 15$, $3 \leq j \leq 20$, $2 \leq k \leq 20$ and $0 \leq n \leq 10$ in at %, respectively.

Also, g, h, j, k and n indicating composition ratios in the composition formula of the powder above are in the range of $80 \leq g \leq 93$, $0.5 \leq h \leq 5$, $3 \leq j \leq 10$, $3 \leq k \leq 7$ and $n \leq 5$ in at %, respectively, in the composite hard magnetic material according to the present invention as hitherto described.

Further, g, h, j, k and n indicating composition ratios in the composition formula of the powder above are in the range of $86 \leq g \leq 93$, $0.5 \leq h \leq 3$, $3 \leq j \leq 7$, $3 \leq k \leq 5$ and $0.1 \leq n \leq 5$ in at %, respectively, in the composite hard magnetic material according to the present invention as hitherto described.

The composite hard magnetic material according to the present invention as hitherto described at least contains an alloy powder comprising an amorphous phase as a principal phase and containing at least Fe and/or Co, rare earth elements R, and B, or Fe and/or Co, rare earth elements R and B;

the hard magnetic powder having a fine crystalline phase as a principal phase with a mean particle size of 100 nm or less being represented by the following composition formula:

$$T_g M_h R_j B_k E_m G_n$$

wherein T represents one or more elements essentially consisting of Fe or Co among Fe, Co and NI; M represents one or more elements among Zr, Nb, Ta, Hf, Ti, V, Mo and W; R represents one or more elements among rare earth elements; B represents boron; E represents one or more elements among Cr, Al, Pt, Ru, Rh, Pd, Os, Ir, Cu, Ag, Au, Sc, Zn, Sn, Re and Mn and G represents one or more elements among C, Ga, Ge, P, Sb, In, B and As; g, h, j, k, m and n indicating composition ratios are in the range of $50 \leq g$, $0 \leq h \leq 15$, $3 \leq j \leq 20$, $2 \leq k \leq 20$, $0 \leq m \leq 10$ and $0 \leq n \leq 10$ in at %, respectively.

Also, in the composite hard magnetic material according to the present invention as hitherto described, g, h, j, k, m and n indicating the composition ratios in the composition formula of the powder above are in the range of $80 \leq g \leq 93$, $0.5 \leq h \leq 5$, $3 \leq j \leq 10$, $3 \leq k \leq 7$, $m \leq 5$ and $n \leq 5$ in at %, respectively.

Further, g, h, j, k, m and n indicating the composition ratios in the composition formula of the powder above are in the range of $86 \leq g \leq 93$, $0.5 \leq h \leq 3$, $3 \leq j \leq 7$, $3 \leq k \leq 5$, $0.1 \leq m \leq 5$ and $0.1 \leq n \leq 5$ in at %, respectively in the composite hard magnetic material according to the present invention as hitherto described.

The composite hard magnetic material according to the present invention as hitherto described comprises a Fe phase of the bcc structure (body-centered cubic structure) or a FeCo phase of the bcc structure or a bcc phase containing both of these phases, a $R_2 Fe_{14} B$ phase (R represents one or more elements among rare earth elements), a SmCo phase and a balance of an amorphous phase, one or more of the crystalline phases among the crystalline phases comprising fine crystalline phases with a mean crystal grain size of 100 nm or less.

The composite hard magnetic material according to the present invention having any of the constructions as described above is preferably magnetized along the direction parallel to the pressure impressing direction when the composite powder is consolidated.

The composite hard magnetic material according to the present invention has a rate of temperature change of magnetization at a permeance coefficient of 1 to 10 of $-0.04\%/°$ C. or less in the temperature range from room temperature through 120° C.

In the composite hard magnetic material according to the present invention having any of the construction as described above, the alloy powder comprising an amorphous phase as a principal phase and containing at least Co and Sm, and the alloy powder having an amorphous phase as a principal phase and containing at least Fe and/or Co, rare earth elements R and B are mixed in a proportion of 5:95 to 80:20 in the composite powder.

In the composite hard magnetic material according to the present invention having any of the construction as described above, the alloy powder comprising an amorphous phase as a principal phase and containing at least Co and Sm, and the alloy powder comprising an amorphous phase as a principal phase and containing at least Fe and/or Co, rare earth elements R and B, are preferably mixed in a proportion of 1:1 in the composite powder.

In the steps comprising; mixing an alloy powder comprising an amorphous phase as a principal phase and containing a main component Co and at least Sm, and an alloy powder comprising an amorphous phase as a principal phase and containing at least Fe and/or Co, rare earth elements R and B; and consolidating the composite powder, the composite powder is consolidated by taking advantage of a softening phenomenon occurred by crystallization of the amorphous phase in the alloy powder comprising an amorphous phase as a principal phase.

In the method for producing a composite hard magnetic material according to the present invention as hitherto described, the composite hard magnetic material is magnetized along the direction parallel to the pressure impressing direction during or after consolidating the composite powder.

In the method for producing a composite hard magnetic material according to the present invention, a hard magnetic powder containing a main component Co and at least Sm and comprising a fine crystalline phase as a principal phase with a mean crystal grain size of 100 nm or less, a hard magnetic powder containing at least Fe and/or Co, rare earth elements R and B and comprising a fine crystalline phase as a principal phase with a mean crystal grain size of 100 nm or less, and a resin are mixed and consolidated.

It is preferable in the method for producing the composite hard magnetic material according to the present invention as hitherto described that the composite magnetic material is magnetized along the direction parallel to the pressure impressing direction during or after consolidating the composite powder.

DESCRIPTION OF THE PREFERRED EMBODIMENT

Figure 1:
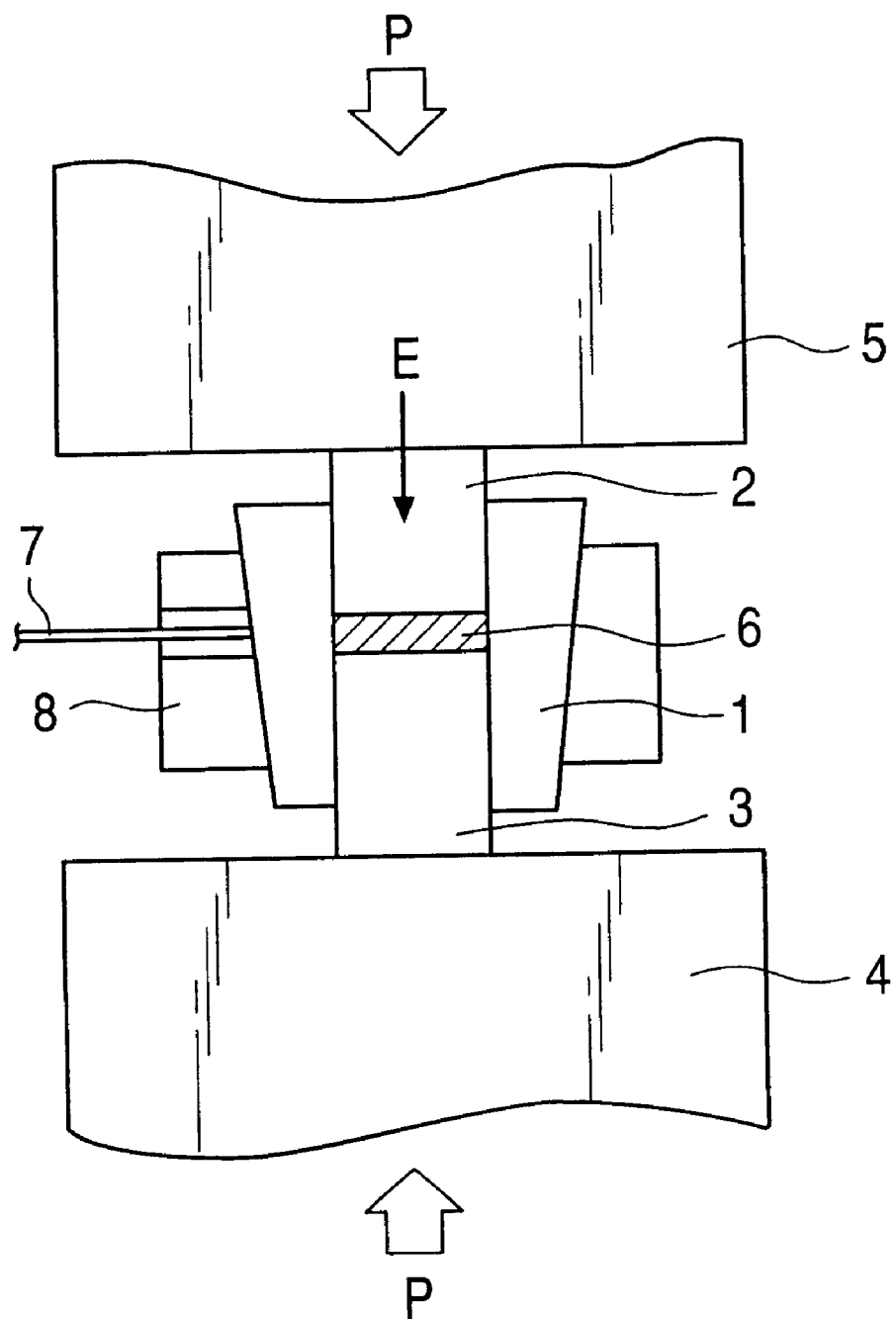
FIG. 1 is a cross section showing one example of the structure of the main part of the spark plasma sintering apparatus used for producing a bulk of the composite hard magnetic material according to the present invention.

The composite hard magnetic material and the method for producing the same will be described hereinafter.

The composite hard magnetic material according to the present invention is produced by consolidating a composite powder prepared by mixing an alloy powder comprising an amorphous phase as a principal phase and containing at least Co and Sm (a first alloy powder having an amorphous phase as a principal phase), and an alloy powder comprising an amorphous phase as a principal phase and at least containing Fe and/or Co, rare earth elements R and B (a second alloy powder comprising an amorphous phase as a principal phase).

It is preferable to use an alloy powder comprising an amorphous phase as a principal phase and containing Co as a main component, one or a plurality of elements Q among P, C, Si and B, and Sm. It is also preferable to use a first alloy powder comprising an amorphous phase as a principal phase and containing Co as a main component as well as one or a plurality of elements Q among P, C, Si and B; Sm; one or a plurality of elements M among Nb, Zr, Ta and Hf; one or a plurality of elements R among Sc, Y, La, Ce, Pr, Nd, Pm, Eu, Gd, Tb, Dy, Ho, Er, Tm, Yb and Lu; and one or a plurality of elements X among Al, Ge, Ga, Ag, Pt and Au.

The second alloy powder comprising an amorphous phase as a principal phase includes Fe, Co or FeCo based powders containing 4 to 20 at % of the elements R comprising one or more of rare earth elements (Sc, Y, La, Ce, Pr, Nd, Pm, Sm, Eu, Gd, Tb, Dy, Ho, Er, Tm, Yb and Lu), the alloy powder made to be a texture containing amorphous phases by quenching being preferably used.

It is preferable for obtaining a composite hard magnetic material with a high density (a high relative density) that the composite hard magnetic material is consolidated by taking advantage of a softening phenomenon occurred during a crystallization reaction of the amorphous phase in the first and/or second alloy powder comprising an amorphous phase as a principal phase.

Fine crystalline phases are preferably precipitated in the amorphous phases by subjecting the bulk material formed by consolidating the composite powder to heat treatment in the composite hard magnetic material according to the present invention.

The composite hard magnetic material in which fine crystalline phases have precipitated in the amorphous phases comprises a Fe phase with a bcc structure (body-centered cubic structure), a FeCo phase with a bcc structure or a bcc phase containing both phases; a $R_2Fe_{14}B$ phase (R denotes one or more elements among rare earth elements) such as a $Nd_2Fe_{14}B$ phase; a SmCo phase; and a balance of amorphous phases, one or more crystalline phases among the phases described above comprising fine crystalline phases with a mean crystal grain size of 100 nm or less.

The composite hard magnetic material according to the present invention forms a nano-texture of composite phases comprising the fine crystalline phases and a balance of amorphous phases.

A mixed phase between a Fe phase of the bcc structure, a FeCo phase of the bcc structure or a soft magnetic phase comprising the bcc phases containing these two phases, and a hard magnetic phase comprising a $R_2Fe_{14}B$ phase and $Co_{17}Sm_2$ phase is formed in the texture in the composite hard magnetic material according to the present invention.

It is preferable for obtaining excellent hard magnetic characteristics that the composite hard magnetic material according to the present invention is used by magnetizing along the direction parallel to the consolidation pressure impressing direction for consolidation depending on its application field.

A first alloy powder (powder material) comprising an amorphous phase as a principal phase and a second alloy powder (powder material) comprising an amorphous phase as a principal phase are firstly prepared for practically producing such composite hard magnetic material.

The alloy powders comprising these amorphous phases as principal phases are produced by the steps of obtaining a ribbon or powder alloy comprising an amorphous phase as a principal phase by quenching a molten alloy, and crashing the ribbon of the alloy, if any, into a powder.

The particle size of the alloy powder obtained comprising an amorphous phase as a principal phase is preferably in the range of 30 to 150 $\mu$m, more preferably 50 to 100 $\mu$m. When the particle size of the alloy powder is larger than 150 $\mu$m, fluidity of the powder becomes so poor that a high density magnet can not be obtained after consolidation while, when the particle size is less than 35 $\mu$m, the alloy may be oxidized when crashing it into a powder or foreign substances such as a part of the inner wall of the mill or crashing blade may be mingled with the alloy powder.

The method for obtaining an alloy powder comprising an amorphous phase as a principal phase from the consolidated alloy comprises; forming a ribbon by spraying the melt onto a rotating drum to quench the liquid; spouting the molten liquid into a chilling gas to quench droplets of the liquid into a powder, or a sputtering method or CVD method. The alloy powder comprising an amorphous phase as a principal phase to be used in the present invention may be produced by any of these methods described above.

The ribbon or powder of the alloy is composed of a texture comprising an amorphous phase.

Then, the first alloy powder comprising an amorphous phase as a principal phase and the second amorphous powder obtained as described above are mixed to form a composite powder, which is subjected to a stress to crystallize the amorphous phases in the first and/or second alloy powder comprising an amorphous phase as a principal phase, or grains of fine crystalline phases in the powder are allowed to grow, followed by compacting. Consequently, a Fe phase with the bcc structure (body-centered cubic structure), a FeCo phase with the bcc structure or a bcc phase containing these two phases, and a $R_2Fe_{14}B$ phase and $Sm_2Co_{17}$ phase are precipitated in the amorphous phase, these crystalline phases having a mean crystal grain size of 100 nm or less.

It is preferable to heat the powder to a temperature above the crystallization temperature of the amorphous phase as a principal phase of the first and/or second alloy under a uniaxial pressure, in order to allow the composite powder to crystallize or to allow the grains to grow under a stress.

The composite powder is preferably compacted by taking advantage of a softening phenomenon occurring in the crystallization reaction for consolidation. The powder is consolidated by taking advantage of the softening phenomenon during the crystallization reaction in compacting the composite powder, because softening phenomenon becomes evident when the powder is heated at the crystallization temperature of the amorphous phase as a principal phase in the alloy containing the amorphous phase, or at a temperature prior to crystallization. Once such softening phenomenon has taken place, the alloy powder comprising an amorphous phase as a principal phase is compacted under a pressure to be a monolithic body, thus enabling to obtain a high density bulk material of the composite hard magnetic material by consolidating the alloy comprising this softened amorphous phase as a principal phase.

When the powder is consolidated by heat-pressing, it is preferable to use an alloy containing at least 50% by weight or more of the amorphous phase as an alloy powder comprising an amorphous phase as a principal phase, because grains in the alloy powder are tightly bound with each other along with enabling to obtain a permanent magnet having high hard magnetic characteristics.

The heating rate is 3 K/min (3° C./min) or more, preferably 10 K/min (10° C./min). When the heating rate is less than 3 K/min, the exchange coupling force is weakened due to coarsening of the crystal grains, being not preferable since hard magnetic characteristics are deteriorated.

The heating temperature is adjusted in the range of 400 to 800° C. A heating temperature of below 300° C. is not preferable because too low temperature makes it impossible to obtain a high density composite hard magnetic material. A heating temperature of more than 800° C. is also not preferable since crystal grains in the fine crystalline phase are grown to deteriorate hard magnetic characteristics.

The heating time is in the range of zero minute or more to 15 minute or less, preferably zero minute or more and five minutes or less. The heating time of exceeding 15 minutes is not preferable since crystal grains in the fine crystalline phase are grown to deteriorate hard magnetic characteristics.

Examples of the method for consolidating the alloy powder include spark plasma sintering method and hot-pressing method.

A fine crystalline phase with a mean crystal grain size of 100 nm or less is allowed to precipitate in the texture in the composite hard magnetic material according to the present invention, by heat treating the powder at a temperature range of 400 to 1000° C. simultaneously with or subsequent to compacting after allowing the composite powder to crystallize or after allowing grains in the powder to grow under a stress. The hard magnetic characteristics appear by the treatments described above. A heat treatment temperature (annealing temperature) of less than 400° C. is not preferable because sufficient hard magnetic characteristics can not be obtained owing to a few amount of the precipitated $R_2Fe_{14}B$ phase that is responsible for hard magnetism. A heat treatment temperature of more than 1000° C. is also not preferable since crystal grains in the fine crystalline phase are grown to deteriorate the hard magnetic characteristics.

The heat treatment time is zero minute or more and 15 minutes or less, more preferably zero minute or more and five minute or less. a heat treatment time of more than 15 minutes is not preferable because crystal grains in the fine crystalline phase are grown to deteriorate the hard magnetic characteristics.

A condition to allow the crystalline phase with a mean crystal grain size of 100 nm or less to occupy 50% by volume or more of the texture is selected, along with allowing the Fe phase with the bcc structure (body-centered cubic structure), the FeCo phase with the bcc structure or the soft magnetic phase comprising the bcc phase containing both of these phases, and the hard magnetic phase containing at least the $R_2Fe_{14}B$ phase or $R_2Co_{17}$ phase to be formed, thereby enabling to obtain the composite hard magnetic material with good hard magnetic characteristics.

It is preferable to use the composite hard magnetic material according to the present invention magnetized along the direction parallel to the pressure impressing direction for consolidating the composite powder.

The composite hard magnetic material according to the present invention contains Co as a main component as well as at least Sm, along with containing a hard magnetic powder (the first hard magnetic powder) having a fine crystalline phase with a mean crystal grain size of 100 nm or less as a main phase, Fe and/or Co, rare earth elements R and B. which may be consolidated by mixing a hard magnetic powder (the second hard magnetic powder) comprising a fine crystalline phase as a principal phase with a mean crystal grain size of 100 nm or less and a resin. The hard magnetic material is preferably consolidated in a magnetic field to endow it with anisotropy.

The first and second hard magnetic powders are at first produced in the method for producing these composite hard magnetic materials. These hard magnetic powders are obtained by the steps of; obtaining an alloy comprising an amorphous phase as a principal phase in a ribbon or powder configuration by quenching a molten alloy; applying a heat treatment at 400 to 1000° C. to the ribbon or powder of the alloy to express hard magnetic characteristics; and crushing the ribbon of the alloy, if any, into a powder. The method for obtaining an alloy comprising an amorphous phase as a principal phase from the melt is similar to the foregoing method for producing the alloy powder comprising an amorphous phase as a principal phase.

Then, after preparing a slurry by dispersing the first and second hard magnetic powders thus obtained into a resin solution dissolved in an organic solvent, the slurry is kneaded by repeatedly passing through three rolls. The resins to be used herein may be a resin having small loss such as, for example, polypropylene, polyethylene, polystyrene, paraffin, polytetrafluoroethylene, polycarbonate and silicone resin. The solvent for solving this resin is, for example, xylene, toluene and benzene.

Although the proportion of addition of the hard magnetic powder into the resin is variable depending on the characteristics of the composite hard magnetic material in concern, it is preferable to add the powder into the slurry so as to be 50 to 90% by volume. When the ratio of the hard magnetic powder is less than 50% by volume, the hard magnetic characteristics becomes poor while, when the ratio exceeds 90% by volume, it becomes difficult to consolidate the powder by injection molding.

In the next step, the organic solvent is evaporated by heating the kneaded product in a drier, followed by consolidating into a desired shape using a press-molding machine, an injection molding machine or an extruder to obtain a desired molded body of the composite hard magnetic material.

The preferable composite hard magnetic material is prepared by adjusting the mixing ratio between the first alloy powder comprising an amorphous phase as a principal phase and the second alloy powder comprising an amorphous phase as a principal phase, or between the first and second hard magnetic powders, thereby obtaining remnant magnetization (Ir) of 0.6T or more and the ratio between saturation magnetization ($I_s$) and remnant magnetization (remanence ratio) of 0.6 or more, as well as coercive force (iHc) of 2 to 9 kOe. Saturation magnetization ($I_s$) was obtained by measuring magnetization curve under an impressed magnetic field of 5 T, which is approximately equal to saturation magnetization (Is). Accordingly, $I_s$ and Is to be described hereinafter is defined as $I_s \sim Is$.

When remnant magnetization (Ir) is less than 0.6 t, the remanence ratio becomes too low that the magnetic characteristics becomes poor, reducing sensor output when the material is used for the component of an angle sensor.

Coercive force (iHc) of less than 2 kOe is not preferable since hard magnetic characteristics becomes too poor while, when it exceeds 9 kOe, magnetization becomes difficult due to too large coercive force when the material is used for the angle sensor, making it difficult to from a multipolar magnet.

Although the mixing ratio between the first alloy powder comprising an amorphous phase as a principal phase and the second alloy powder comprising an amorphous phase as a principal phase, or between the first hard magnetic powder and the second hard magnetic powder, is variable depending on the characteristics of the desired composite hard magnetic material, the production cost can be saved by reducing the proportion of the first alloy powder comprising an amorphous phase as a principal phase or the first hard magnetic powder. Coercive force and temperature characteristics are improved, on the other hand, as the proportion of the first alloy powder comprising an amorphous phase as a principal phase or the first hard magnetic powder is increased, while magnetization characteristics are improved as the proportion of the second alloy powder comprising an amorphous phase as a principal phase or the second hard magnetic powder is increased, although coercive force and corrosion resistance are deteriorated. The preferable mixing ratio (weight ratio), when the composite hard magnetic material according to the present invention is used for an angle sensor to be used at high temperatures, is expressed by the relation of [(the first alloy powder comprising an amorphous phase as a principal phase): (second amorphous powder)=(5 to 80):(95 to 20)], preferably (10 to 50):(90 to 50) and more preferably 1:1. The preferable mixing ratio between the first and second hard magnetic powders are also approximately the same as the proportion between the first or second alloy powders comprising an amorphous phase as a principal phase.

The mixing ratio of 1:1 in weight ratio between the first alloy powder comprising an amorphous phase as a principal phase and the second alloy powder comprising an amorphous phase as a principal phase is preferable in obtaining a useful magnet for the magnetic sensor provided with excellent magnetization characteristics and temperature characteristics as well as good hard magnetic characteristics for use at high temperatures, while suppressing the content of the expensive rare earth elements along with diminishing the production cost.

The composite hard magnetic material according to the present invention is provided with excellent magnetization characteristics and temperature characteristics as well as good hard magnetic characteristics, because a composite powder prepared by mixing the first and second alloy powders comprising amorphous phases as principal phases is used, or the first hard magnetic powder and the second magnetic powder are used. Therefore, the material is useful as a permanent magnet to be used for sensors such as a throttle position sensor (angle sensor) used at high temperatures.

It is also preferable for the composite hard magnetic material according to the present invention that the rate of temperature change of magnetization at a permeance coefficient of one to 10 is −0.04%/° C. in the temperature range of room temperature to 120° C. In other words, the rate of temperature change is more improved than in the hard magnetic materials composed of the second amorphous powder or the second hard magnetic powder in the permeance coefficient range of 10 or less. A permeance coefficient of one or less is not preferable since coercive force becomes low.

Adding the first amorphous powder into the second amorphous powder, or adding the first hard magnetic powder into the second hard magnetic powder, allows excellent temperature characteristics that can not be attained by merely using the second alloy powder comprising an amorphous phase as a principal phase or the second hard magnetic powder to be obtained. Also, the amount of use of expensive rare earth elements and Co is saved as compared with the case when the hard magnetic material is merely composed of the first alloy powder comprising an amorphous phase as a principal phase or the first hard magnetic powder that contains a large amount of expansive rare earth elements.

The composite powder as described above is consolidated by taking advantage of the softening phenomenon occurred when the amorphous phase in the alloy powder comprising an amorphous phase as a principal phase is crystallized, thereby making it possible to obtain a bulk of the composite hard magnetic material according to the present invention.

The bulk or consolidated body comprising the composite hard magnetic material according to the present invention can be consolidated into various shapes by molding the powder.

The first alloy powder comprising an amorphous phase as a principal phase or the first hard magnetic powder in the composite hard magnetic material according to the present invention is represented by the following formula:

$(Co_{1-f}T_f)_{100-x-y-z-t}M_xSm_yR_zQ_t$ wherein T denotes one or a plurality of elements of Fe and Ni; M denotes one or a plurality of elements among Nb, Zr, Ta and Hf; R denotes one or more of elements (excluding Sm) among Sc, Y, La, Ce, Pr, Nd, Pm, Eu, Gd, Tb, Dy, Ho, Er, Tm, Yb and Lu; and Q denotes one or a plurality of elements among P, C, Si and B, f being represented by $0 \leq f \leq 0.5$, x being represented by $0 \leq x \leq 4$, y being represented by $8 \leq y \leq 16$, z being represented by $0 \leq z \leq 5$, t being represented by $0.5 \leq t \leq 10$ and x+y+z being represented by $8 \leq x+y+z \leq 16$ in at %, respectively.

Co is an essential element responsible for endowing the composite hard magnetic material according to the present invention with hard magnetic characteristics. At least one phase among $R_2M_{17}$ phase as a hard magnetic phase, a bcc-Fe phase as a soft magnetic phase, a bcc-(FeCo) phase or a $Sm_3Co_{20}B$ phase containing solid solution atoms is precipitated when the amorphous phase containing Co and rare earth elements R (one or a plurality of elements among Sc, Y, La, Ce, Pr, Md, Pm, Eu, Gd, Tb, Dy, Ho, Er, Tm, Yb, Lu and Sm) is heat-treated at an appropriate temperature in the range of 400 to 900° C. TM as used herein represents one or a plurality of transition elements, being especially preferable to be Fe and Co.

T in the foregoing formula represents one or two elements of Fe and Ni. While these elements T has an effect for increasing remnant magnetization (Ir), coercive force (iHc) is lowered by decreasing the concentration of Co when the concentration of the element T is increased by replacing Co. Accordingly, the element T is added when a composite hard magnetic material having high saturation magnetization (Is) is required and the element T is not added when a composite hard magnetic material having high coercive force (iHc) is required, thereby allowing a composite hard magnetic material provided with appropriate hard magnetic characteristics to be produced corresponding to the application fields of the composite hard magnetic material. Also, substituting expensive Co with cheap Fe and Ni allows the production cost of the composite hard magnetic material to be reduced.

The symbol f indicating the composition ratio of the element T is preferably in the range of zero or more and less than 0.5, more preferably 0.2 or more and less than 0.5 in order to display good hard magnetic characteristics.

Sm is also an essential element in the composite hard magnetic material according to the present invention that is responsible for endowing with hard magnetic characteristics, which is also an element that is liable to form amorphous phases. A hard magnetic phase of $Sm_2Co_{17}$ phase, and a soft magnetic phase of a BCC-Fe phase, a bcc-(FeCo) phase or a $Sm_3Co_{20}$ phase containing solid solution atoms are precipitated when the amorphous phase containing Co and Sm is heat-treated at an appropriate temperature within the range of 400 to 900° C. It is preferable that y (in at %) indicating the composition ratio of Sm is preferably in the range of 8 or more and 16 or less, more preferably in the range of 10 or more and 13 or less in at %, respectively. The composition ratio y of 8 at % or less is not preferable since coercive force (iHc) is decreased due to decreased precipitation of the hard magnetic phase as well as due to insufficient precipitation of the amorphous phase. The composition ratio y of more than 16 at % is also not preferable since the concentrations of Co and element T are decreased to decrease saturation magnetization (Is), thereby decreasing remnant magnetization (Ir).

In the composition formula of the first alloy powder comprising an amorphous phase as a principal phase or of the first hard magnetic powder, R represents rare earth elements other than Sm including one or more of the elements among Sc, Y, La, Ce, Pr, Nd, Pm, Eu, Gd, Tb, Dy, Ho, Er, Tm, Yb and Lu. The element R is an element liable to form an amorphous phase.

The composition ratio z of the element R should be one at % or more, preferably two at % or more, in order to form sufficient amount of the amorphous phase of 50% by weight or more along with allowing sufficient number of fine crystalline phases for realizing good hard magnetic characteristics to grow.

The element R shows a tendency, on the other hand, to decrease saturation magnetization (Is) of the composite hard magnetic material obtained as its composition ratio z is increased. The composition ratio z of the element R should be 5 at % or less in order to obtain high remnant magnetization (Ir). When a part of the element R is composed of Nd and/or Pr, much higher hard magnetic characteristics are obtained.

Hard magnetic characteristics are further displayed by substituting the element R with Sm to form a $R_2Co_{17}$ phase.

M in the foregoing formula represents one or a plurality of elements among Nb, Zr, Ta and Hf. Since these elements M have high amorphous phase forming ability, a sufficient amount of the amorphous phase can be formed by adding the element M even when the composition ratio of expensive element R (rare earth element) is decreased. However, when the composition ratio x (in at %) of the element M is increased by substituting M with Co and the element T, saturation magnetization (Is) of the composite hard magnetic material obtained is decreased. Also, when the composition ratio x of the element M is decreased, a sufficient amount of the amorphous phase can not be formed. Accordingly, the composition ratio x of the element M is preferably in the range of zero or more to four or less in at %, more preferably two or more to four or less in at %.

Among these elements M, Nb is especially effective. When a part or all of the element M is substituted with Nb, coercive force (iHc) of the composite hard magnetic material becomes large. The powder is able to obtain without being oxidized in the air by substituting with Nb having good anti-oxidation property.

The elements Sm, R and M are the elements having a common property that allows an amorphous phase to be readily formed.

It is preferable that (x+Y+z) as a summarized composition ratio of these elements is 8 at % or more and 16 at % or less, more preferably 10 at % or more and 13 at % or less. It is not preferable that the at % (x+Y+z) is less than 8 at % because precipitation of the amorphous phase is not sufficient. The amount of (x+Y+z) of more than 16 at % is also not preferable since hard magnetic characteristics are deteriorated.

Q in the formula above represents one or a plurality of elements among P, C, Si and B, which are also semimetal elements that are liable to form amorphous phases. A $Sm_3Co_{20}B$ phase as a soft magnetic phase is also precipitated when the amorphous phase containing Co, B and Sm is heat-treated at an appropriate temperature within the range of 400 to 900° C. The composition ratio t of the element Q of 0.5 at % or more, preferably three at % or more, is essential in order to obtain a sufficient number of fine crystalline phases by forming a sufficient amount of amorphous phase and crystallizing the phase. However, since saturation magnetization (Is), remnant magnetization (Ir) and coercive force (iHc) tend to decrease when the composition ratio t (in at %) is excessively increased, it is essential for the composition ratio t of the element Q to be 10 at % or less, especially 9 at % or less, in order to obtain good hard magnetic characteristics.

One or a plurality of the elements X among Al, Ge, Ga, Ag, Pt and Au may be added into the first alloy powder comprising an amorphous phase as a principal phase or into the first hard magnetic powder to be used for the composite hard magnetic material according to the present invention, wherein the composition of the first alloy powder comprising an amorphous phase as a principal phase or first hard magnetic powder is represented by the following formula:

$$(Co_{1-f}T_f)_{100-x-y-z-t-u}M_xSm_yR_zQ_tX_u$$

wherein T denotes one or a plurality of elements of Fe and Ni; M denotes one or a plurality of elements among Nb, Zr, Ta and Hf; R denotes one or more of elements among Sc, Y, La, Ce, Pr, Nd, Pm, Eu, Gd, Tb, Dy, Ho, Er, Tm, Yb and Lu; Q denotes one or a plurality of elements among P, C, Si and B; and X denotes one or a plurality of elements among Al, Ge, Ga, Ag, Pt and Au; f being in the range of $0 \leq f \leq 0.5$, x being in the range of $0 \leq x \leq 4$, y being in the range of $8 \leq y \leq 16$, z being in the range of $0 \leq z \leq 5$, t being in the range of $0.5 \leq t \leq 10$; u being in the range of $0 \leq u \leq 5$; and x+y+z being in the range of $8 \leq x+y+z \leq 16$ in at %, respectively.

It is preferable that f indicating the composition ratio of the element T is preferably in the range of zero or more and less than 0.5 in at %, more preferably in the range of 0.2 or more and less than 0.5 in at % in order to display excellent hard magnetic characteristics.

It is preferable that y indicating the composition ratio of the element Sm is preferably in the range of 8 or more and less than 16 in at %, more preferably in the range of 10 or more and 13 or less than 0.5 in at % in order to display good hard magnetic characteristics.

For endowing with excellent hard magnetic characteristics and for obtaining the good amorphous phase and fine crystalline phase, z (in at %) representing the composition ratio of the element R in the composition ratio should be zero at % or more, more preferably two at % or more.

While saturation magnetization (Is) of the composite hard magnetic material obtained decreases as its composition ratio z of the element R is increased, the composition ratio z of the element R should be adjusted to 5 at % or less in order to obtain high remnant magnetization (Ir).

For obtaining good hard magnetic characteristics, x (in at %) indicating the composition ratio of the element M in the composition formula is preferably zero or more and 4 or less in at %, the range of one or more and three or less in at % is more preferable.

Among these elements, Nb is especially effective. When a part or all of the element m is substituted with Nb, coercive force (iHc) of the composite hard magnetic material becomes large. A powder can be obtained, for example, in the air without oxidation since replacing with Nb enhances anti-oxidation property.

Sm, the element R and M have a common property with each other in that they are liable to form an amorphous phase. The combined amount of the composition ratios of (x+y+z) is preferably 8 or more and 16 or less in at %, more preferably 10 or more and 14 or less in at %. The composition ratio of (x+y+z) of less than 8 at % is not preferable since precipitation of the amorphous phase becomes insufficient. The composition ratio of (x+y+z) of more than 16 at % is also not preferable since hard magnetic characteristics are deteriorated.

The composition ratio t (in at %) of the element Q in the composition formula of 0.5 at % or more is essential for obtaining a good amorphous phase and fine crystalline phase, a value of three at % or more being preferable. The composition ratio t of the element Q of 10 at % or less, preferably 9 at % or less, is necessary for obtaining good hard magnetic characteristics.

The element X in the formula denotes one or a plurality of elements among Al, Ge, ga, Cu, Ag, Pt and Au, and these elements X mainly improve corrosion resistance of the composite hard magnetic material.

Since Ag and Au among these elements X do not form a solid solution with Fe, they have an effect for making the crystal grains fine when a fine crystalline phase is precipitated by a heat-treatment.

Moreover, Ge, Ga and Al among these elements X have an effect for accelerating formation of nano-composite phase that is a mixed phase of a fine crystalline phase and an amorphous phase.

It is preferable that u (in at %) indicating the composition ratio of the element X is zero or more and 5 or less in at %, the ratio of one or more and three or less in at % being more preferable. The value of u exceeding 5 at % is not preferable since the ability for forming an amorphous phase is decreased besides deteriorating hard magnetic characteristics.

The second alloy powder comprising an amorphous phase as a principal phase to be used for the composite hard magnetic material according to the present invention will be described hereinafter.

The second alloy powder comprising an amorphous phase as a principal phase, or the second hard magnetic powder, is represented by the following composition formula:

$T_g M_h R_j B_k$ 

The element T in the formula above represents one or more elements among Fe, Co and Ni. These elements are main components of the composite hard magnetic material according to the present invention, and the composition ratio g of the element T is 50 at % or more because the element is responsible for magnetism.

Saturation magnetization (Is) increases as the composition ratio g of the element T is increased. For realizing remnant magnetism (Ir) of as high as 0.8 T, at least 1.1 T or more of saturation magnetism (Is) is required. For satisfying the requirement, it is desirable that the composition ratio g is 80 at % or more, more preferably 86 at % or more. A composition ratio of 93 at % is preferable, on the other hand, for obtaining good hard magnetic characteristics.

It is required that Fe is contained as at least a part of the element T in the second alloy powder comprising an amorphous phase as a principal phase or in the second hard magnetic powder.

The element M in the composition formula represents one or more elements among Zr, Nb, Ta, Hf, Ti, V, Mo and W that have a high amorphous phase forming ability. Adding the element M enables the amorphous phase to be formed in the second alloy powder comprising an amorphous phase as a principal phase or in the second hard magnetic powder even when the concentration of the element R (rare earth element) is low.

Although remnant magnetization (Ir) increases as the composition ratio h of the element M is increased by substituting it with the element R, coercive force (iHc) decreases to turn hard magnetic characteristics into soft magnetic characteristics. When the element M is increased by substituting it with the element T that is responsible for magnetism, saturation magnetization (Is) and remnant magnetization (Ir) are decreased.

Accordingly, it is preferable that the composition ratio h of the element M is in the range of zero at % or more and 15 at % or less, more preferably in the range of 0.5 at % or more and 5 at % or less and most preferably in the range of 0.5 at % or more and three at % or less, for obtaining good hard magnetic characteristics. One at % or more of the element M is preferably added in order to ease formation of the amorphous phase.

R in the composition formula represents one or more elements among the rare earth elements (Sc, Y, La, Ce, Nd, Pm, Sm, Eu, Gd, Tb, Dy, Ho, Er, Tm, Yb and Lu). The intermetallic compound $R_2Fe_{14}B$ (R represents one or more of elements among the rare earth elements) that are precipitated when the alloy comprising an amorphous phase as a principal phase and containing the element R, Fe and B is heated at 773 to 1173 K (500 to 900° C.) endows the composite hard magnetic material according to the present invention with excellent hard magnetic characteristics.

Saturation magnetization (Is) decreases as the composition ratio j of the element R is decreased. Since at least 1.1 T of saturation magnetization is necessary for obtaining remnant magnetization (Ir) of as high as 0.8 T or more, the composition ratio j of the element R that satisfies this condition is desirably 20 at % or less.

The element R is an element that is liable to form an amorphous phase. Since too small composition ratio j of the element R makes it difficult to obtain good amorphous phases or fine crystalline phases, it is desirable that the composition ratio j of the element R is three at % or more. The composition ratio of 10 at % or less, more preferably 7 at % or less, is recommended f or satisfying both of high saturation magnetization (Ir) and coercive force (iHc) together.

Much higher hard magnetic characteristics can be obtained when a part or all of the element R is composed of Nd and/or Pr.

The element B in the composition formula is an element that is liable to from an amorphous phase. The compound $R_2Fe_{14}B$ precipitated by heating the amorphous phase containing the elements R, Fe and B at an appropriate temperature range of 773 to 1173 K (500 to 900° C.) endows the composite hard magnetic material according to the present invention with hard magnetic characteristics.

While it is desirable that the concentration of B is two at % or more, more preferably three at % or more, for obtaining good amorphous phases and fine crystalline phases, the composition ratio k of the element B is desirably adjusted to 20 at % or less, more preferably to 7 at % or less and most preferably to 5 at % or less, in order to obtain good hard magnetic characteristics, because saturation magnetization (Is), remnant magnetization (Ir) and coercive force (iHc) are decreased with the increase of the composition ratio k. A compound of Fe-B is precipitated by heating the amorphous phase containing Fe and B at an appropriate temperature in the range of 773 to 1173 K (500 to 900° C.).

One or more of the element E among Cr. Al, Pt, Ru, Rh, Pd, Os, Ir, Cu, Ag, Au, Sc, Zn, Sn, Re and Mn may be added into the second alloy powder comprising an amorphous phase as a principal phase or into the second hard magnetic powder to be used in the present invention. The second alloy powder comprising an amorphous phase as a principal phase or the second hard magnetic powder is represented by the following composition formula:

$T_g M_h R_j B_k E_m$

The composition ratio g of the element T that is responsible for magnetism is preferably in the range of 50 at % or more, more preferably 80 at % or more and 93 at % or less, for allowing saturation magnetization (Is) to be increased. The composition ratio g is preferably in the range of 86 at % or more and 93 at % or less, on the other hand, in order to realize both of remnant magnetization (Ir) of as high as 0.8 T and high coercive force (iHc).

The composition ratio h of the element M in the composition formula is preferably in the range of zero at % or more and 15 at % or less, more preferably 0.5 at % or more and 5 at % or less and most preferably 0.5 at % or more and three at % or less, for obtaining good hard magnetic characteristics. Also, the composition ratio is preferably in the range of one at % or more and three at % or less for realizing remnant magnetization (Ir) of as high as 0.8 T. A rage of 0.5 at % or more and one at % or less is also preferable for obtaining high remnant magnetization.

The composition ratio j of the element R in the composition formula is preferably in the range of three at % or more and 20 at % or less, more preferably in the range of three at % or more and 10 at % or less for both purposes of endowing the composite hard magnetic material according to the present invention with excellent hard magnetic characteristics and obtaining good amorphous phases and fine crystalline phases. A range of three at % or more and 7 at % or less is preferable for realizing remnant magnetization (Ir) of as high as 0.8 T.

The composition ratio k of the element B in the composition formula is preferably two at % or more, more preferably three at %, for obtaining good amorphous phases and fine crystalline phases. Also, the composition ratio k of the element B is preferably 20 at % or less, more preferably 7 at % or less and most preferably 5 at % or less, in order to obtain good hard magnetic characteristics. A compound of Fe-B is precipitated by heating the amorphous phase containing Fe and B at an appropriate temperature in the range of 773 to 1173 K (500 to 900° C.).

The element E in the composition formula was added for the purpose of accelerating to make the crystalline texture fine and improving corrosion resistance and abrasion resistance of the composite hard magnetic material. The composition ratio m of the element E is preferably zero at % or more and 10 at % or less. However, since a too high composition ratio m of the element E causes deterioration of hard magnetic characteristics, the composition ratio m of the element E is preferably 5 at % or less and more preferably in the range of 0.1 at % or more and 5 at % or less. It is preferable that the element E is not added for attaining remnant magnetization of as high as 0.8 T.

One or more of the element G among C, Ga, Ge, P, Sb, In, B and As may be added into the second alloy powder comprising an amorphous phase as a principal phase or into the second hard magnetic powder according to the present invention. The composition formula of the second alloy as a principal phase or the second hard magnetic powder is represented by the following formula:

$T_g M_h R_j B_k G_n$

The composition ratio g of the element T that is responsible for magnetism is preferably in the range of 50 at % or more, more preferably 80 at % or more and 93 at % or less for increasing saturation magnetization (Is). A rage of 86 at % or more and 93 at % or less is preferable in order to obtain remnant magnetization (Ir) of as high as 0.8 T or more and high coercive force (iHc).

The composition ratio h of the element M in the composition formula is preferably in the range of zero at % or more and 15 at % or less, more preferably 0.5 at % or more and five at % or less, for obtaining good hard magnetic characteristics. A range of 0.5 at % or more and three at % or less is preferable for realizing remnant magnetization (Ir) of as high as 0.8 T or more. The composition ratio may be 0.5 at % or more and one at % or less in order to obtain higher remnant magnetization (Ir).

For the purpose of endowing the composite hard magnetic material with good hard magnetic characteristics and obtaining good amorphous phase and fine crystalline phase, the composition ration j of the element R in the composition formula is preferably three at % or more and 20 at % or less, more preferably three at % or more and 10 at % or less. A range of three at % or more and 7 at % or less is preferable in order to realize remnant magnetization (Ir) of as high as 0.8 T.

While the composition ratio k of the element B in the composition formula is preferably two at % or more for obtaining good amorphous phases and fine crystalline phases, the composition ratio k of the element B is adjusted in the range of two at % or more and 20 at % or less, more preferably three at % or more and 7 at % or less, and most preferably three at % or more and 5 at % or less, in order to obtain good hard magnetic characteristics.

The element G in the composition formula was added in order to control the crystallization temperature of the semihard magnetic phase and hard magnetic phase, more optimum fine crystalline composite phases being realized by adding the element G.

It is preferable that the composition ratio of the element G is zero at % or more and 10 at % or less. However, since too high composition ratio u causes saturation magnetization (Is) to be extremely lowered, the composition ratio u is more preferably 5 at % or less and most preferably 0.1 at % or more and 5 at % or less. The element is desirably not added in order to attain remnant magnetization (Ir) of as high as 0.8 T.

The elements E and G described above may be simultaneously added into the second alloy powder comprising an amorphous phase as a principal phase or into the second hard magnetic powder. The second alloy powder comprising an amorphous phase as a principal phase or the second hard magnetic powder to be used herein is represented by the following composition formula:

$T_g M_h R_j B_k E_m G_n$

T represents one or more elements among Fe, Co and Ni; M represents one or more elements among Zr, Nb, Ta, Hf, Ti, V, Mo and W; R represents one or more of the elements among the rare earth elements; E represents one or more elements among Cr, Al, Pt, Ru, Rh, Pd, Os, Ir, Cu, Ag, Au, Sc, Zn, Sn, Re and Mn; G represents one ore more elements among C, Ga, Ge, P, Sb, In, B and As; and B represents boron. It is preferable for enabling to increase saturation magnetization (Is), for obtaining good hard magnetic characteristics, for obtaining good amorphous phases and fine crystalline phases, for accelerating to make the crystal texture fine along with improving corrosion resistance and abrasion resistance of the composite hard magnetic material, and for realizing an optimum fine crystalline composite phase, that the range of g, h, j, k, m and n that indicate the composition ratios are represented by $50 \leq g$, $0 \leq h \leq 15$, $3 \leq j 20$, $2 \leq k \leq 20$, $0 \leq m \leq 10$ and $0 \leq n \leq 10$.

From the point of increasing saturation magnetization (Is), obtaining good hard magnetic characteristics, obtaining good amorphous phases and fine crystalline phases, accelerating to make the crystal texture fine without deteriorating hard magnetic characteristics along with improving corrosion resistance and abrasion resistance of the composite hard magnetic material and realizing an optimum fine crystalline texture without extremely decreasing saturation magnetization (Is), g, h, J, k, m and n that indicate the composition ratios are preferably represented by $80 \leq g \leq 93$, $0.5 \leq h \leq 5$, $3 \leq j \leq 10$, $3 \leq k \leq 7$, $m \leq 5$ and $n \leq 5$.

From the point of obtaining remnant magnetization (Ir) of as high as 0.8 T and high coercive force (iHc), obtaining good hard magnetic characteristics, accelerating to make the crystal texture to be fine without deteriorating hard magnetic characteristics along with improving corrosion resistance and abrasion resistance of the composite hard magnetic material and realizing an optimum fine crystalline composite phase without extremely decreasing saturation magnetization (Is), g, h, j, k, m and n that indicate the composition ratios are preferably represented by $86 \leq g \leq 93$, $0.5 \leq h \leq 3$, $3 \leq j \leq 7$, $3 \leq k \leq 5$, $0.1 \leq m \leq 5$ and $0.1 \leq n \leq 5$.

For attaining remnant magnetization (Ir) of as high as 0.8 T. it is recommended that the element E and the element G are not added.

Allowing Co to be contained in the element T other than Fe in the second alloy powder comprising an amorphous phase as a principal phase and in the second hard magnetic powder to be used in the composite hard magnetic material according to the present invention is preferable, because the absolute value of the temperature coefficient of magnetization when the hard magnetic material is used in the configuration that the permeance coefficient becomes two or more, the absolute value of the temperature coefficient of magnetization when the hard magnetic material is used in the configuration that the permeance coefficient becomes 10 or more, and the absolute value of the temperature coefficient of coercive force can be made small.

The reasons above are that the temperature change of magnetization and coercive force is reduced since Curie temperature is increased when Co is contained in the element T, that the temperature change of magnetic characteristics is reduced since the remanence ratio of magnetization is increased, and that the temperature change of remnant magnetization is reduced since Co is also contained in the bcc-Fe phase.

The content of Co is preferably 50 at % or less, more preferably 0.5 at % or more and 30 at % or less, and most preferably 0.5 at % or more and 20 at % or less since too many content allows magnetic characteristics to be deteriorated. The content is preferably determined according to the composition and heat treatment condition of the alloy.

Magnetic characteristics, especially coercive force (iHc) and maximum magnetic energy product ((BH)max), can be further improved in the second alloy powder comprising an amorphous phase as a principal phase and in the second hard magnetic powder when Si is added by substituting the element with Si, also lowering the absolute value of the temperature coefficient when the hard magnetic material is used in the configuration that the permeance coefficient is two or more, especially lowering the temperature coefficient of magnetization when the hard magnetic material is used in the configuration that the permeance coefficient is 10 or more.

The amount of addition of Si is preferably in the range of 0.5 at % or more and five at % or less, more preferably 0.5 at % or more and three at % or less, because magnetic characteristics of the composite hard magnetic material is rather lowered because the composition ratio of the element T is decreased when the amount of addition of Si is too large.

The content of Si is preferably determined depending on the composition and heat treatment condition of the alloy.

Examples of the especially preferable second alloy powder comprising an amorphous phase as a principal phase or second hard magnetic powder are; $Fe_{83}Pr_7B_5$, $Fe_{86}Pr_7Nb_2B_5$, $Fe_{86}Nd_7Zr_2B_5$, $Fe_{86}Nd_9B_5$, $Fe_{84}Pr_{11}B_5$, $Fe_{88}Pr_5Nb_2B_5$, $Fe_{88}Nd_5Nb_2B_5$, $Fe_{86}Nd_7Nb_2B_5$, $Fe_{89}Pr_4Nb_2B_5$, $Fe_{89}Nb_2Nd_4B_5$, $Fe_{89}Nb_2Pr_4B_5$, $Fe_{90}Nb_2Nd_5B_3$, $Fe_{90}Nb_2Pr_5B_3$, $Fe_{89}Nb_2Nd_5B_4$, $Fe_{89}Nb_2Pr_5B_4$, $Fe_{66}CO_{20}Nb_2Pr_7B_5$, $Fe_{76}Co_{10}Nb_2Pr_7B_5$, $Fe_{73}Co_{15}Nb_2Nd_5B_5$ and $Fe_{76}Co_{10}Nb_2Nd7B_5$.

EXAMPLE

Example 1

The first alloy powder comprising an amorphous phase as a principal phase was prepared as follows.

Prescribed quantities of Co, Fe, Sm, Nb and B were weighed and these materials were melted in a reduced pressure Ar atmosphere with a high frequency induction heating apparatus to produce ingots with desired compositions. These ingots were melted in a crucible and the molten liquid was spouted out on a rotating roll to obtain a quenched ribbon with a composition of $Sm_{12}(Co_{60}Fe_{23})_{81}Nb_2B_5$ by a quenching single roll method.

The texture of the ribbon obtained by quenching was investigated by X-ray diffraction analysis to found that almost all of the texture comprises amorphous phases.

Then, the quenched ribbon was crushed in the air with a rotary mill to obtain a powder. A powder having grain sizes of 37 to 105 μm were selected as a first alloy powder comprising an amorphous phase as a principal phase to be used in the subsequent step.

The second powder alloy comprising an amorphous phase as a principal phase was prepared as follows.

Prescribed quantities of Co, Fe, Nb, Pr and B were weighed and these materials were melted in a reduced pressure Ar atmosphere with a high frequency induction heating apparatus to produce ingots with desired compositions. These ingots were melted in a crucible and the molten liquid was spouted out on a rotating roll to obtain a quenched ribbon with a composition of $Fe_{76}Co_{10}Nb_2Pr_7B_5$ by a quenching single roll method. The texture of the ribbon obtained by quenching was investigated by X-ray diffraction analysis to found that almost all the texture comprises amorphous phases.

Then, the quenched ribbon was crushed in the air with a rotary mill to obtain a powder. A powder having grain sizes of 37 to 105 μm were selected as a second alloy powder comprising an amorphous phase as a principal phase to be used in the subsequent step.

A composite powder prepared by mixing the alloy powder having the amorphous phase with the composition of $Sm_{12}(Co_{60}Fe_{23})_{81}Nb_2B_5$ and the alloy powder having the amorphous phase with the composition of $Fe_{76}Co_{10}Nb_2Pr_7B_5$ in 1:1 ratio was filled in dies using a hand press. The dies was attached in a spark plasma apparatus as shown in FIG. 1 and pressed under an atmosphere of $3\times10^{-5}$ torr in the chamber, followed by heating the powder material by flowing an pulse electric current from an electric current flow apparatus. The pulse wave form was applied by flowing twelve pulses followed by halting for two pulses, and the powder material was heated with an electric current of 4700 to 4800 A in maximum.

Figure 3:
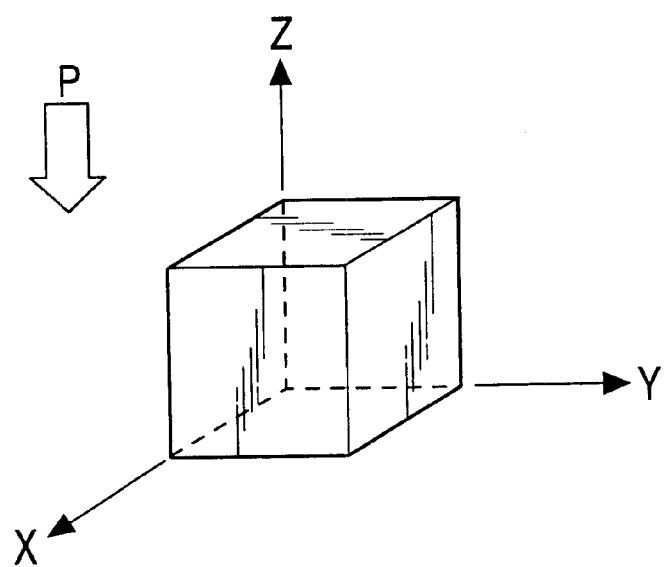
FIG. 3 is a perspective view for describing the sintering pressure impressing direction for production of the bulk material.
Figure 4:
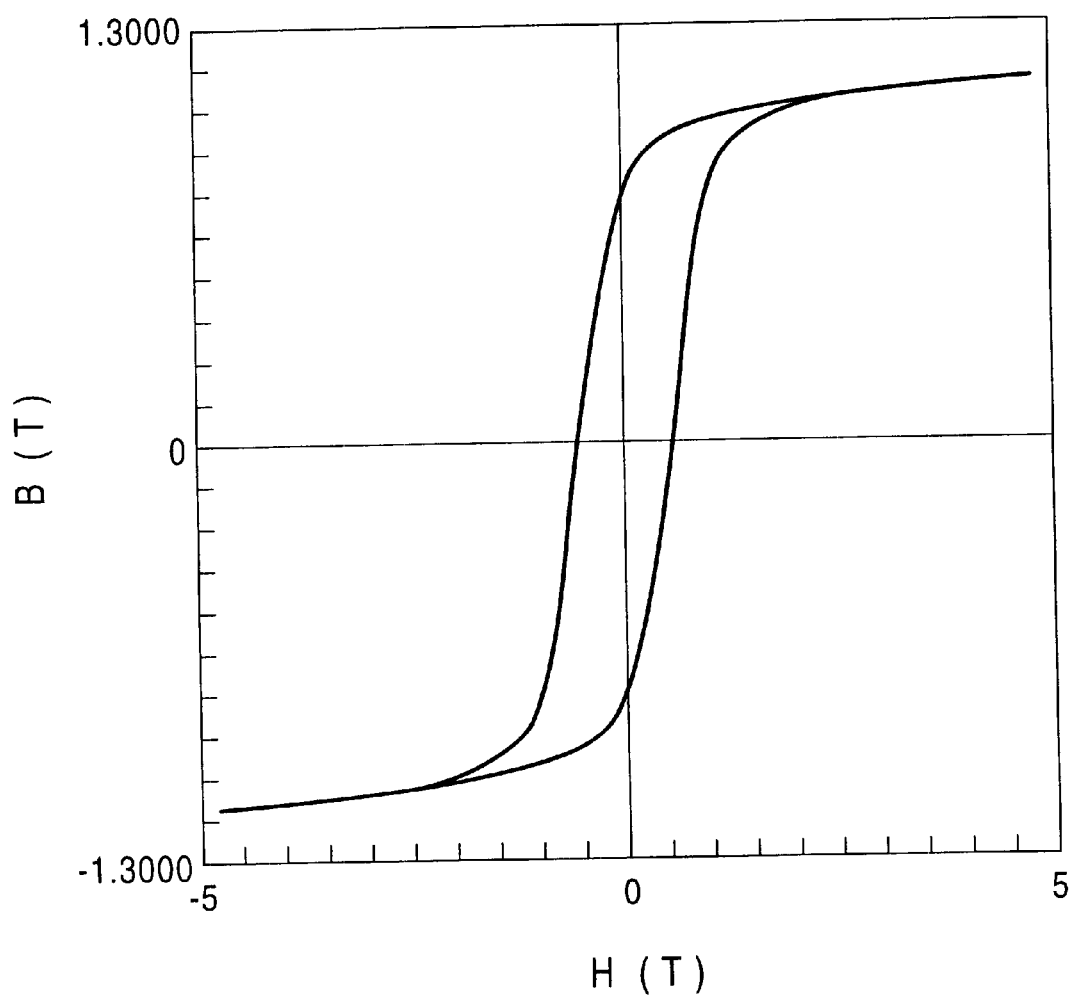
FIG. 4 is a graph showing a B-H loop obtained by a measurement of magnetic flux density generated within the sample when an external magnetic field of from −5 T to 5 T was applied along the Z-direction in the bulk sample in Example 1 using an alloy powder comprising an amorphous phase as a principal phase with a composition of $Sm_{12}(CO_{60}Fe_{23})_{81}Nb_2B_5$ and an alloy powder comprising an amorphous phase as a principal phase with a composition of $Fe_{76}CO_{10}Nb_2Pr_7B_5$.
Figure 5:
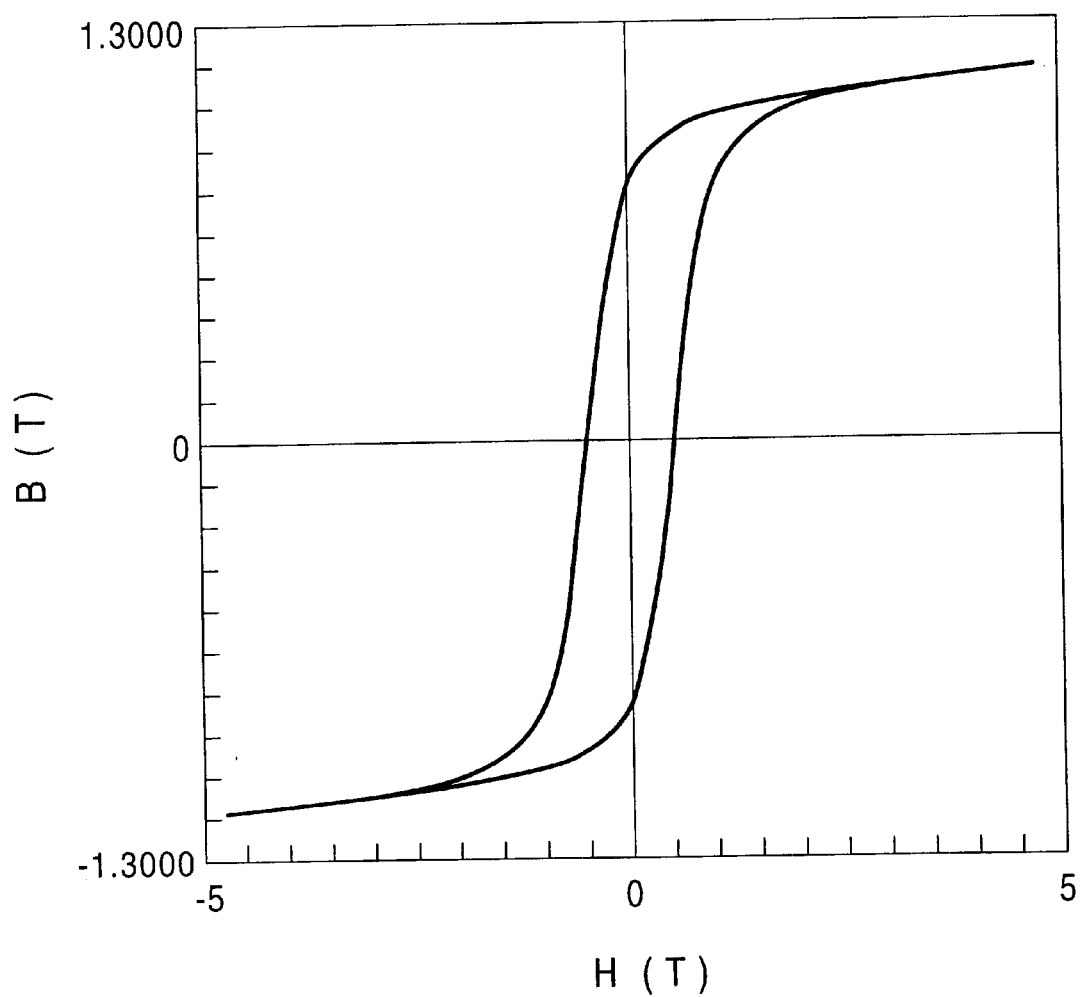
FIG. 5 is a graph showing a B-H loop obtained by a measurement of magnetic flux density generated within the sample when an external magnetic field of from −5 T to 5 T was applied along the X-direction (the direction perpendicular to the Z-direction) in the bulk sample in Example 1.
Figure 6:
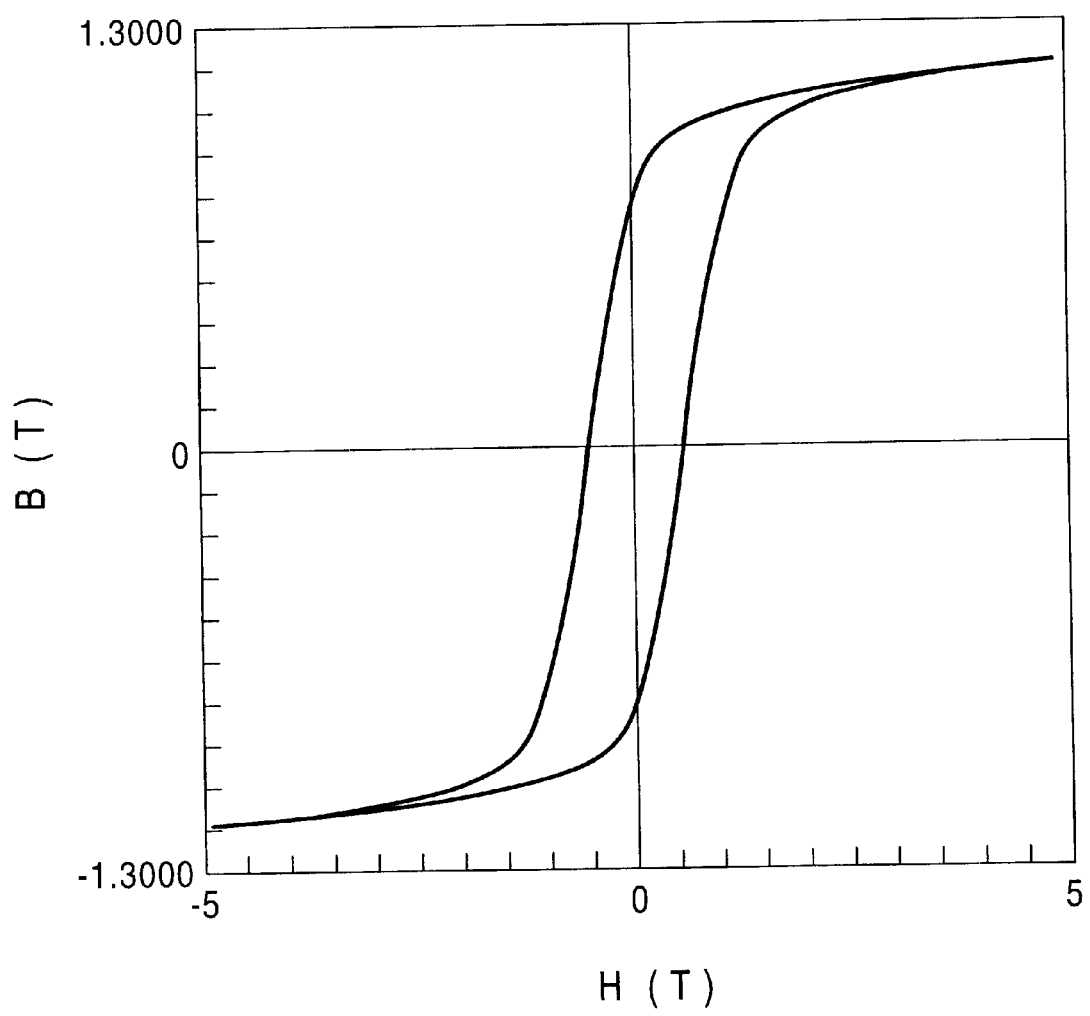
FIG. 6 is a graph showing a B-H loop obtained by a measurement of magnetic flux density generated within the sample when an external magnetic field of from −5 T to 5 T was applied along the Z-direction in the bulk sample in Example 2 using an alloy powder comprising an amorphous phase as a principal phase with a composition of $Sm_{12}(CO_{60}Fe_{23})_{79}Nb_2B_7$ and an alloy powder comprising an amorphous phase as a principal phase with a composition of $Fe_{76}CO_{10}Nb_2Pr_7B_5$.
Figure 7:
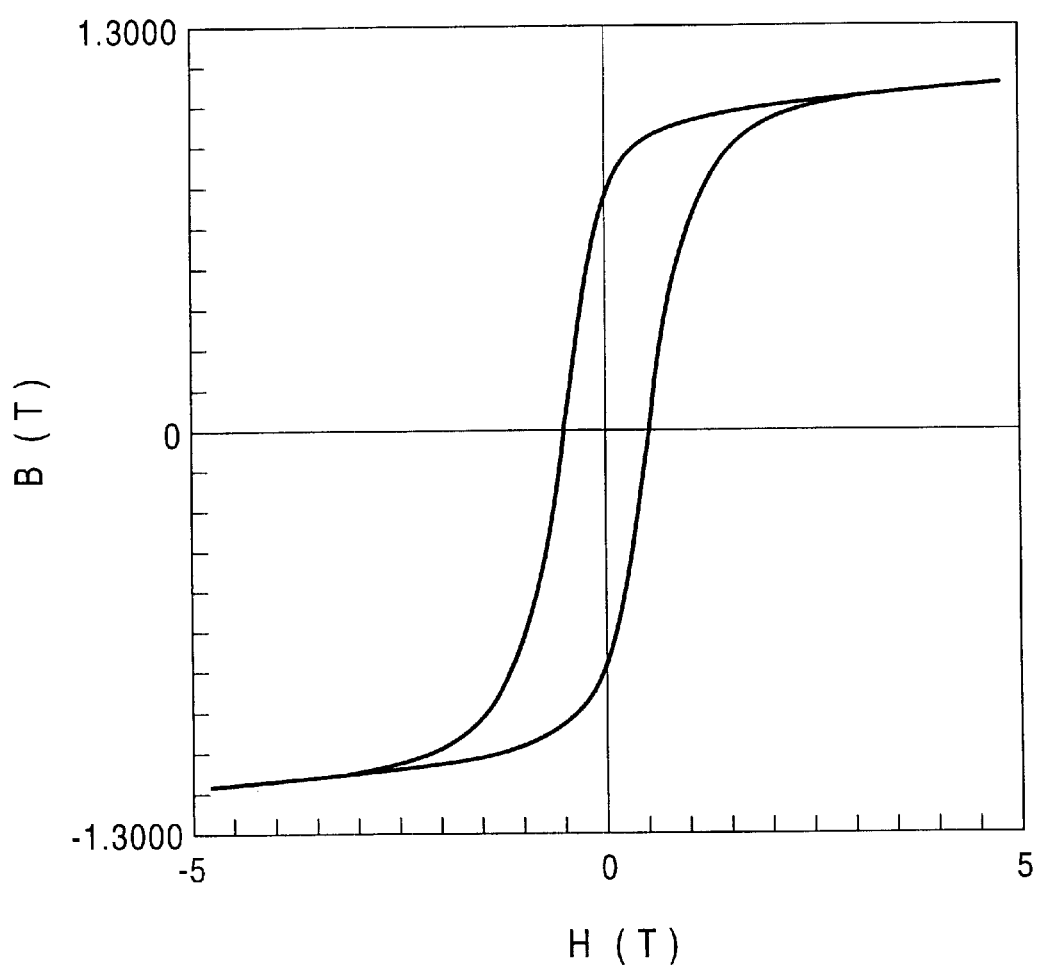
FIG. 7 is a graph showing a B-H loop obtained by a measurement of magnetic flux density generated within the sample when an external magnetic field of from −5 T to 5 T was applied along the X-direction (the direction perpendicular to the Z-direction) in the bulk sample in Example 2.
Figure 8:
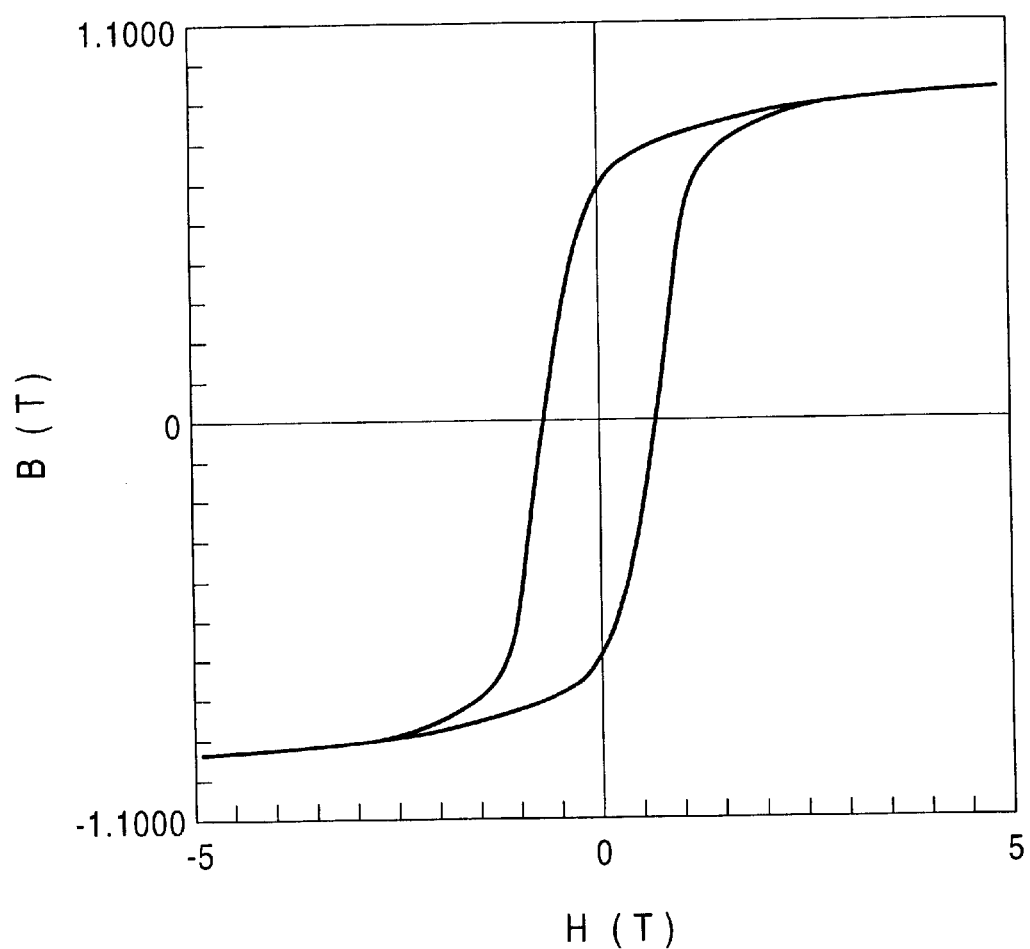
FIG. 8 is a graph showing a B-H loop obtained by a measurement of magnetic flux density generated within the sample when an external magnetic field of from −5 T to 5 T was applied along the Z-direction in the bulk sample using an alloy powder comprising an amorphous phase as a principal phase with a composition of $Sm_{12}(CO_{60}Fe_{23})_{81}Nb_2B_5$ as in Comparative Example 1.
Figure 9:
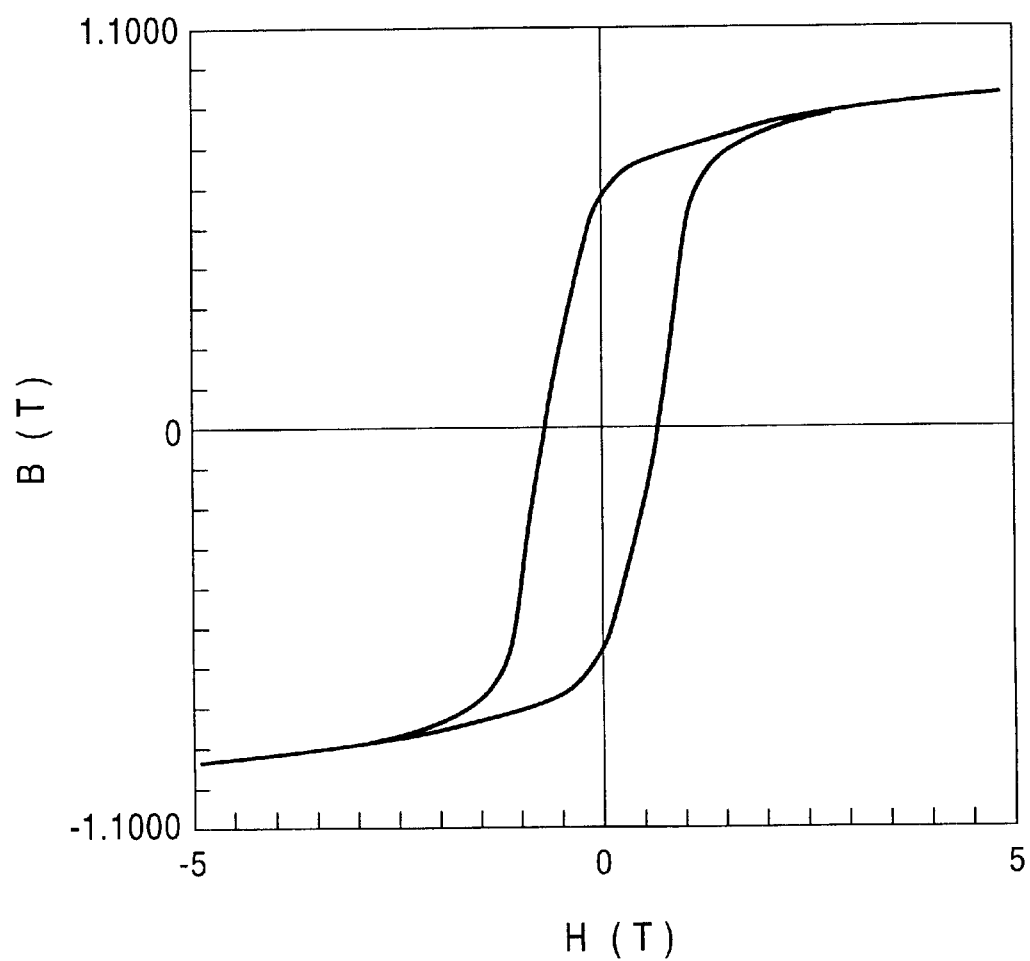
FIG. 9 is a graph showing a B-H loop obtained by a measurement of magnetic flux density generated within the sample when an external magnetic field of from −5 T to 5 T was applied along the X-direction (the direction perpendicular to the Z-direction) in the bulk sample in Comparative Example 1.
Figure 10:
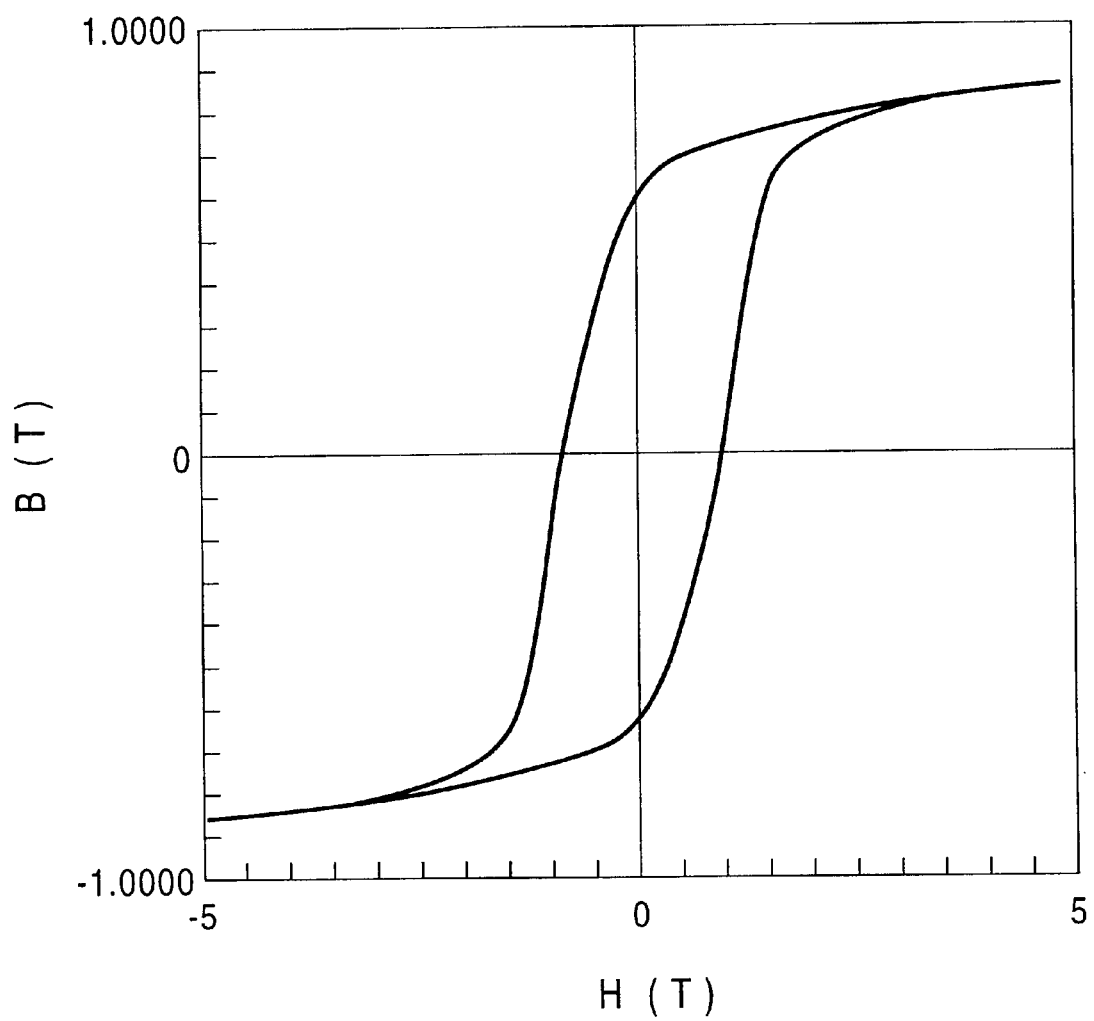
FIG. 10 is a graph showing a B-H loop obtained by a measurement of magnetic flux density generated within the sample when an external magnetic field of from −5 T to 5 T was applied along the Z-direction in the bulk sample using an alloy powder comprising an amorphous phase as a principal phase with a composition of $Sm_{12}(CO_{60}Fe_{23})_{79}Nb_2B_7$ in Comparative Example 2.
Figure 11:
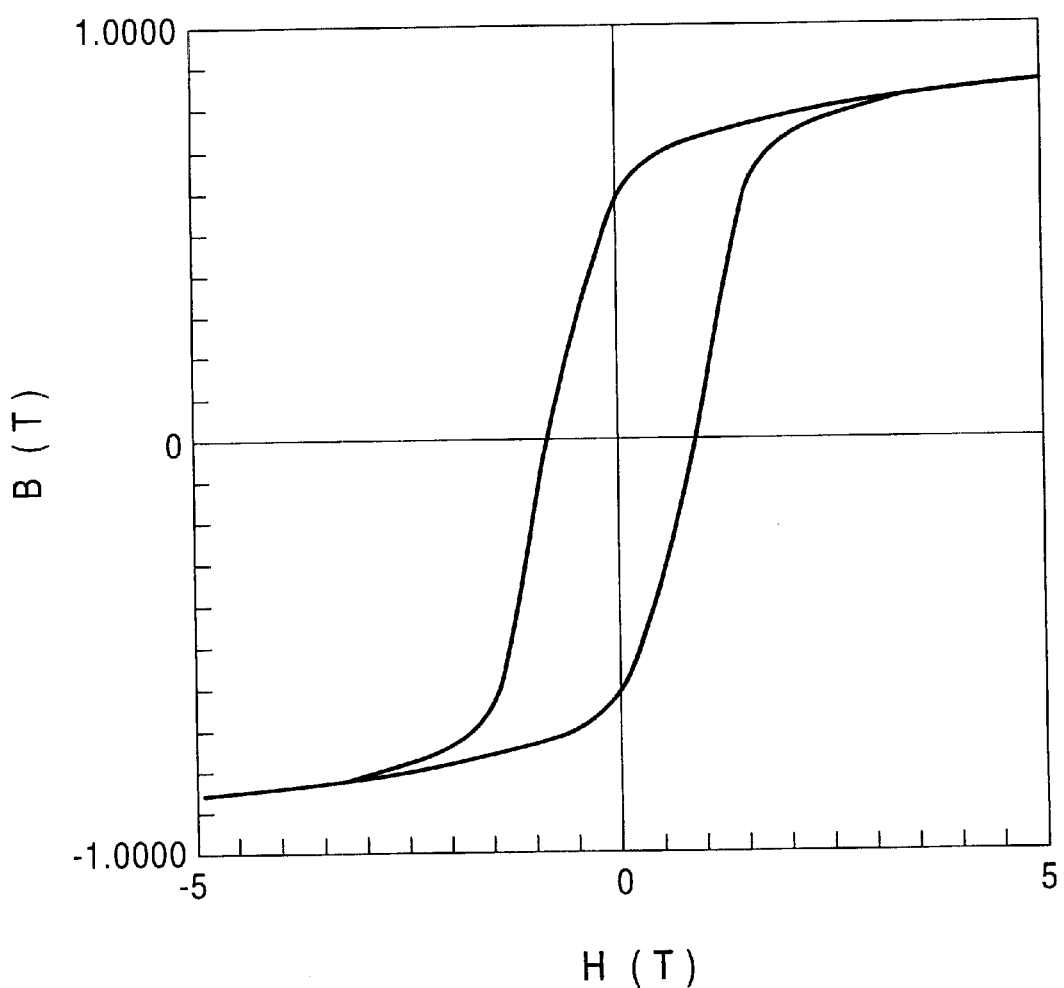
FIG. 11 is a graph showing a B-H loop obtained by a measurement of magnetic flux density generated within the sample when an external magnetic field of from −5 T to 5 T was applied along the X-direction (the direction perpendicular to the Z-direction) in the bulk sample in Comparative Example 2.
Figure 12:
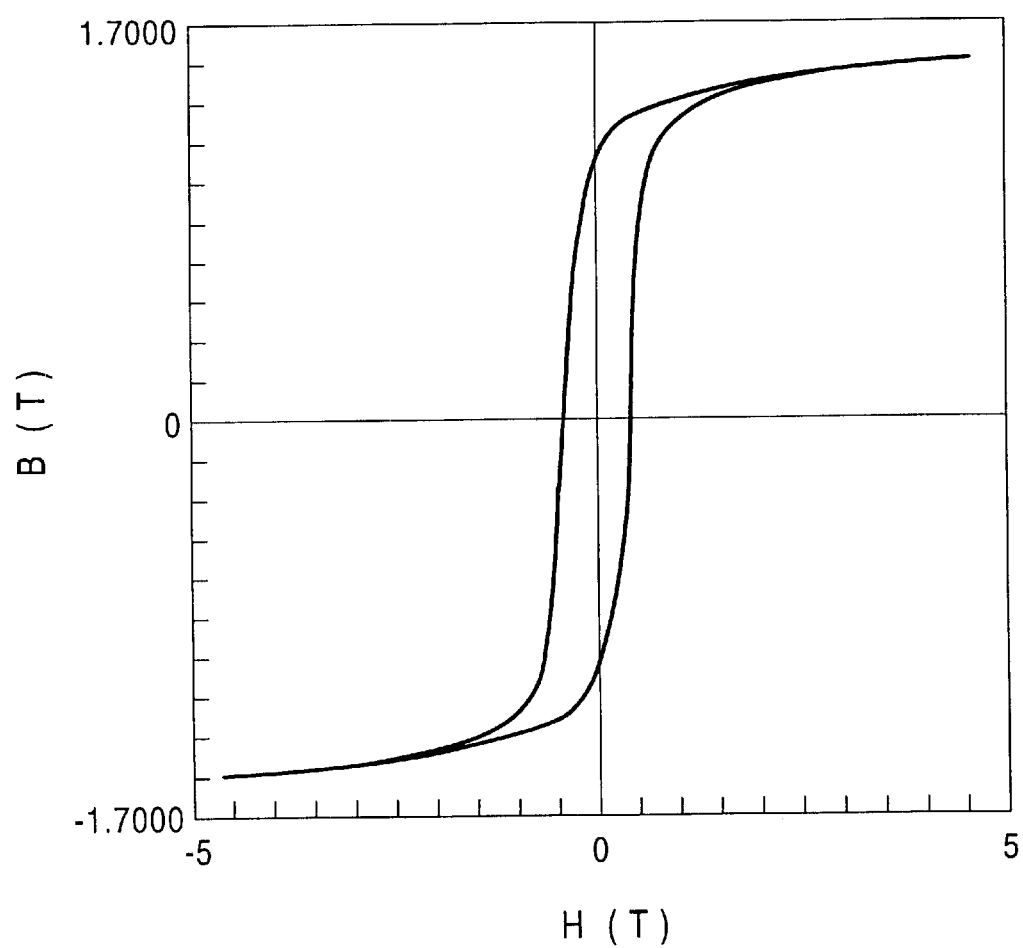
FIG. 12 is a graph showing a B-H loop obtained by a measurement of magnetic flux density generated within the sample when an external magnetic field of from −5 T to 5 T was applied along the Z-direction in the bulk sample using an alloy powder comprising an amorphous phase as a principal phase with a composition of $Fe_{76}Co_{10}Nb_2Pr_7B_5$ as in Comparative Example 3.
Figure 13:
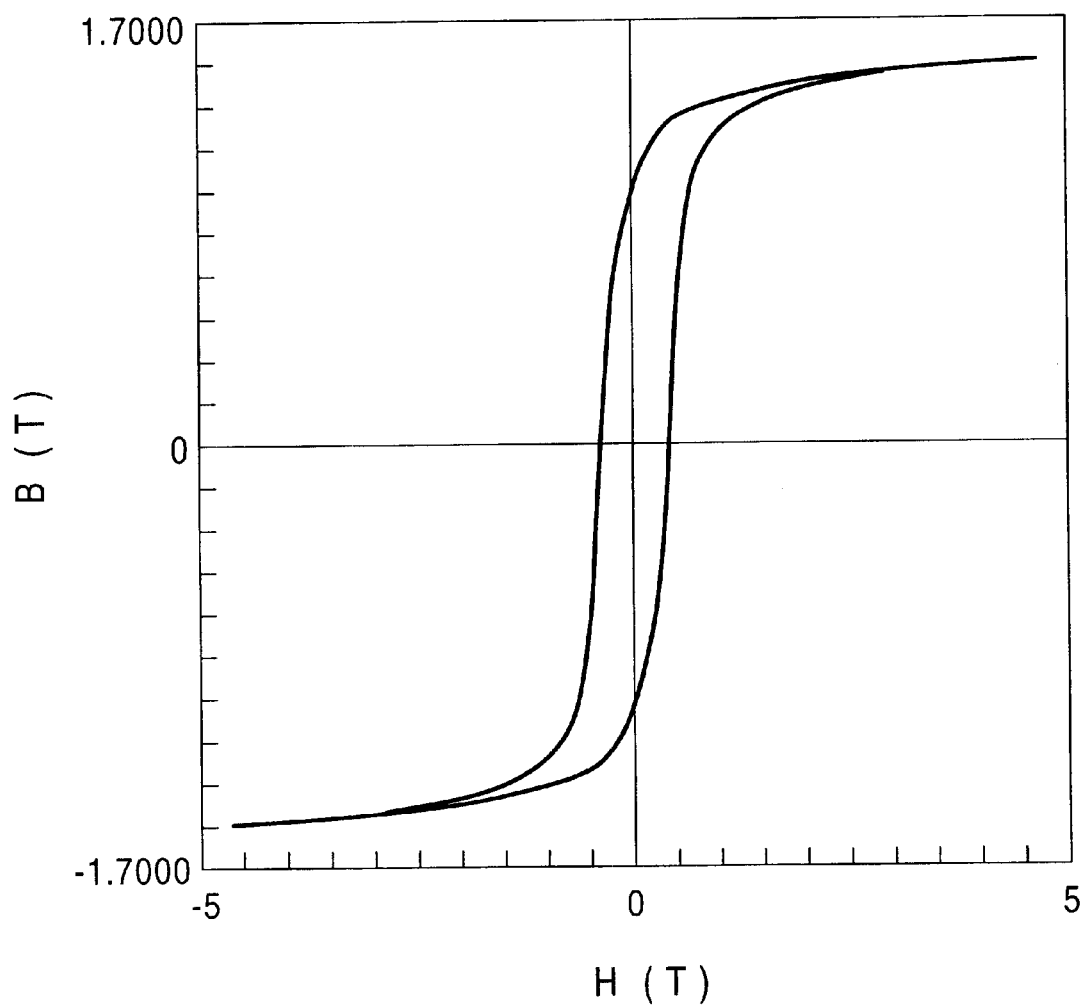
FIG. 13 is a graph showing a B-H loop obtained by a measurement of magnetic flux density generated within the sample when an external magnetic field of from −5 T to 5 T was applied along the X-direction (the direction perpendicular to the Z-direction) in the bulk sample using an alloy powder comprising an amorphous phase as a principal phase with a composition of $Fe_{76}Co_{10}Nb_2Pr_7B_5$ as in Comparative Example 3.

Consolidation (sintering) and heat-treatment were simultaneously carried out by heating the sample at a heating rate of 110° C./min from room temperature to 600° C. (873 K) and holding the consolidation temperature Ts of 873 K for about 8 minutes under a consolidation pressure of 636 MPa. A bulk sample to which a pressure was applied along the z-direction as shown in FIG. 3 was obtained. The texture of this bulk sample was investigated by X-ray diffraction analysis to found that the texture was mainly composed of a crystalline phase.

The spark plasma apparatus used for sintering and heat-treatment was mainly composed of dies 1 made of WC, top and bottom punches 2 and 3 made of WC to be inserted into the dies, outer frame dies 8 provided at outside of the dies 1, a base table 4 for holding the bottom punch 3 along with serving as one electrode for flowing a pulse electric current E, a base table 5 serving as another electrode for flowing a pulse electric current E and a thermocouple 7 for measuring the temperature of the composite powder 6 placed between the top and bottom punches 2 and 3 as shown in FIG. 1.

Figure 2:
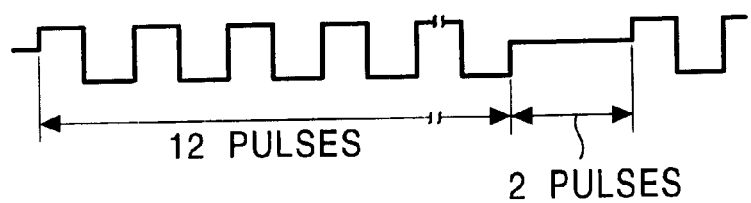
FIG. 2 is a graph showing one example of the waveform of pulse electric current impressed on the raw material powder with the spark plasma sintering apparatus shown in FIG. 1.

The desired bulk material is produced using the spark plasma sintering apparatus by the steps of, for example, placing the composite powder 6 between the top and bottom punches 2 and 3, evacuating inside of the plasma discharge sintering apparatus, and consolidating the powder by applying a pressure from the top and bottom punches 2 and 3, followed by flowing the pulse electric current E as shown in FIG. 2 through the composite powder 6 and heating for a prescribed time interval at a temperature around the crystallization temperature of the alloy powder comprising an amorphous phase as a principal phase to crystallize the composite powder under a stress.

Example 2

A compound having a composition of $Sm_{12}(Co_{60}Fe_{23})_{79}Nb_2B_7$ was used as an first alloy powder having the amorphous phase as a primary phase. A bulk sample was obtained by the method as described in Example 1, except that a composite powder prepared by mixing the first alloy powder comprising an amorphous phase as a principal phase with a composition of $Sm_{12}(Co_{60}Fe_{23})_{79}Nb_2B_7$ and an alloy powder comprising an amorphous phase as a principal phase with a composition of $Fe_{76}Co_{10}Nb_2Pr_7B_5$—a second alloy powder comprising an amorphous phase as a principal phase—in 1:1 in weight ratio was used.

Comparative Example 1

A bulk sample was obtained by the same method as in Example 1, except that an alloy powder comprising an amorphous phase as a principal phase with a composition of $Sm_{12}(Co_{60}Fe_{23})_{81}Nb_2B_5$ was used instead of the composite powder.

Comparative Example 2

A bulk sample was obtained by the same method as in Example 1, except that an alloy powder comprising an amorphous phase as a principal phase with a composition of $Sm_{12}(Co_{60}Fe_{23})_{79}Nb_2B_7$ was used instead of the composite powder. The bulk sample in Comparative Example 2 was endowed with a magnetic anisotropy along the direction of applied pressure.

Comparative Example 3

A bulk sample was obtained by the same method as in Example 1, except that merely an alloy powder comprising an amorphous phase as a principal phase and having a composition of $Fe_{76}Co_{10}Nb_2Pr_7B_5$ was used.

Magnetic characteristics along the Z-direction (the consolidation pressure impressed direction) and magnetic characteristics along the X-direction (the direction perpendicular to the Z-direction) of each bulk sample obtained in Examples 1 and 2 and Comparative Examples 1 to 3 were measured at room temperature (300 K). The results of measurements are shown in TABLE 1 and TABLE 2.

B-H loops obtained by measuring magnetic flux density generated in the sample with a magnetization measuring apparatus while applying an external magnetic field of −5 T to 5 T along the Z-direction of the bulk samples obtained in Examples 1 and 2 and Comparative Examples 1 to 3, and B-H loops obtained by measuring magnetic flux density generated in the sample while applying an external magnetic field of −5 T to 5 t along the X-direction (the direction perpendicular to the Z-direction) of the bulk samples obtained in Examples 1 and 2 and Comparative Examples 1 to 3, are shown in FIG. 4 to FIG. 13, respectively.

TABLE 1

| Sample | Constituting material and mixing ratio of bulk sample (weight ratio) | Characteristic | | | | | |
|---|---|---|---|---|---|---|---|
| | | $I_s$ (T) | | $I_r$ (T) | | $I_r/I_s$ | |
| | | Z | X | Z | X | Z | X |
| Example 1 | $Fe_{76}Co_{10}Nb_2Pr_7B_5$: $Sm_{12}(Co_{60}Fe_{23})_{81}Nb_2B_5$ = 1:1 | 1.1394 | 1.1499 | 0.7900 | 0.7926 | 0.6933 | 0.6893 |
| Example 2 | $Fe_{76}Co_{10}Nb_2Pr_7B_5$: $Sm_{12}(Co_{60}Fe_{23})_{79}Nb_2B_7$ = 1:1 | 1.1593 | 1.1319 | 0.7789 | 0.7913 | 0.6719 | 0.6991 |
| Comparative example 1 | $Sm_{12}(Co_{60}Fe_{23})_{81}Nb_2B_5$ | 0.9137 | 0.9051 | 0.6487 | 0.6313 | 0.71 | 0.6974 |
| Comparative example 2 | $Sm_{12}(Co_{60}Fe_{23})_{79}Nb_2B_7$ | 0.858 | 0.8583 | 0.621 | 0.6053 | 0.7242 | 0.7053 |

TABLE 1-continued

| | Constituting material and mixing ratio of bulk sample | Characteristic | | | | | |
|---|---|---|---|---|---|---|---|
| | | $I_s$ (T) | | Ir (T) | | Ir/$I_s$ | |
| Sample | (weight ratio) | Z | X | Z | X | Z | X |
| Comparative example 3 | $Fe_{76}Co_{10}Nb_2Pr_7B_5$ | 1.514 | 1.52 | 1.08 | 1.064 | 0.713 | 0.7002 |

TABLE 2

| | Characteristic | | | | | |
|---|---|---|---|---|---|---|
| | iHc (kOe) | | $(BH)_{max}$ $(kJ/m^3)$ | | Density (g/cc) | |
| Sample | Z | X | Z | X | Z | X |
| Example 1 | 5.534 | 5.247 | 61.84 | 55.02 | 7.496 | 7.496 |
| Example 2 | 5.49 | 5.052 | 56.67 | 52.48 | 7.6 | 7.6 |
| Comparative example 1 | 6.86 | 6.635 | 52.57 | 43.8 | 7.615 | 7.615 |
| Comparative example 2 | 9.16 | 8.796 | 54.5 | 45.66 | 7.815 | 7.815 |
| Comparative example 3 | 4.2 | 4.18 | 84.2 | 75.84 | 7.6 | 7.6 |

As are evident from TABLE 1 and TABLE 2, remnant magnetization (Ir), coercive force (iHc) and maximum magnetic energy product ((B)max) along the X- and Y-directions in the bulk samples in Examples 1 and 2 show intermediate values between remnant magnetization (Ir), coercive force (iHc) and maximum magnetic energy product ((B)max) along the X- and Y-directions in the bulk samples in Comparative Examples 1 and 2 and remnant magnetization (Ir), coercive force (iHc) and maximum magnetic energy product ((B) max) along the X- and Y-directions in the bulk samples in Comparative Example 3, respectively. Accordingly, it is clear that the hard magnetic characteristics of the bulk sample in Examples 1 and 2 have intermediate characteristics between those of Comparative Examples 1 and 2 and Comparative Example 3. It is also clear that the remanence ratios (Ir/Is) that are the ratios between maximum magnetization ($I_s$) at an impressed magnetic field of 5 T and remnant magnetization (Ir) in the bulk samples in Examples 1 and 2 is approximately the same as those in the bulk samples in Comparative Examples 1 to 3. In other words, the bulk samples in Examples 1 and 2 have remnant magnetization (Ir) of 0.77 T or more, having excellent magnetization characteristics since sufficient remanence ratio for use in constituting materials such as an angle sensor is obtained. The hard magnetic material also ready for forming multipoles besides being easily magnetized and ready for forming multipoles since coercive force is in an appropriate range of 5 to 5.5 kOe.

The density of the bulk sample in Example 1 along the X- and Y-directions is 7.496 g/cc while the density of the bulk sample in Example 2 along the X- and Y-directions is 7.76 g/cc. Therefore, high density bulk samples were obtained by consolidating the composite powder by taking advantage of the softening phenomenon occurred when the amorphous phase in the alloy powder having the amorphous phase as a main phase is crystallized.

The B-H loops shown in FIG. 4 to FIG. 13 show that the bulk samples in Examples 1 to 2 have hard magnetic characteristics between those in the Comparative Examples 1 or 2 and those in Comparative Example 3. No evident steps were observed in the I-H loops in Examples 1 and 2.

Figure 14:
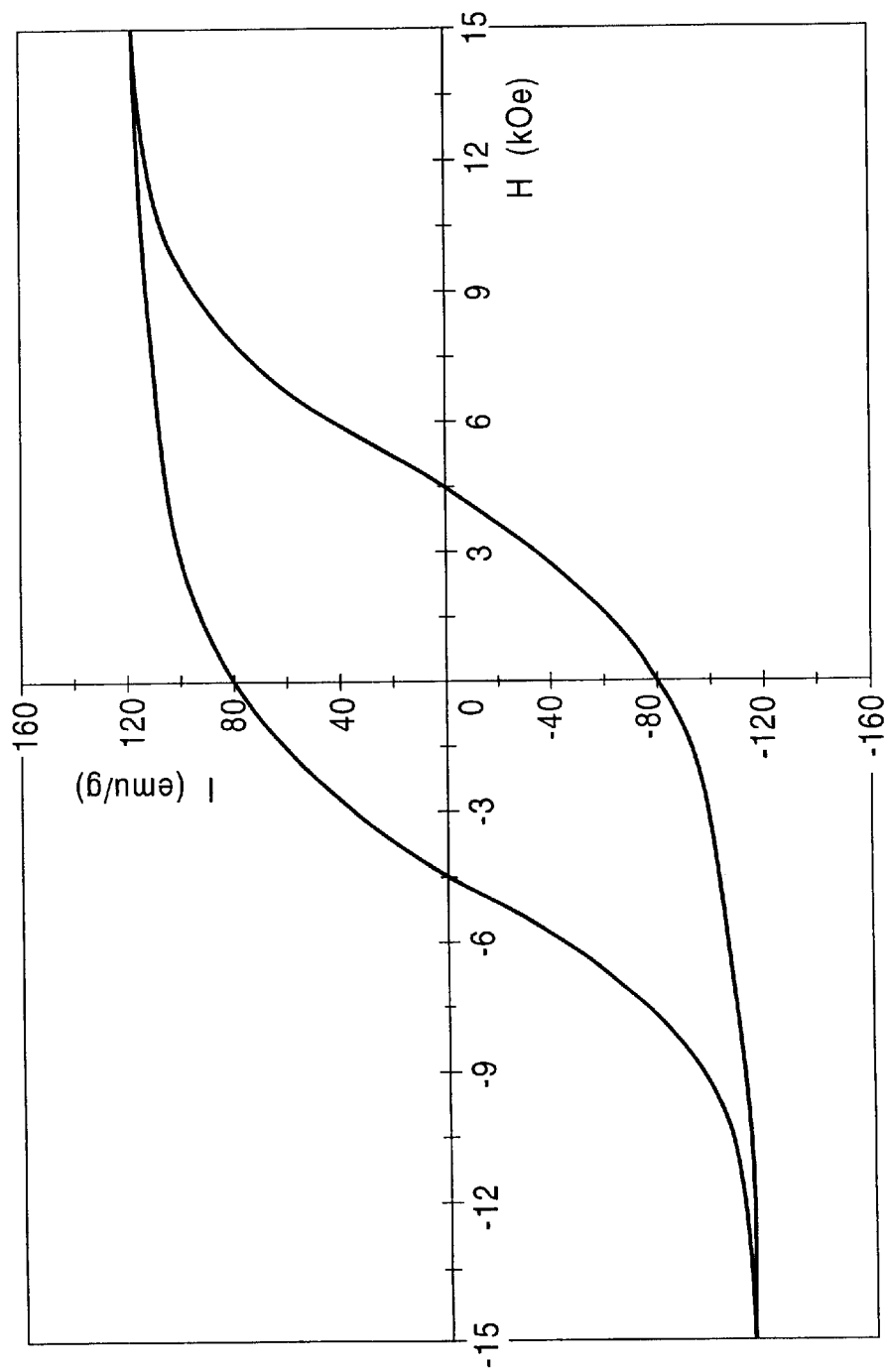
FIG. 14 is a graph showing an I-H loop obtained by a measurement of magnetization generated within the sample when an external magnetic field of −15 kOe to 15 kOe is applied along the Z-direction in the bulk sample in Example 1.
Figure 15:
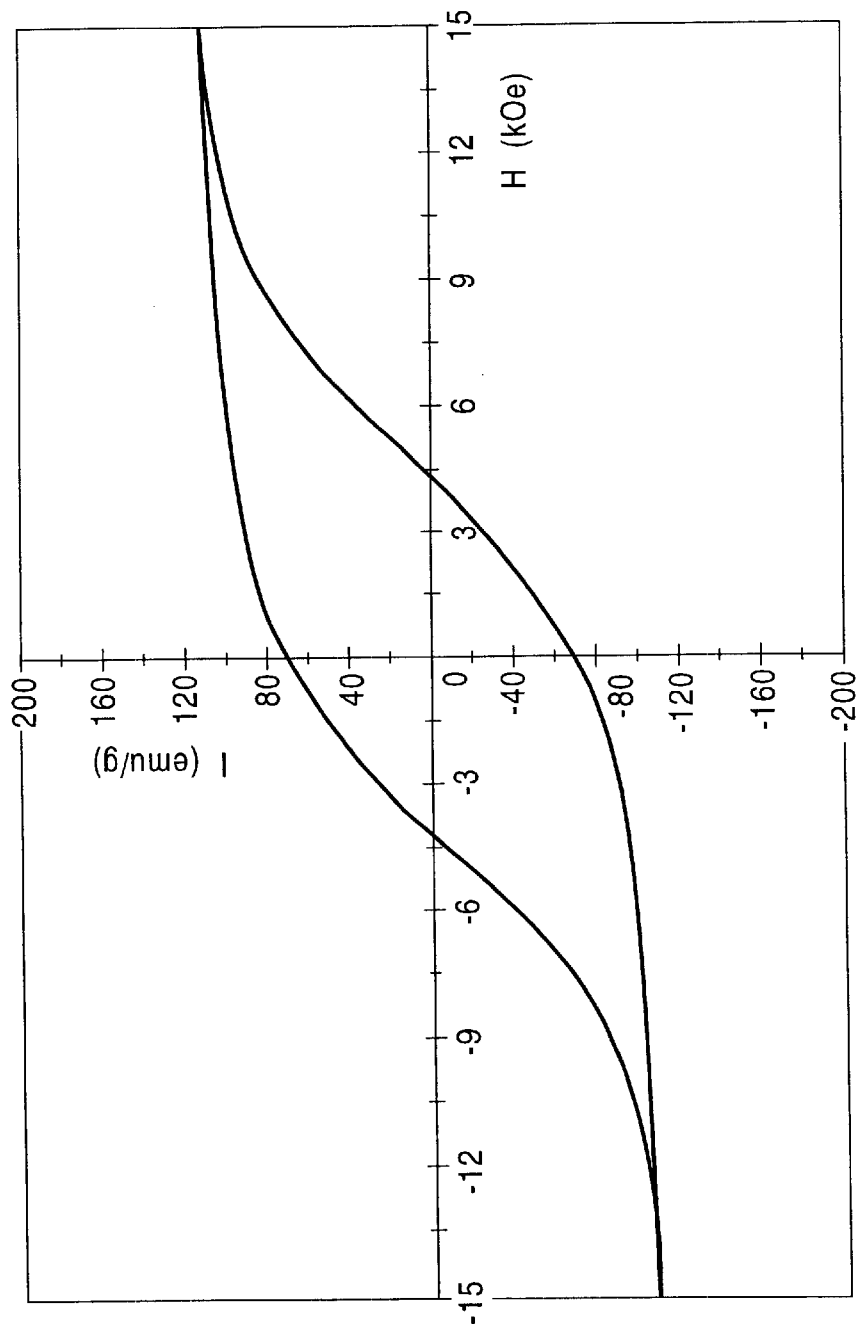
FIG. 15 is a graph showing an I-H loop obtained by a measurement of magnetization generated within the sample when an external magnetic field of −15 kOe to 15 kOe is applied along the X direction (the direction perpendicular to the Z-direction) in the bulk sample in Example 1.

The I-H loops obtained by measuring magnetization (I) generated in the sample with a sample vibration type magnetometer while applying an external magnetic field of −15 kOe to 15 kOe along the Z-direction of the bulk samples obtained in Example 1, and the I-H loops obtained by measuring magnetization (I) generated in the sample while applying an external magnetic field of −15 kOe to 15 kOe along the X-direction (the direction perpendicular to the Z-direction) of the bulk samples obtained in Example 1 are shown in FIG. 14 and FIG. 15, respectively.

Magnetic characteristics of the bulk samples in Example 1 along the Z-direction (the direction along the consolidation pressure impressing direction) and magnetic characteristics of the bulk samples along the X-direction (the direction perpendicular to the Z-direction) in Example 1 were measured at 300 K (room temperature), obtaining saturation magnetization (Is), remnant magnetization (Ir) of 0.98 T, remanence ratio (Ir/Is) of 0.68 and coercive force (iHc) of 4.35 kOe along the z-direction of 1.45 T; and saturation magnetization (Is) of 1.38 T, remnant magnetization (Ir) of 0.87 T, remanence ratio (Ir/Is) of 0.64 and coercive force (iHc) of 4.18 kOe along the X- direction.

These results show that there are no evident steps in the I-H loop in the bulk sample in Example 1, along with obtaining samples with the remanence ratio along either the Z- or X- direction of 0.6 or more. This is because the bulk sample in Example 1 comprises a texture having a FeCo phase, $Md_2Fe_{14}B$ phase, $Sm_2Co_{17}$ phase of the bcc structure and a balance of amorphous phases; fine crystalline phases with a mean crystal grain size of 100 nm or less are precipitated in the texture; and a mixed phase of a soft magnetic phase comprising the FeCo phase of the bcc structure and a hard magnetic phase comprising a $Nd_2Fe_{14}B$ phase and $Sm_2Co_{17}$ phase is formed; thereby forming a composite hard magnetic material ;exhibiting exchange coupling characteristics in which fine soft magnetic phase and hard magnetic phase are coupled.

Examples 3 and 4, Comparative Examples 4 and 5

Figure 16:
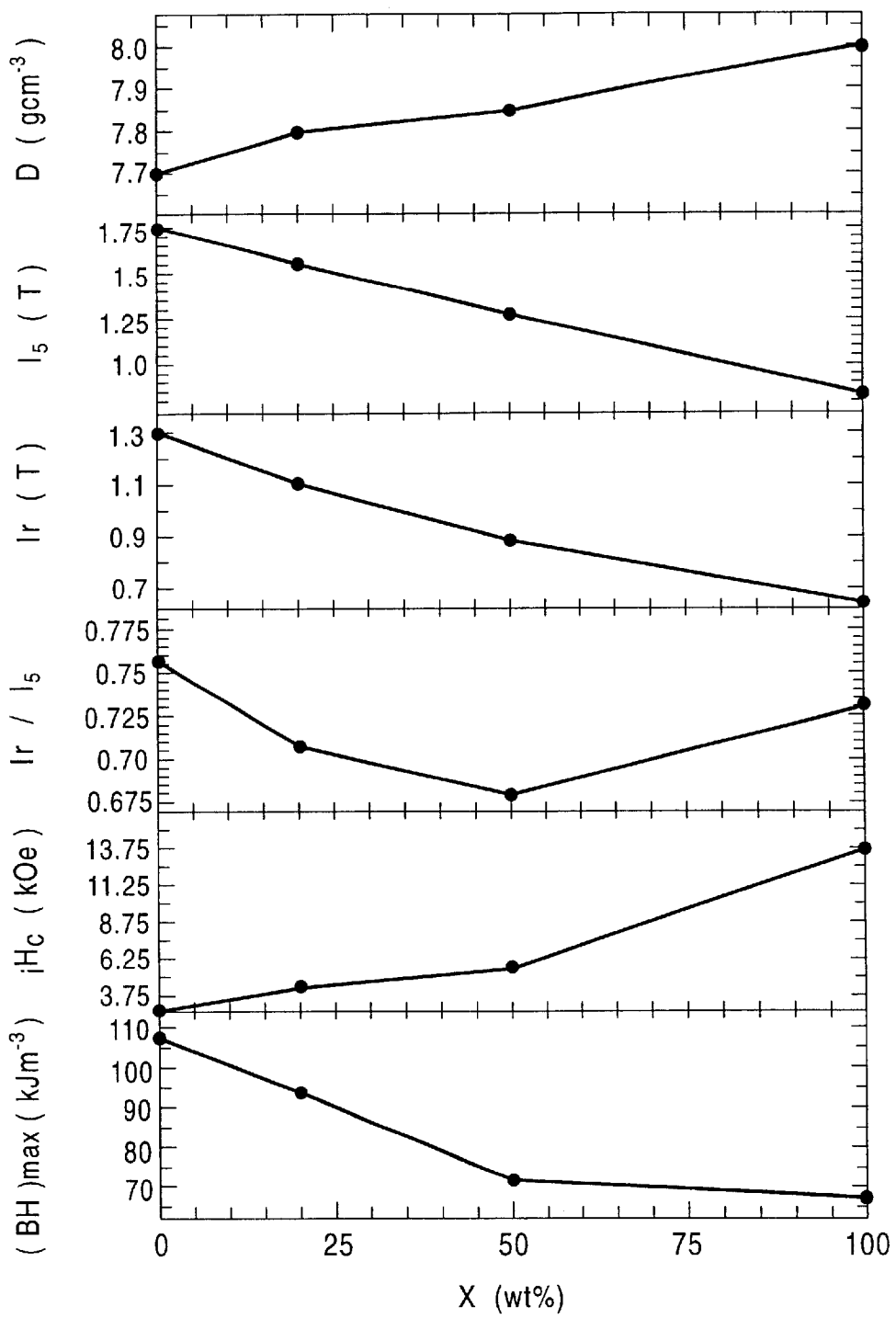
FIG. 16 is a graph showing the results of measurements of magnetic characteristics along the consolidation pressure impressing direction and density in the bulk sample in which the mixing ratio (weight ratio) between the first alloy powder comprising an amorphous phase as a principal phase and the second alloy powder comprising an amorphous phase as a principal phase is changed.

A compound with a composition of $Sm_{12}(Co_{60}Fe_{23})_{79}Nb_2B_7$ was used as a first alloy powder comprising an amorphous phase as a principal phase. A composite powder was prepared by mixing an alloy powder comprising an amorphous phase as a principal phase and having a composition of $Sm_{12}(Co_{60}Fe_{23})_{79}Nb_2B_7$, and an alloy powder comprising an amorphous phase as a principal phase and having a composition of $Fe_{73}Co_{15}Nb_2Nd_5B_5$, or the second alloy powder comprising an amorphous phase as a principal phase. Bulk samples were produced by the same method as in Example 1 but the mixing ratio between the first alloy powder comprising an amorphous phase as a principal phase and the second alloy powder comprising an amorphous phase as a principal phase was changed. Magnetic characteristics along the Z-direction (the consolidation pressure impressing direction) and densities of the bulk samples obtained were measure st 300 K (27° C.). The results are shown in FIG. 16. The I-H loops are shown in FIG. 17, which is obtained by measuring magnetization generated in the sample using a pulse magnetization measuring apparatus while applying an external magnetic field of −1000 kAm$^{-1}$ to zero kAm$^{-1}$ along the Z-direction of each bulk sample.

Figure 17:
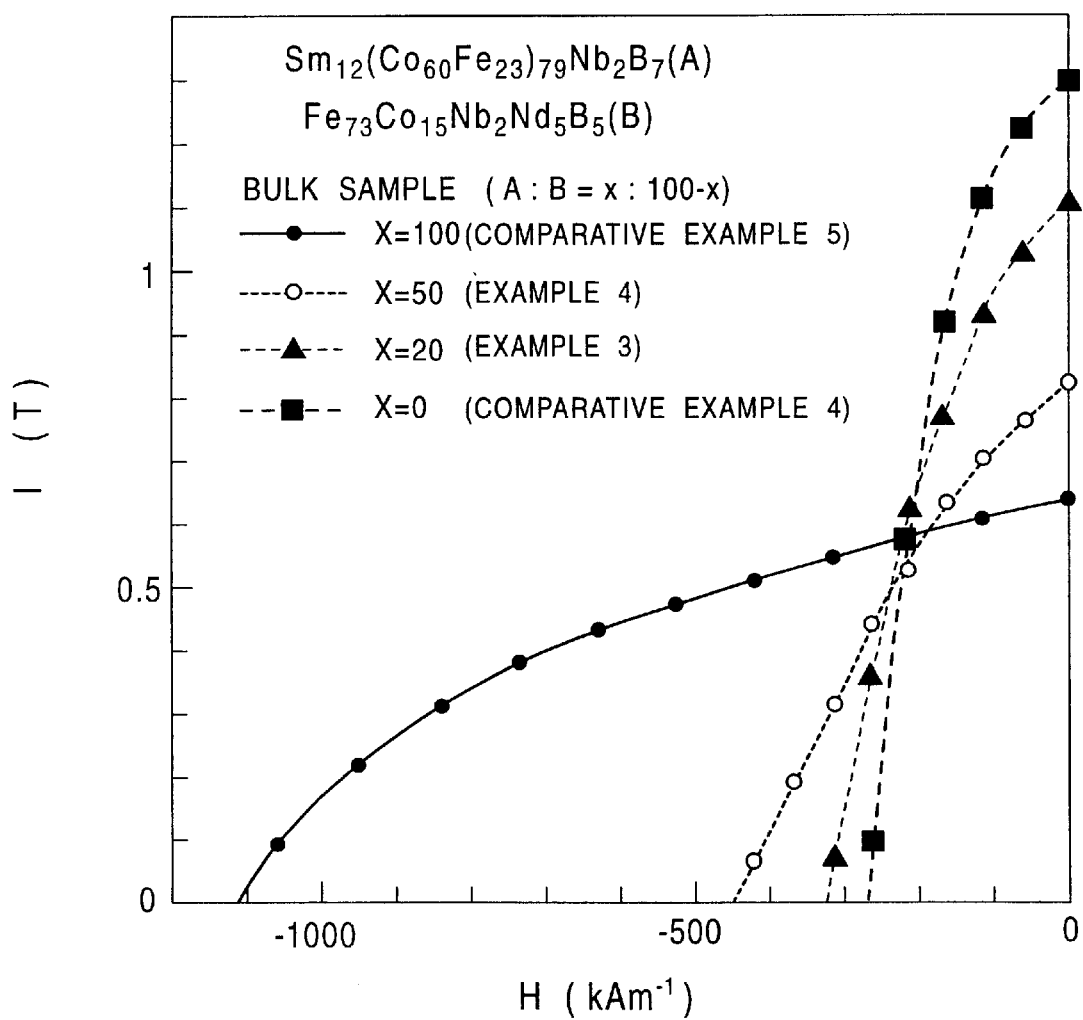
FIG. 17 is a graph showing the I-H loop obtained by the measurement of magnetization generated within the sample when a magnetic field is applied along the consolidation pressure impressing direction in the bulk sample in which the mixing ratio (weight ratio) between the first alloy powder comprising an amorphous phase as a principal phase and the second alloy powder comprising an amorphous phase as a principal phase is changed.

As are evident from FIG. 16 and FIG. 17, it can be recognized that hard magnetic characteristics can be changed by adjusting the mixing ration (weight ratio) between the first alloy powder comprising an amorphous phase as a principal phase and having a composition of $Sm_{12}(Co_{60}Fe_{23})_{79}Nb_2B_2f$ and the second alloy powder comprising an amorphous phase as a principal phase and having a composition of $Fe_{73}Co_{15}Nb_2Nd_5B_5$. On other words, the first alloy powder comprising an amorphous phase as a principal phase forms a phase with lower remnant magnetization (Ir) and higher coercive force (iHc) as compared with the second alloy powder comprising anamorphous phase as a principal phase, consequently the latter alloy powder being a phase with higher remnant magnetization (Ir) and lower coercive force (iHc). Desired hard magnetic characteristics can be obtained by adjusting the mixing ratio between these alloy powders. Especially, the bulk sample in which 20 wt % (% by weight) of the first amorphous powder and 80 wt % of the second amorphous powder were mixed (Example 3), and the bulk sample in which 50 wt % of the first amorphous powder and 50 wt % of the second amorphous powder were mixed (Example 4) were shown to have remnant magnetization of 0.6 T or more. remanence ratio of 0.675 or more and coercive force of 3.75 kOe or more. Accordingly, magnetization is easy and multipoles are easily formed when the composite hard magnetic materials according to the present invention are used for the constituting materials such as an angle sensor because they have appropriate coercive force, besides being able to provide a hard magnetic material with good magnetic property and high sensor output since remnant magnetization and remanence ratio are large.

Example 5

Figure 18:
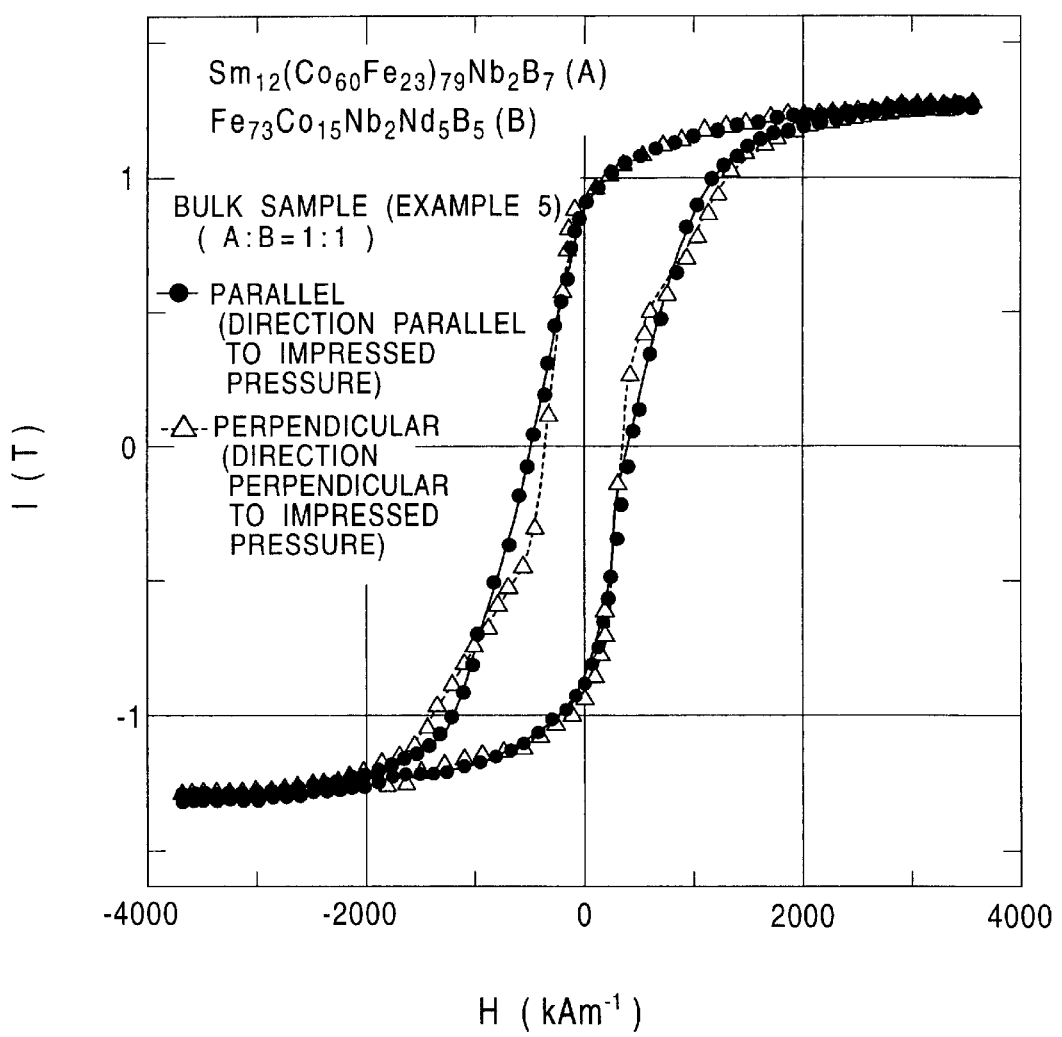
FIG. 18 is a graph showing the I-H loop obtained by the measurement of magnetization generated within the sample when a magnetic field is applied along the direction parallel to thee consolidation pressure impressing direction in the bulk sample in Example 5 in which the mixing ratio (weight ratio) between the first alloy powder comprising an amorphous phase as a principal phase and the second alloy powder comprising an amorphous phase is adjusted to 1:1, and the I-H loop obtained by the measurement of magnetization generated within the sample when a magnetic field is applied along the direction perpendicular to the consolidation pressure impressing direction in the foregoing bulk sample.

A compound with a composition of $Sm_{12}(Co_{60}Fe_{23})_{79}Nb_2B_7$ was used as the first alloy powder comprising an amorphous phase as a principal phase. A bulk sample (example 5) was obtained by the method as described in Example 1, except that a composite powder prepared by mixing the first alloy powder comprising an amorphous phase as a principal phase with the composition of $Sm_{12}(Co_{60}Fe_{23})_{79}Nb_2B_7$ and an alloy powder comprising an amorphous phase as a principal phase with a composition of $Fe_{73}Co_{15}Nb_2Nd_5B_5$, or the second alloy powder comprising an amorphous phase as a principal phase, in 1:1 in weight ratio was used. The I-H loop, obtained by measuring magnetization generated in the sample with a pulse magnetization measuring apparatus while applying an external magnetic field (H) of −4000 kAm$^{-1}$ to 4000 kAm$^{-1}$ along the Z-direction (the direction parallel to the consolidation pressure impressing direction; parallel) of the bulk sample, is shown in FIG. 18. The I-H loops, obtained by measuring magnetization generated in the sample with a pulse magnetization measuring apparatus while applying an external magnetic field (H) of −4000 kAm$^{-1}$ to 4000 kAm$^{-1}$ along the X-direction (the direction perpendicular to the consolidation pressure impressing direction; perpendicular) of the bulk sample, is also shown in FIG. 18.

Figure 19:
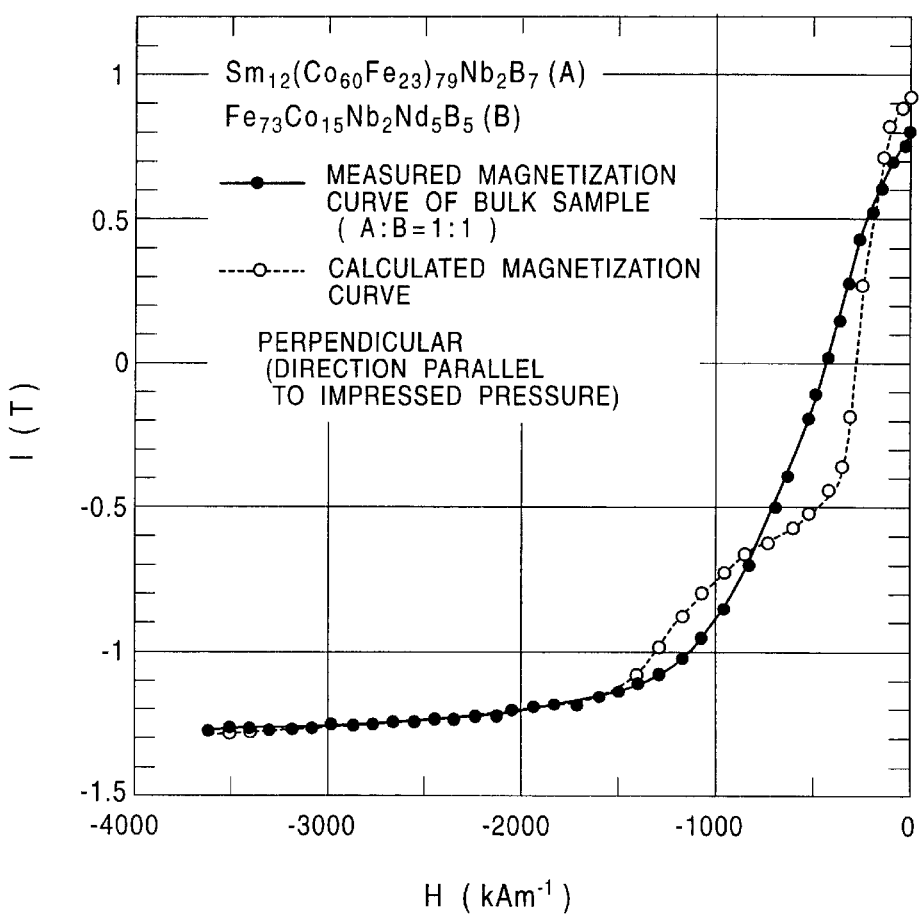
FIG. 19 is a magnified graph showing a demagnetization curve obtained by a measurement of magnetization generated within the sample when an external magnetic field is applied along the direction parallel to the consolidation pressure impressing direction on the bulk sample in Example 5 shown in FIG. 18, and a calculated demagnetization curve obtained from the magnetization curve of an original phase using the first alloy powder comprising an amorphous phase as a principal phase and the magnetization curve of an original phase using the second alloy powder having an amorphous as a principal phase.
Figure 20:
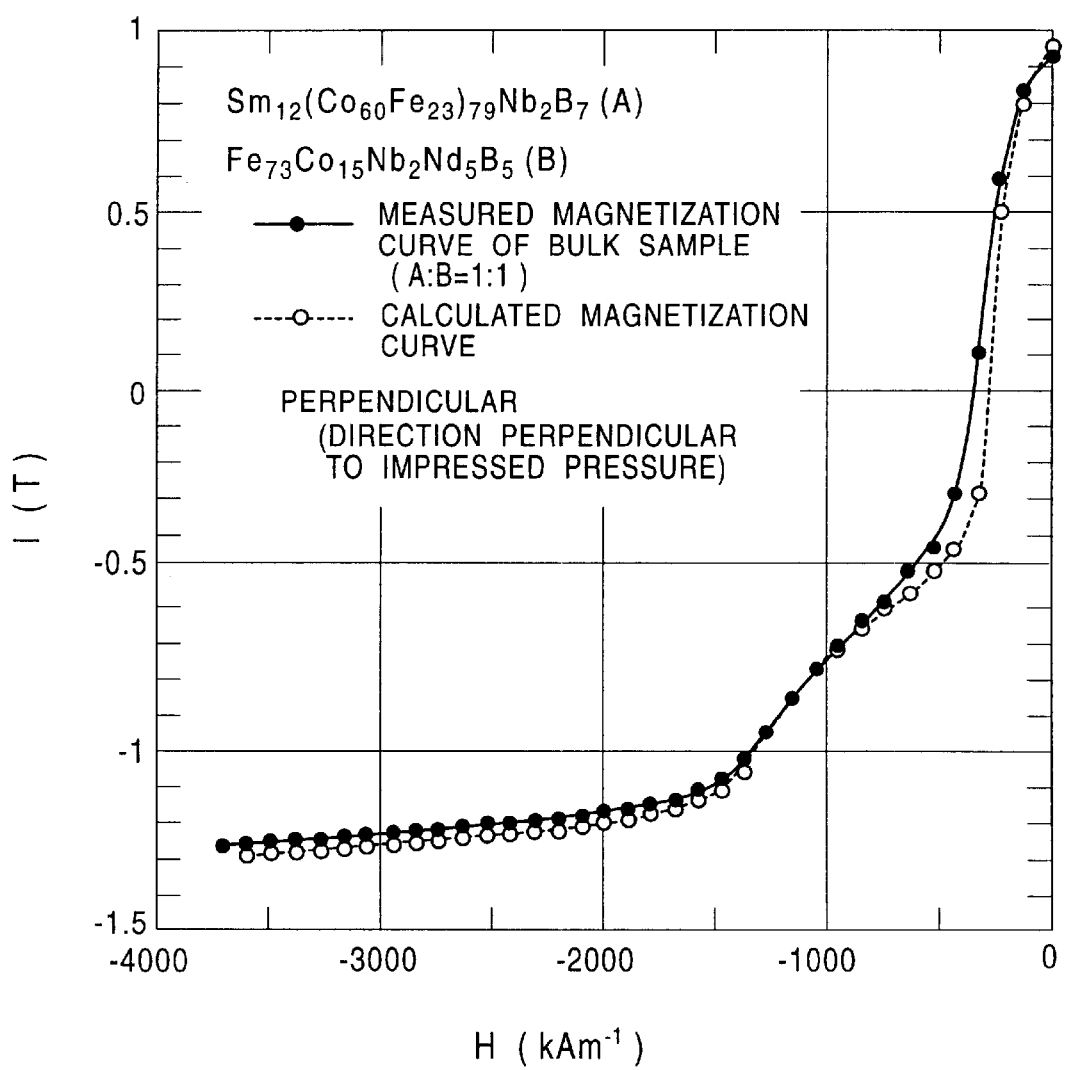
FIG. 20 is a magnified graph showing a demagnetization curve obtained by a measurement of magnetization generated within the sample when an external magnetic field is applied along the direction perpendicular to the consolidation pressure impressing direction on the bulk sample in Example 5 shown in FIG. 18, and a calculated demagnetization curve obtained from the magnetization curve of a phase using the first alloy powder having an amorphous phase as a principal phase as a starting material and the magnetization curve of a phase using the second alloy powder having an amorphous phase as a principal phase as a starting material.

The enlarged graphs of the measured demagnetization curves obtained by measuring magnetization generated in the sample while applying external magnetic field to the bulk samples in FIG. 18 along the direction parallel to the consolidation pressure impressing direction, and the enlarged graphs of the measured demagnetization curves obtained by measuring magnetization generated in the sample while applying external magnetic field to the bulk samples along the direction perpendicular to the consolidation pressure impressing direction are shown in FIG. 19 and FIG. 20.

FIG. 18 shows that the magnetization curve (I-H loop) measured along the Z-direction differs from the magnetization curve measured along the X-direction. It was also made clear from detailed investigations that the magnetization curves (B-H loop) also show the same tendency. The magnetization curves calculated from the magnetization curve of the phase made from the first alloy powder comprising an amorphous phase as a principal phase and from the magnetization curve of the phase made from the second alloy powder comprising an amorphous phase as a principal phase are also shown in FIG. 19 and FIG. 20. The calculated magnetization curves show configurations with steps, because the magnetization curves of the phases (x=100) made from the first alloy powder comprising an amorphous phase as a principal phase differ from the magnetization curves of the phases (x=0) made from the second alloy powder comprising an amorphous phase as a principal phase as shown in FIG. 17. While the magnetization curve measured along the X-direction has features that approximately coincide with features of the calculated magnetization curve as shown in FIG. 20, the magnetization curve measured along the Z-direction show a configuration without steps as shown in FIG. 19. It was also shown that higher coercive force is obtained when the magnetization curve is measured along the Z-direction than when the magnetization curve is measured along the X-direction, showing that the sample has excellent magnetic characteristics along the Z-direction.

Figure 21:
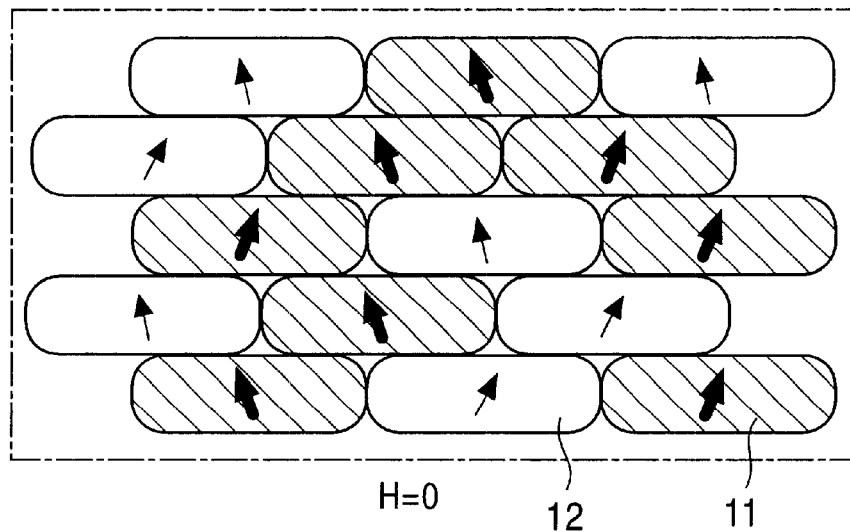
FIG. 21 shows an illustrative drawing of the magnetization state under a zero magnetic field when magnetization was measured by applying a magnetic field along the direction parallel to the consolidation pressure impressing direction in the bulk sample in Example 5.
Figure 22:
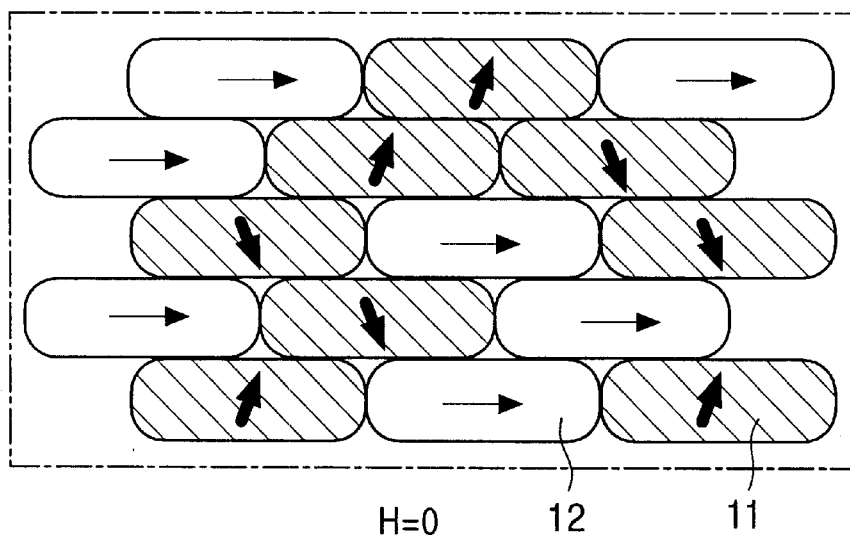
FIG. 22 an illustrative drawing of the magnetization state under a zero magnetic field when magnetization was measured by applying a magnetic field along the direction perpendicular to the consolidation pressure impressing direction in the bulk sample in Example 5.

Magnetization of the sample at zero magnetic field (H=0) is illustrated in FIG. 21 and FIG. 22, wherein the magnetic field generated in the sample was measured by applying a magnetic field along the direction parallel to the consolidation pressure impressing direction of the bulk sample.

Magnetization of the sample at zero magnetic field (H=0) is also illustrated in FIG. 22, wherein the magnetic field generated in the sample was measured by applying a magnetic field along the direction perpendicular to the consolidation pressure impressing direction of the bulk sample.

In FIG. 21 and FIG. 22, the reference numeral 11 denotes the phase made from the first alloy powder comprising an amorphous phase as a principal phase, which is referred to a high coercive force powder 11 hereinafter because it has higher coercive force than the phase made from the second alloy powder comprising an amorphous phase as a principal phase. Likewise, the reference numeral 12 denotes a phase made from the second alloy powder comprising an amorphous phase a principal phase, which is referred to a low coercive force powder 12.

These amorphous powders are made to be anisotropic along the consolidation pressure impressing direction. The anisotropic effect especially becomes obvious in the powder having high coercive force (high coercive force powder). When the magnetic field is applied along the direction parallel to the consolidation pressure impressing direction (Z-direction), magnetization of the phase in the high coercive force powder 11 is aligned relatively well along the consolidation pressure impressing direction even after the magnetic field has been removed, or when H is zero, as shown in FIG. 21. Since the phase in the high coercive force powder has a large magnetization component along the direction parallel to the impressed magnetic field due to anisotropy along the direction parallel to the consolidation pressure impressing direction, the magnetic field of the phase in the high coercive force powder is supposed to largely influence on (interact with) the phase in the low coercive force powder. In other word, the phase in the low coercive force powder is affected with the phase in the high coercive force powder to enhance coercive force, creating a magnetization curve without steps due to mutual interaction.

When the magnetic field is applied along the direction perpendicular to the consolidation pressure impressing direction (X-direction), on the contrary, magnetization of the phase in the high coercive force powder is not aligned well along the X-direction after removing the magnetic field, or when is zero as shown in FIG. 22. Accordingly, the phase in the low coercive force powder is affected with the magnetic field of the phase in the high coercive force powder merely along the X-direction. The component along the impressed magnetic field becomes small supposedly causing small interaction, making it difficult to obtain higher coercive force than the coercive force of the phase in the high coercive force powder 11. Steps as a difference between the magnetization curves of the high coercive force powder and low coercive force powder are thus naturally appeared.

As hitherto described, the composite hard magnetic alloy, is able to have excellent magnetic characteristics with high coercive force by being used by magnetizing along the direction parallel to the consolidation pressure impressing direction for compacting. Moreover, temperature characteristics are further improved since the low coercive force powder 12 is affected with the phase in the high coercive force powder 11 having good temperature characteristics.

Example 6, Comparative Examples 6 to 10

Figure 23:
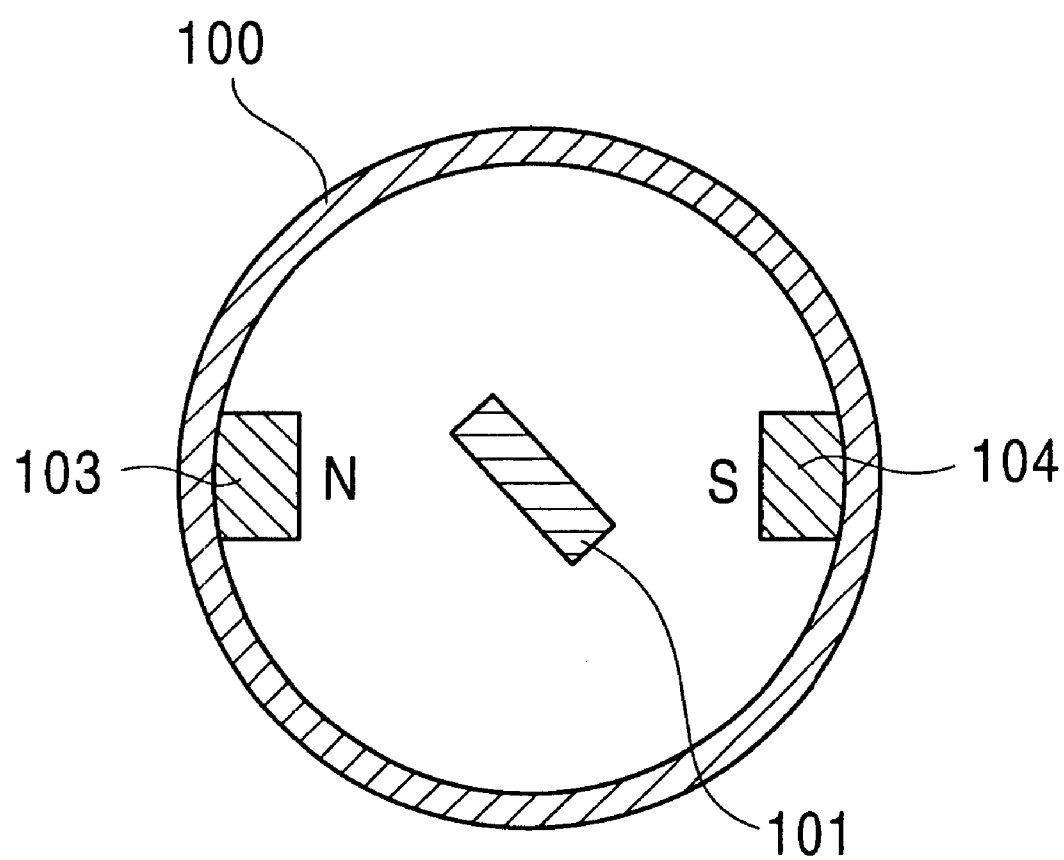
FIG. 23 shows an illustrative construction of the throttle valve sensor provided with the bulk sample comprising the hard magnetic material according to the present invention.

Bulk samples comprising the hard magnetic materials with compositions as shown in TABLE 3 below were produced by the foregoing method. Temperature characteristics of the output of the throttle valve sensor (throttle position sensor) equipped with the produced bulk sample as shown in FIG. 23 was measured. The magnet to be used in the throttle valve sensor with an alignment as shown in FIG. 23 is designed to have a permeance coefficient of 5 to 10. The rate of temperature change of characteristics was measured by increasing the atmospheric temperature from room temperature to 80° C. and by decreasing from 120° C. to room temperature. The results are shown in TABLE 3 together.

The throttle valve sensor as used herein is provided with a shaft (not shown) rotating by interlocking with the throttle valve (not shown), a back yoke member holding the shaft in freely-rotatable manner, a magnetic field sensing element (for example a Hall element) 101 accommodated in the back yoke member 100 and disposed in confronting relation to the end of the shaft, a first magnet 103 attached to the end of the shaft and forming a magnetic field, and a second magnet 104 disposed in confronting relation to the first magnet 103.

When the shaft is rotated by interlocking with the throttle valve in the throttle valve sensor having such construction, the first magnet 103 rotates relative to the magnetic field sensing element 101. Since the magnetic field of the parallel magnetic flux including the magnetic field sensing element 101 varies in response to the relative rotation against the sensing element, output signals corresponding to the rotation of the shaft are generated from the magnetic field sensing element 101. When the face of the magnet 103 confronting the magnetic field sensing element 101 is magnetized as N-pole, the face of the magnet 104 confronting the magnetic field sensing element 101 is magnetized as S-pole.

Figure 24:
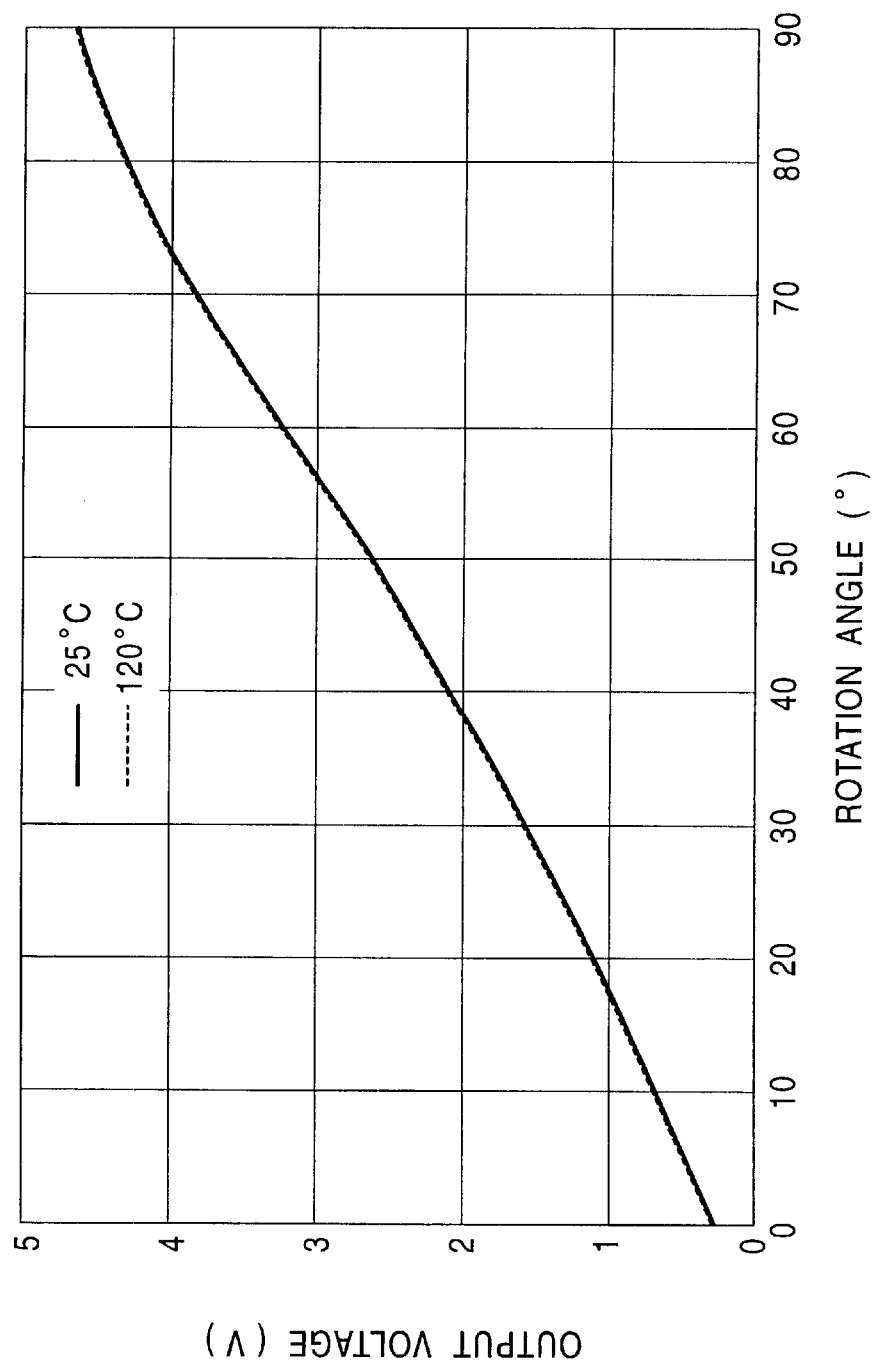
FIG. 24 is a graph showing an example of an output of the throttle valve sensor provided with the bulk sample comprising the hard magnetic material according to the present invention.

FIG. 24 shows an example of output of the throttle valve sensor using the bulk sample comprising the composite hard magnetic material according to the present invention. The vertical axis and horizontal axis in FIG. 24 represent the output voltage (V) and rotation angle (°), respectively. When the magnet 103 and sensing element 103 rotates relatively with each other, the output voltage linearly increases in response to the rotation angle. The solid line in FIG. 24 denotes an example of the output voltage curve at 25° C. while the broken line denotes an example of the output voltage curve at 120° C. When temperature characteristics of the magnet change in accordance with the change of the operation temperature, errors are caused in the output voltage sensing results to make it difficult to sense the degree of opening of the throttle with high precision.

TABLE 3

| | Composition of bulk sample | Aging (magnetic aging) condition | Output at room temperature (V) | Temperature change rate α (%/° C.) | |
|---|---|---|---|---|---|
| | | | | (Room temperature to 80° C.) | (Room temperature to 120° C.) |
| Comparative example 6 | $Fe_{89}Nb_2Nd_4B_5$ | 120° C.-2 hrs. | 3.428 | −0.04 | −0.064 |
| Comparative example 7 | $Fe_{73}Co_{15}Nb_2Nd_5B_5$ | 130° C.-2 hrs. | 4.277 | −0.020 | −0.044 |
| Comparative example 8 | $Fe_{73}Co_{15}Nb_2Nd_5B_5$ | 150° C.-2 hrs. | 3.21–3.395 | −0.013 to −0.04 | −0.044 to −0.065 |
| Example 6 | Composite hard magnetic material $Sm_{12}(Co_{60}Fe_{23})_{79}Nb_2B_7$ : $Fe_{73}Co_{15}Nb_2Nd_5B_5 = 1:1$ | 150° C.-2 hrs. | 3.257 | −0.034 | −0.034 |
| Comparative example 9 | $Sm_{12}(Co_{60}Fe_{23})_{79}Nd_2B_7$ | 150° C.-2 hrs. | 3.3 | −0.023 | −0.023 |
| Comparative example 10 | $SmCo_5$ Bond magnet | 130° C.-2 hrs. | 4.0 | −0.027 | −0.027 |

The bulk sample in Example 6 in TABLE 3 corresponds to nano-composite Fe—M—B magnets comprising $Fe_{89}Nb_2Nd_4B_5$. The bulk samples in Comparative Examples 7 and 8 correspond to the bulk samples in which Fe in the composition of the material constituting the bulk sample in Comparative Example 6 is substitute d with Co, which comprises $Fe_{73}Co_{15}Nb_2Nd_4B_5$. The bulk sample in Comparative Example 9 corresponds to a nano-composite Sm—Co magnet comprising $Sm_{12}(Co_{60}Fe_{23})_{79}Nb_2B_7$.

The bulk sample in Example 6 comprises the composite hard magnetic material according to the present invention prepared by mixing the first alloy powder comprising an amorphous phase as a principal phase with a composition of $Sm_{12}(Co_{66}Fe_{23})_{79}Nb_2B_7$ and the second alloy powder containing the amorphous phase with a composition of $Fe_{73}Co_{15}Nb_2Nd_4B_5$ in 1:1 ratio, followed by consolidating. The bond magnet in Comparative Example 10 is prepared by adding a powder with a composition of $SmCo_5$ into a resin, followed by mixing and consolidating. The bond magnet in Comparative Example 10 is a magnet that has been used in the throttle valve sensor.

The aging condition in TABLE 3 was used in applying a heat treatment at an upper limit temperature to be used for the magnet after magnetization (so called magnetic aging).

Output levels at room temperature shown in TABLE 3 correspond to the voltage (V) measured at a rotation angle of 90° when the magnet stabilized by respective aging conditions after magnetization is attached to the throttle valve sensor.

The rate of temperature change α (%/° C.) was determined from the following equation using an output voltage of 2.5 (V) as a reference level:

$$\alpha(\%/° C.) = ((\Delta V_T - \Delta V_{room})/(T - T_{room}))$$

wherein $\Delta V_T$ as used herein corresponds to the value obtained by subtracting the reference output voltage of 2.5 (V) from the voltage $V_T$ (V) measured at an rotation angle of 90° at a temperature of T with the throttle position sensor, or from the equation of $\Delta V_T = V_T$ (V)$-2.5$ (V). $\Delta V_{room}$ corresponds to the value obtained by subtracting the reference output voltage of 2.5 (V) from the voltage $V_T$ (V) measured at an rotation angle of 90° at room temperature of $T_{room}$ with the throttle position sensor, or from the equation of $\Delta V_{room} = V_{room}$ (V)$-2.5$ (V). The $SmCo_5$ bond magnet that has been used in the throttle position sensor owing to its small rate of temperature change generally has a rate of temperature change a (%/° C.) of $-0.03$ to $-0.04$ (%/° C.).

As shown in TABLE 3, the rate of temperature change a (%/° C.) from room temperature to 80° C. is $-0.04$ (%/° C.) or less on any of the bulk samples in Comparative Examples 6 to 10 and in Example 6, indicating that they have excellent temperature characteristics.

It was confirmed from the comparison of the sample in Comparative Example 7 with the sample in Comparative Example 8 that the bulk sample in Comparative Example 8 that has been subjected to aging at high temperature is more improved in temperature characteristics. This is considered to be the result of sufficient magnetic aging. It is also evident from the comparison of the samples in Examples 6 and 7 with the sample in Comparative Example 9 that substituting with Co improves temperature characteristics.

When the rate of temperature change α (%/° C.) from room temperature to 120° C. is compared among the samples in Comparative Examples 6 to 10 and Example 6, the rate of temperature change α (%/° C.) shows no deterioration in the $SmCo_5$ bond magnet while the rate of temperature change α (%/° C.) of the bulk samples in Comparative examples 6 to 8 becomes $-0.04$ (%/° C.) or more, indicating that the bulk sample in Comparative Examples 6 to 8 could hardly show temperature characteristics comparative to the conventional $SmCo_5$ bond magnet.

The bulk sample in Example 6 as one embodiment of the composite hard magnetic material according to the present invention as well as the bulk sample in Comparative example 9 show no deterioration of the rate of temperature change against temperature change of from room temperature to 120° C., the rate of temperature change α (%/° C.) of the bulk sample in Example 6 being as small as $-0.034$. This result indicate that the composite hard magnetic material according to the present invention has excellent temperature characteristics comparative to the $SmCo_5$ bond magnet.

As is evident from the results shown in TABLE 3 and FIG. 24, the bulk sample in Example 6 prepared by mixing the first alloy powder comprising an amorphous phase as a principal phase with a composition of $Sm_{12}(Co_{60}Fe_{23})_{79}Nb_2B_7$ and the second alloy powder having the amorphous phase with a composition of $Fe_{73}Co_{15}Nb_2Nd_5B_5$ as a primary phase in 1:1 ratio has a smaller rate of temperature change of output signals along with having excellent temperature characteristics as compared with the bulk samples in Comparative Example 6 using the alloy powder comprising an amorphous phase as a principal phase with a composition of $Fe_{89}Nb_2Nd_4B_5$ or the bulk samples in Comparative Examples 7 and 8 using the powder alloy having the amorphous phase with a composition of $Fe_{73}Co_{15}Nb_2Nd_5B_5$.

Although the bulk samples in Comparative Examples 9 and 10 have better temperature characteristics than the bulk sample in Example 6, the former is more expensive than the bulk sample in Example 6 because the content of Sm in the former is higher than in the latter. Accordingly, the bulk sample in Example 6 as the composite hard magnetic material according to the present invention is excellent in temperature characteristics while suppressing to be expensive.

The texture of the phase originating from the first alloy powder material comprising an amorphous phase as a principal phase in the bulk sample prepared by consolidating the first alloy powder comprising an amorphous phase as a principal phase, and the texture of the phase originating from the second alloy powder material comprising an amorphous phase as a principal phase in the bulk sample prepared by consolidating the second alloy powder comprising an amorphous phase as a principal phase were observed under a transmittance type electron microscope (TEM).

Figure 25:
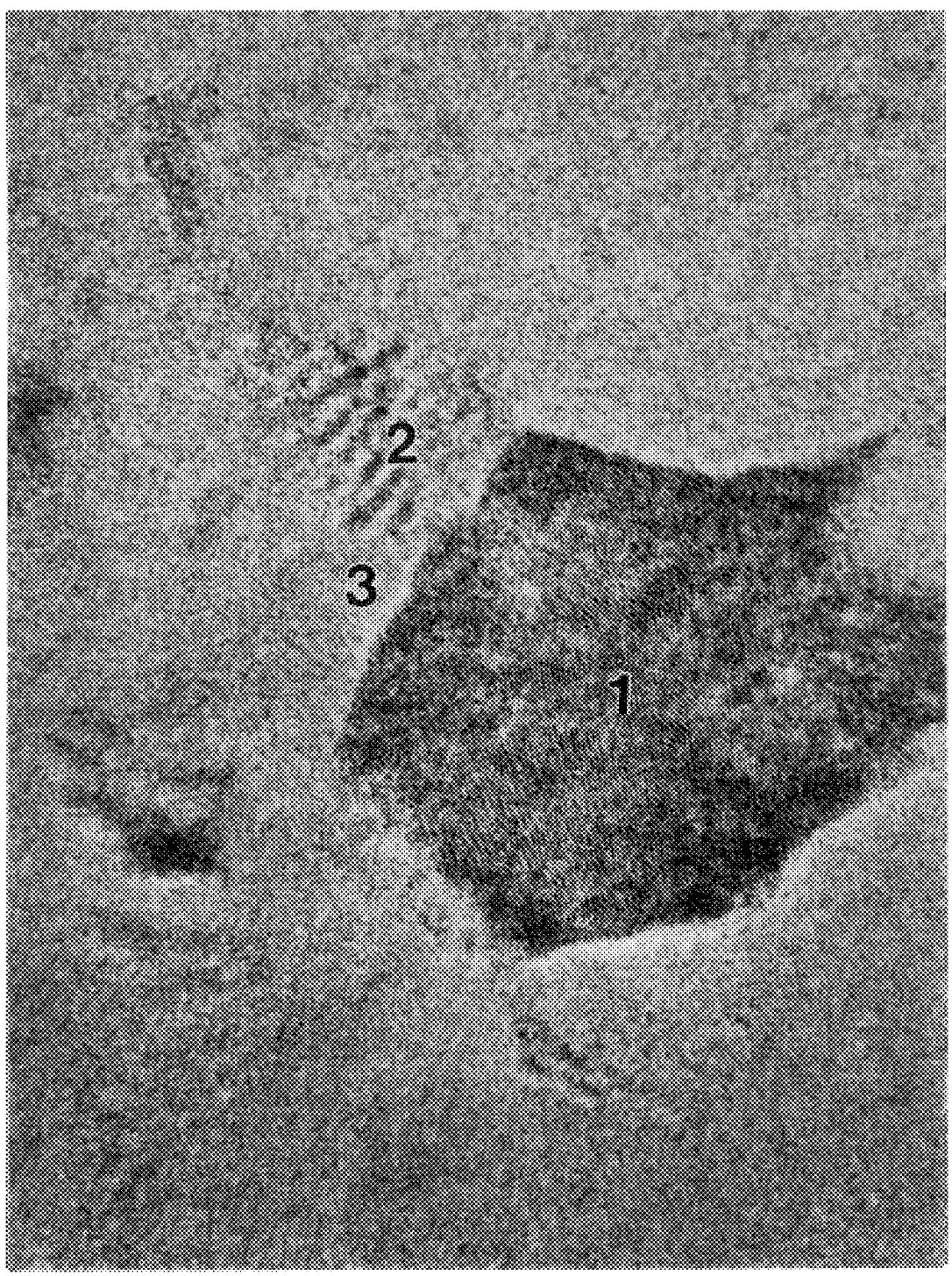
FIG. 25 is a TEM photograph showing the metallic texture of the sample obtained by consolidating a first alloy powder comprising an amorphous phase as a principal phase with a composition of $Sm_{12}(CO_{60}Fe_{23})_{79}Nb_2B_7$.
Figure 26:
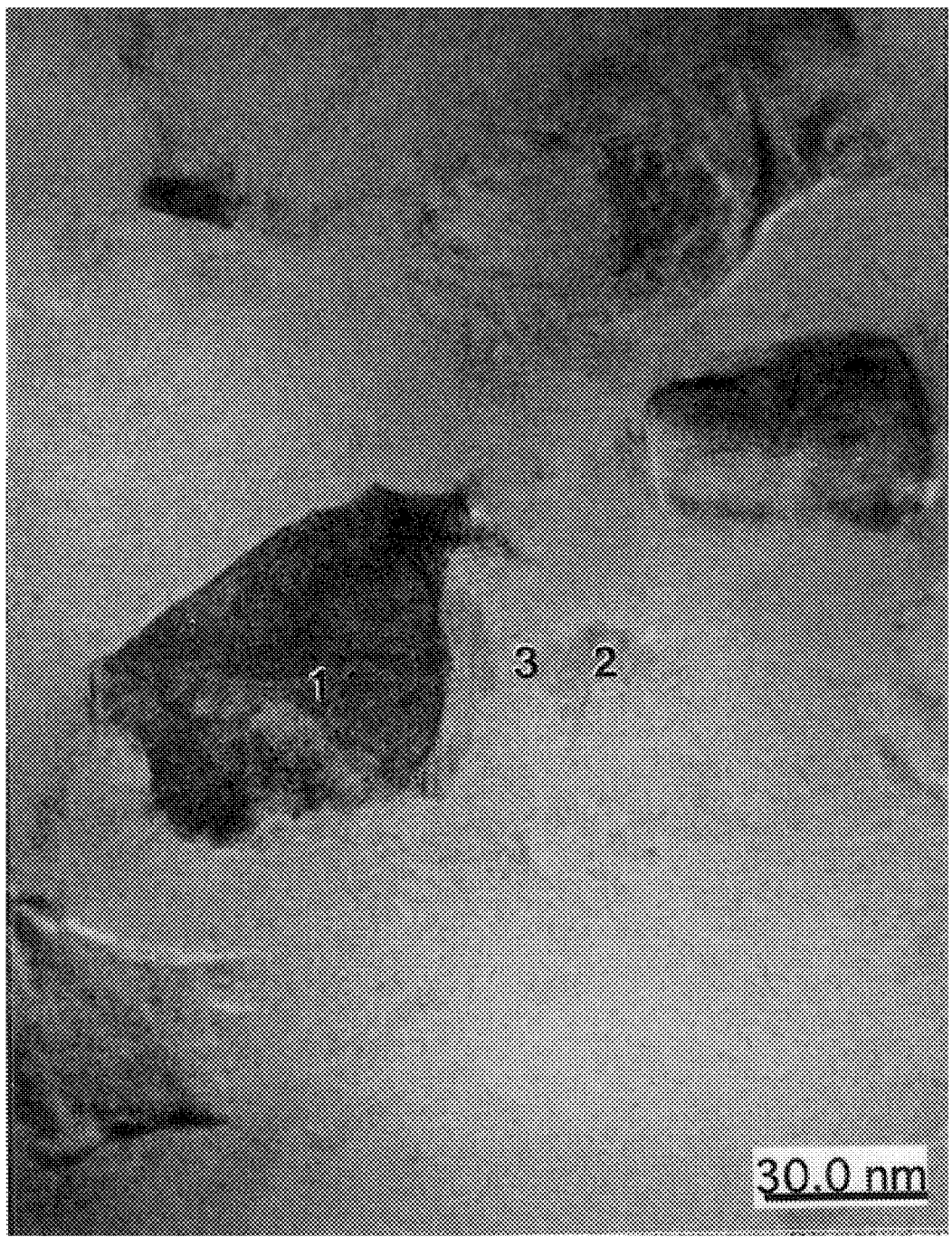
FIG. 26 is a TEM photograph showing the metallic texture of the sample obtained by consolidating a first alloy powder comprising an amorphous phase as a principal phase with a composition of $Sm_{12}(CO_{60}Fe_{23})_{79}Nb_2B_7$.
Figure 27:
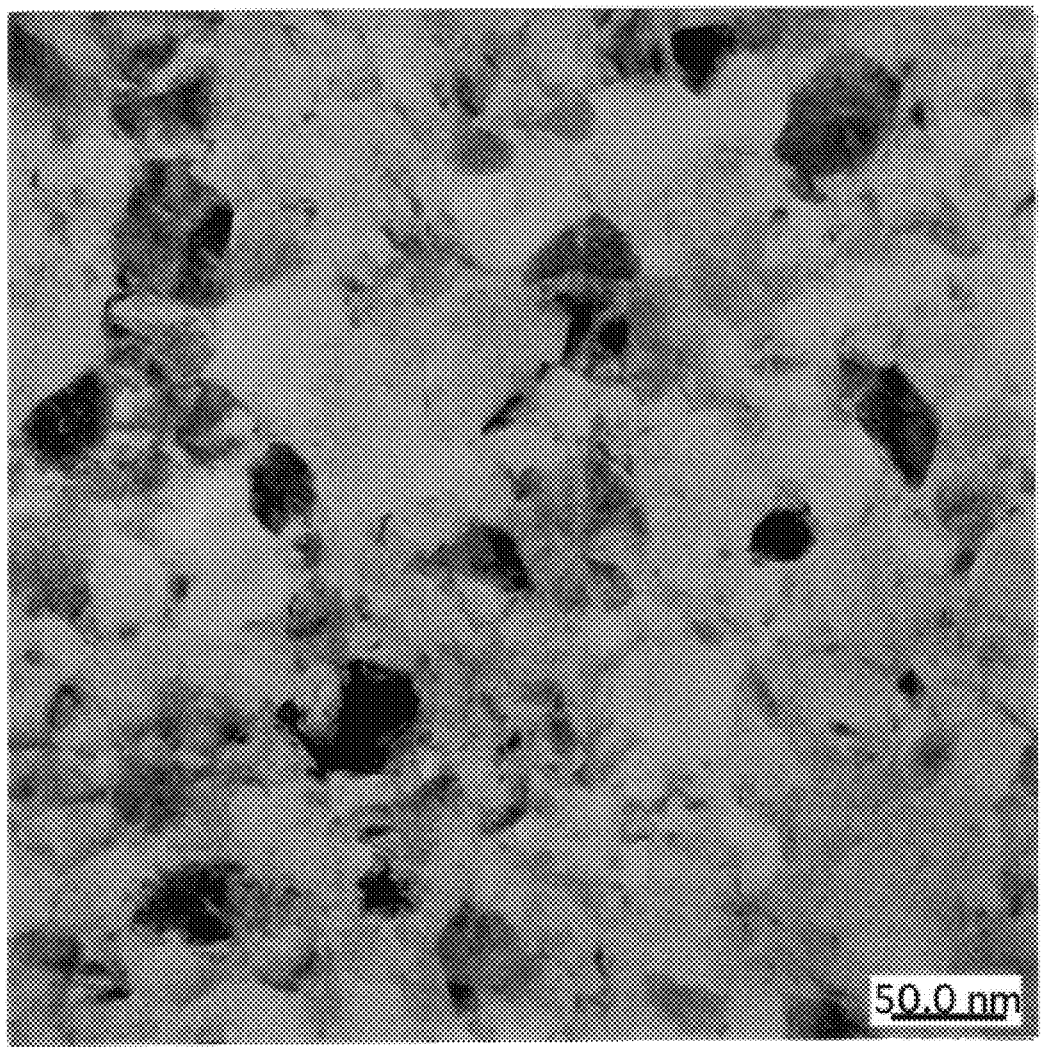
FIG. 27 shows a TEM photograph showing the metallic texture of the sample obtained by consolidating a first alloy powder comprising an amorphous phase as a principal phase with a composition of $Sm_{12}(CO_{60}Fe_{23})_{79}Nb_2B_7$, wherein magnification of TEM observation was changed.

FIG. 25 to FIG. 27 show TEM photographs of the metallic textures of the samples prepared by consolidating the first alloy powder comprising an amorphous phase as a principal phase with a composition of $Sm_{12}(Co_{60}Fe_{23})_{79}Nb_2B_7$, which were produced by the same method as producing the bulk sample in Example 6.

Atomic arrangement configuration near the spots indicated by numerals 1, 2 and 3 in FIG. 25 was analyzed by electron diffraction. The results are shown in FIG. 28 to FIG. 30.

Figure 28:
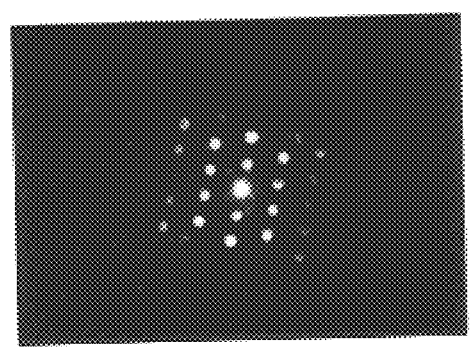
FIG. 28 shows the result of electron diffraction of the crystal 1 in FIG. 25.
Figure 29:
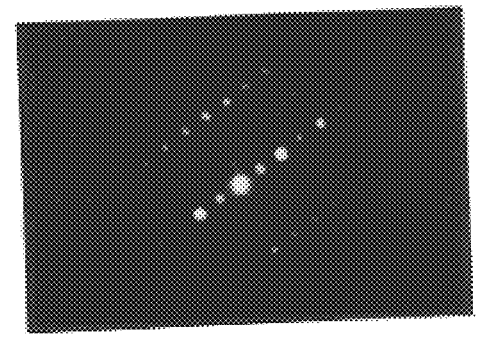
FIG. 29 shows the result of electron diffraction of the crystal 2 in FIG. 25.
Figure 30:
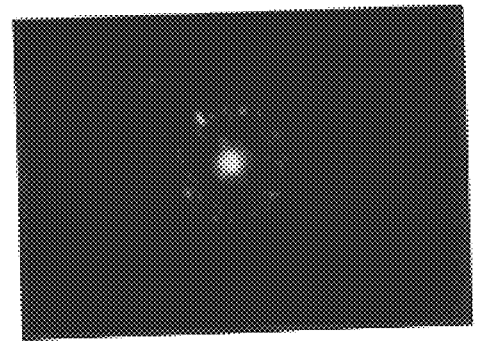
FIG. 30 shows the result of electron diffraction of the amorphous phase 3 in FIG. 25.

As is evident from distribution of electron diffraction spots in FIG. 28 to FIG. 30, it can be seen that the sites near the numerals 1 and 2 are in crystalline state while the site near the numeral 3 is in amorphous state. The crystal grain size of to the crystal (crystal 1) at near the numeral 1 and the crystal grain size of the crystal (crystal 2) at near the numeral 2 were about 60 nm and about 20 nm, respectively. The crystal 1 is supposed to be grown prior to the crystal 2 because the crystal 1 has a larger crystal grain size than the crystal 2.

The compositions of the crystal 1, crystal 2 and amorphous phase 3 were analyzed by energy-dispersive X-ray diffraction method (EDS: Energy Dispersive Spectrometry). The results are shown in TABLE 4.

TABLE 4

| Analysis site | Fe (Atomic %) | Co (Atomic %) | Sm (Atomic %) | Nb (Atomic %) |
|---|---|---|---|---|
| Crystal 1 | 23.0 | 64.6 | 12.1 | 0.3 |
| Crystal 2 | 27.4 | 62.8 | 8.0 | 1.8 |
| Amorphous phase 3 | 9.6 | 72.4 | 13.8 | 4.2 |

It can be understood from TABLE 4 that the crystals 1 and 2 are composed of $(Fe, Co)_{17}Sm_2$ phase as a hard magnetic phase. It is also evident from the comparison of the crystals 1 and 2 with the amorphous phase 3 that Nb is concentrated at the amorphous portion.

Figure 31:
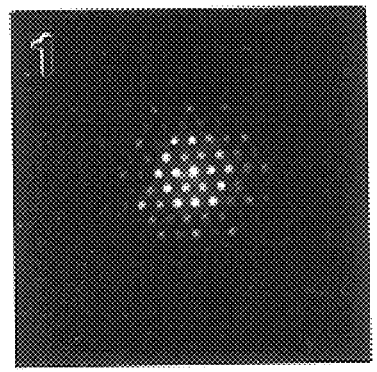
FIG. 31 shows the result of electron diffraction of the hard magnetic phase 1 in FIG. 26.
Figure 32:
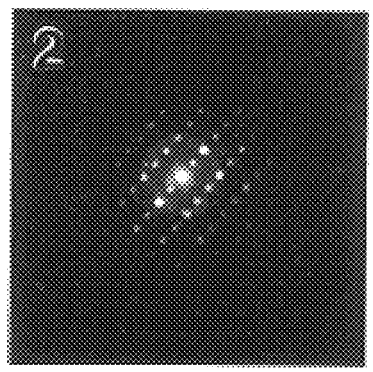
FIG. 32 shows the result of electron diffraction of the hard magnetic phase 1 in FIG. 26.
Figure 33:
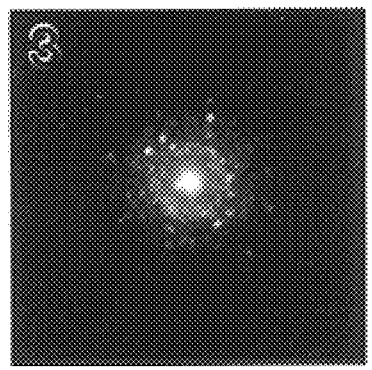
FIG. 33 shows the result of electron diffraction of the amorphous phase 1 in FIG. 26.

Likewise, atomic arrangement configurations at near the numerals 1, 2 and 3 shown in FIG. 26 were analyzed by electron diffraction. The results are shown in FIG. 31 to FIG. 33.

It is clear from the distribution configuration of the electron diffraction spots that the vicinities of the cites with the numerals 1 and 2 are composed of $(Fe, Co)_{17}Sm_2$ as a hard magnetic phase while the vicinity of the cite with the numeral 3 is in amorphous state.

FIG. 27 shows a TEM photograph of the metallic texture, obtained by changing magnification, of a sample prepared by consolidating the first alloy powder comprising an amorphous phase as a principal phase with a composition of $Sm_{12}(Co_{60}Fe_{23})_{79}Nb_2B_7$.

Figure 34:
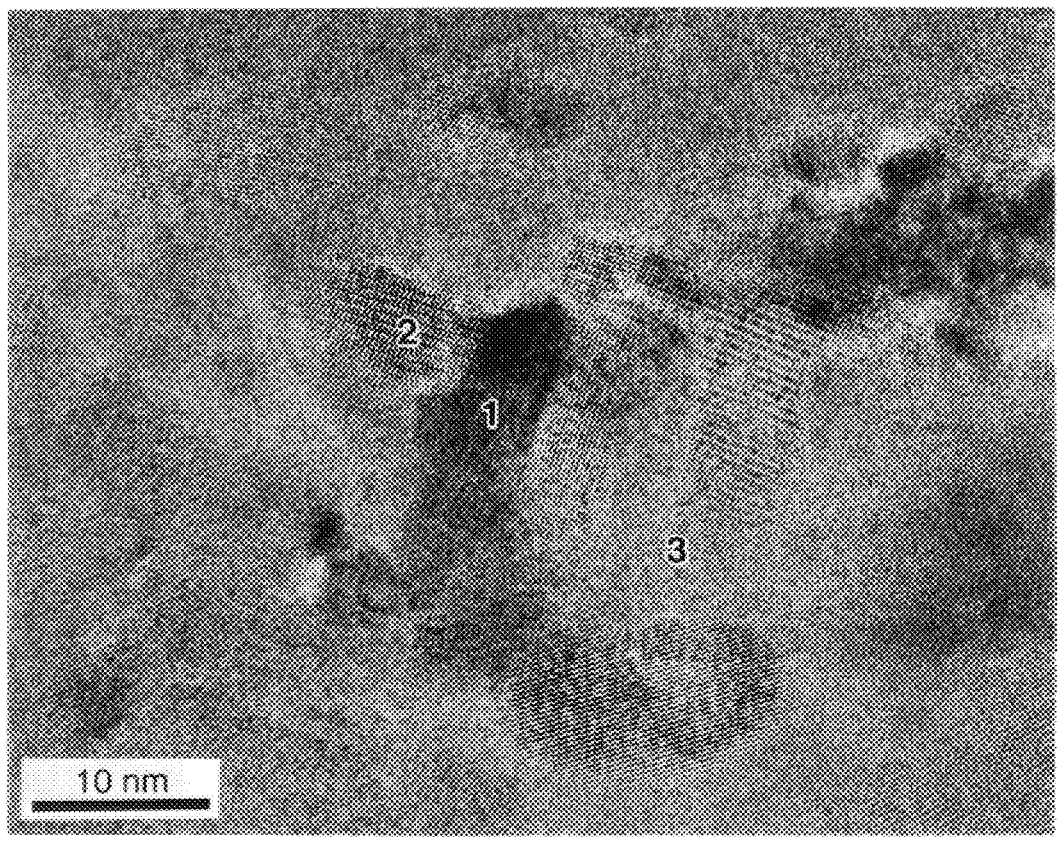
FIG. 34 shows a TEM photograph of the metallic texture of the sample obtained by consolidating the first alloy powder comprising an amorphous phase as a principal phase with a composition of $Sm_{12}(CO_{60}Fe_{23})_{81}Nb_2B_5$.
Figure 35:
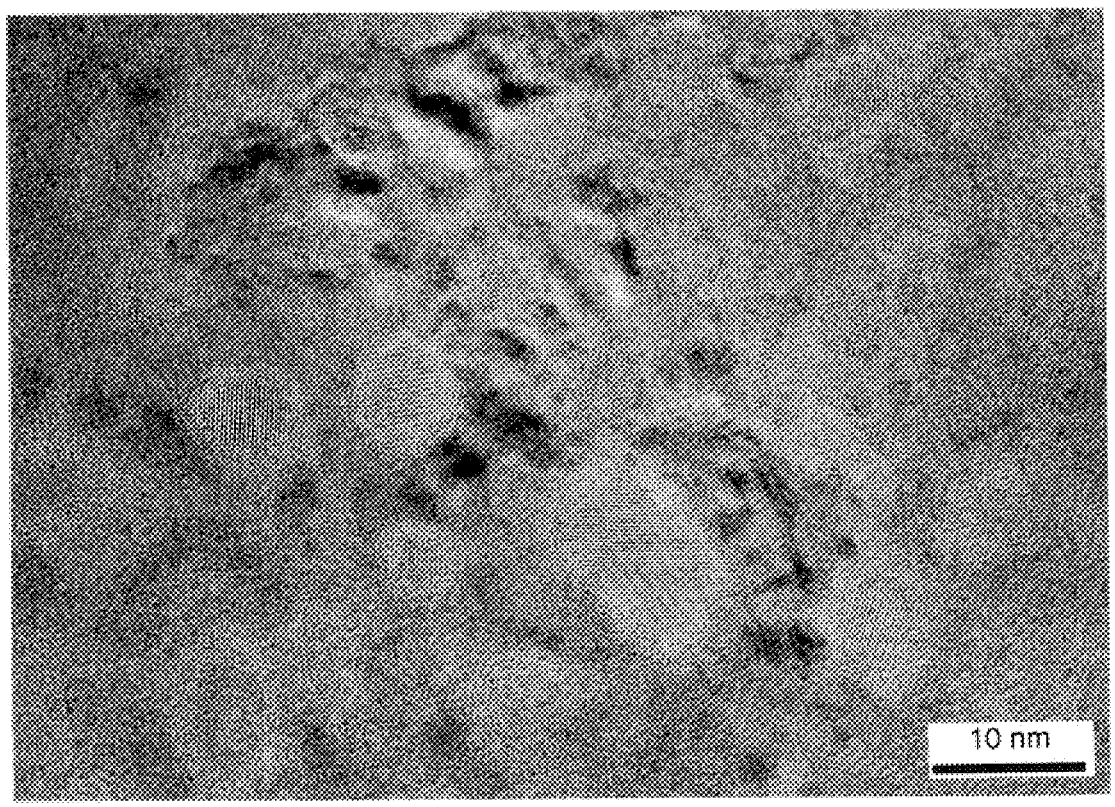
FIG. 35 shows a TEM photograph of the metallic texture of the sample obtained by consolidating the first alloy powder comprising an amorphous phase as a principal phase with a composition of $Sm_{12}(CO_{60}Fe_{23})_{81}Nb_2B_5$.

FIG. 34 and FIG. 35 show TEM photographs of the metallic texture of the samples prepared by consolidating the first alloy powder comprising an amorphous phase as a principal phase with a composition of $Sm_{12}(Co_{60}Fe_{23})_{81}Nb_2B_5$.

Atomic arrangement configurations at the cite near the numerals 1, 2 and 3 shown in FIG. 34 were analyzed by electron diffraction. The results are shown in FIG. 36 to FIG. 38.

Figure 36:
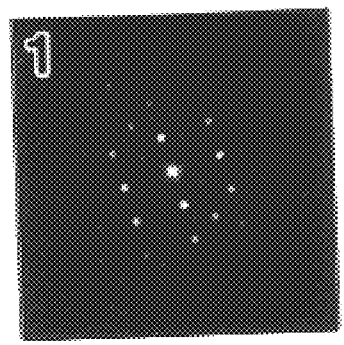
FIG. 36 shows the result of electron diffraction of the crystal 1 in FIG. 34.
Figure 37:
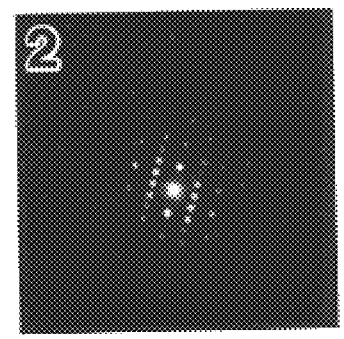
FIG. 37 shows a result electron diffraction of the crystal 2 in FIG. 34.
Figure 38:
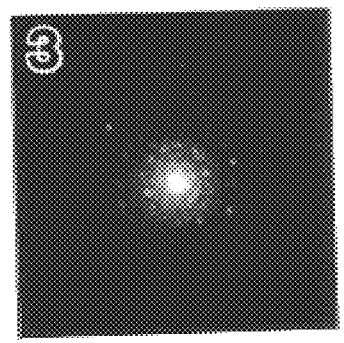
FIG. 38 shows a result electron diffraction of the crystal 3 in FIG. 34.

It is evident from the distribution configuration of the electron diffraction spots in FIG. 36 to FIG. 38 that the cite near the numeral 1 is a bcc-(Fe, Co) crystalline phase (crystal 1), the cite near the numeral 2 is a $(Fe, Co)_{17}Sm_2$ crystalline phase (crystal 2) and the cite near the numeral 3 is an amorphous phase. The both crystal grain sizes of the crystal 1 and crystal 2 were 10 nm.

FIG. 35 shows a TEM photograph of the metallic texture, obtained by changing magnification, of a sample prepared by consolidating the first alloy powder comprising an amorphous phase as a principal phase with a composition of $Sm_{12}(Co_{60}Fe_{23})_{81}Nb_2B_5$.

A ribbon sample comprising the alloy comprising an amorphous phase as a principal phase with a composition of $Sm_{12}(Co_{60}Fe_{23})_{79}Nb_2B_7$, produced by the same method as used in producing the bulk sample in Example 6, was heat-treated at a heat-treatment temperature (Ta) of 600° C., 700° C. and 800° C. with a heating rate of 3 K/min and heat treatment (Ta) holding time of 3 minutes in an image furnace under a reduced pressure of $5 \times 10^{-5}$ Pa. The result of X-ray diffraction analysis of the ribbon sample in which fine crystalline phases are precipitated is shown in FIG. 39.

Figure 39:
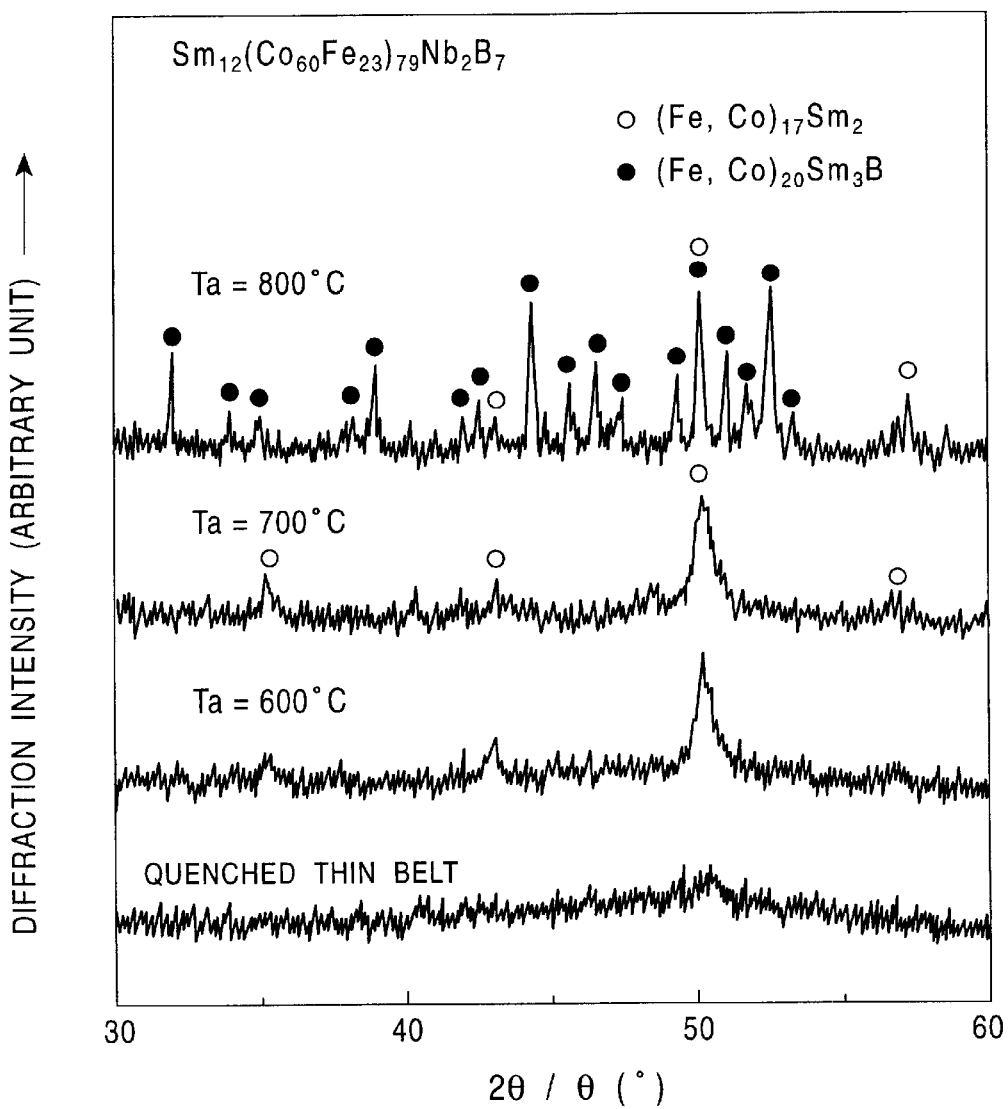
FIG. 39 shows the result of X-ray diffraction of the ribbon sample obtained by heat-treating the ribbon sample with a composition of $Sm_{12}(CO_{60}Fe_{23})_{79}Nb_2B_7$.
Figure 40:
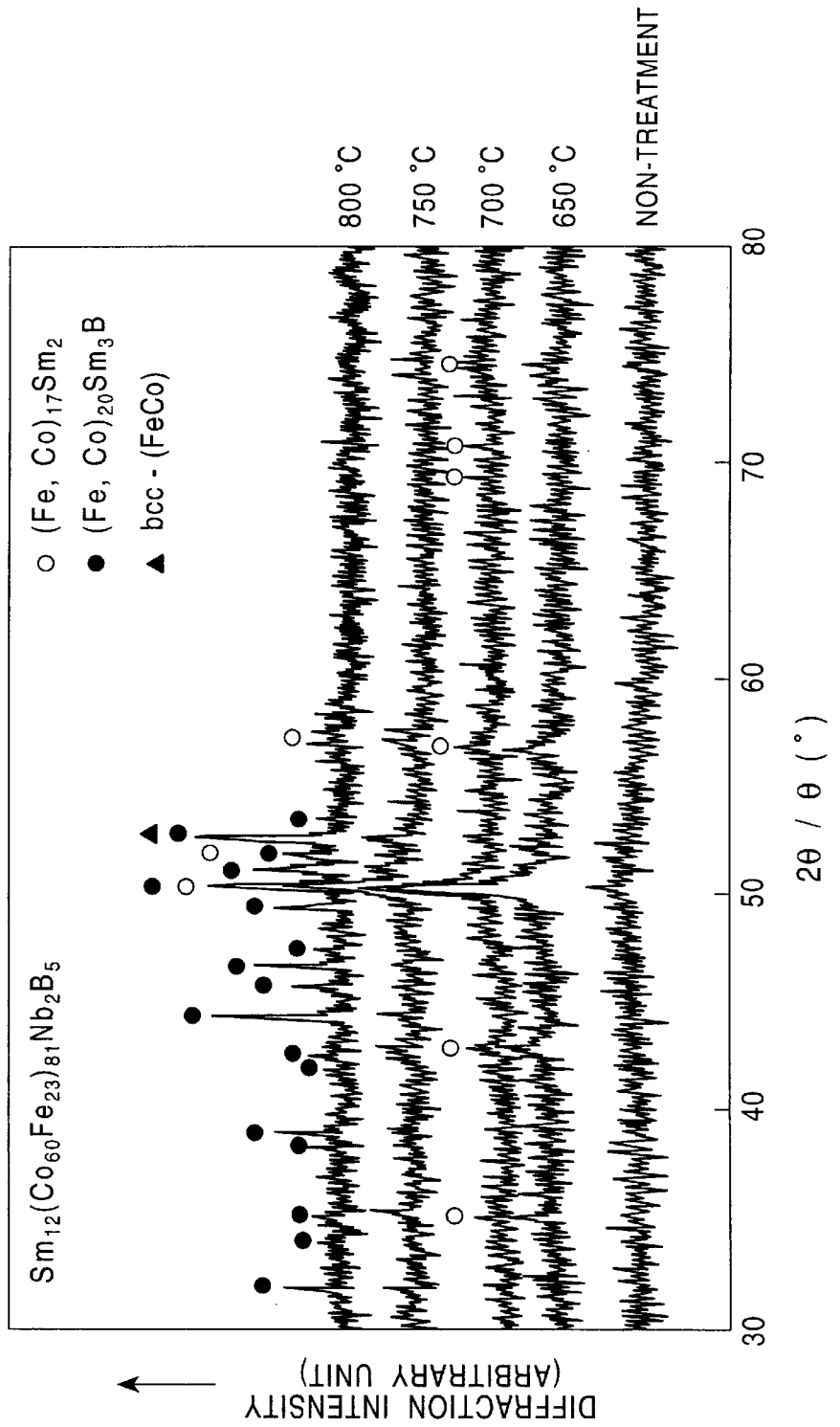
FIG. 40 shows the result of X-ray diffraction of the ribbon sample obtained by heat-treating the ribbon sample with a composition of $Sm_{12}(CO_{60}Fe_{23})_{81}Nb_2B_5$.

Diffraction peaks of $(Fe, CO)_{17}Sm_2$ are observed in the ribbon sample heat-treated at 600° C. as shown in FIG. 39. Diffraction peaks of $(Fe, Co)_{20}Sm_3B$ in addition to the diffraction peaks of $(Fe, Co)_{17}Sm_2$ are observed in the ribbon sample heat-treated at 800° C. While the diffraction peaks of the bcc-(Fe, Co) phase was not observed in the sample heat-treated at 700° C., the phase was sometimes observed in other composition systems, for example in heat-treated amorphous ribbon samples comprising $Sm_{12}(Co_{60}Fe_{23})_{81}Nb_2B_5$. Accordingly, magnetic characteristics are thought to be determined by exchange coupling at least among (Fe, Co)$_{17}$Sm$_2$ phase as a hard magnetic phase, (Fe, CO)$_{20}$Sm$_3$B phase as a soft magnetic phase, and bcc-(Fe, Co) phase or a balance of amorphous phases.

Figure 41:
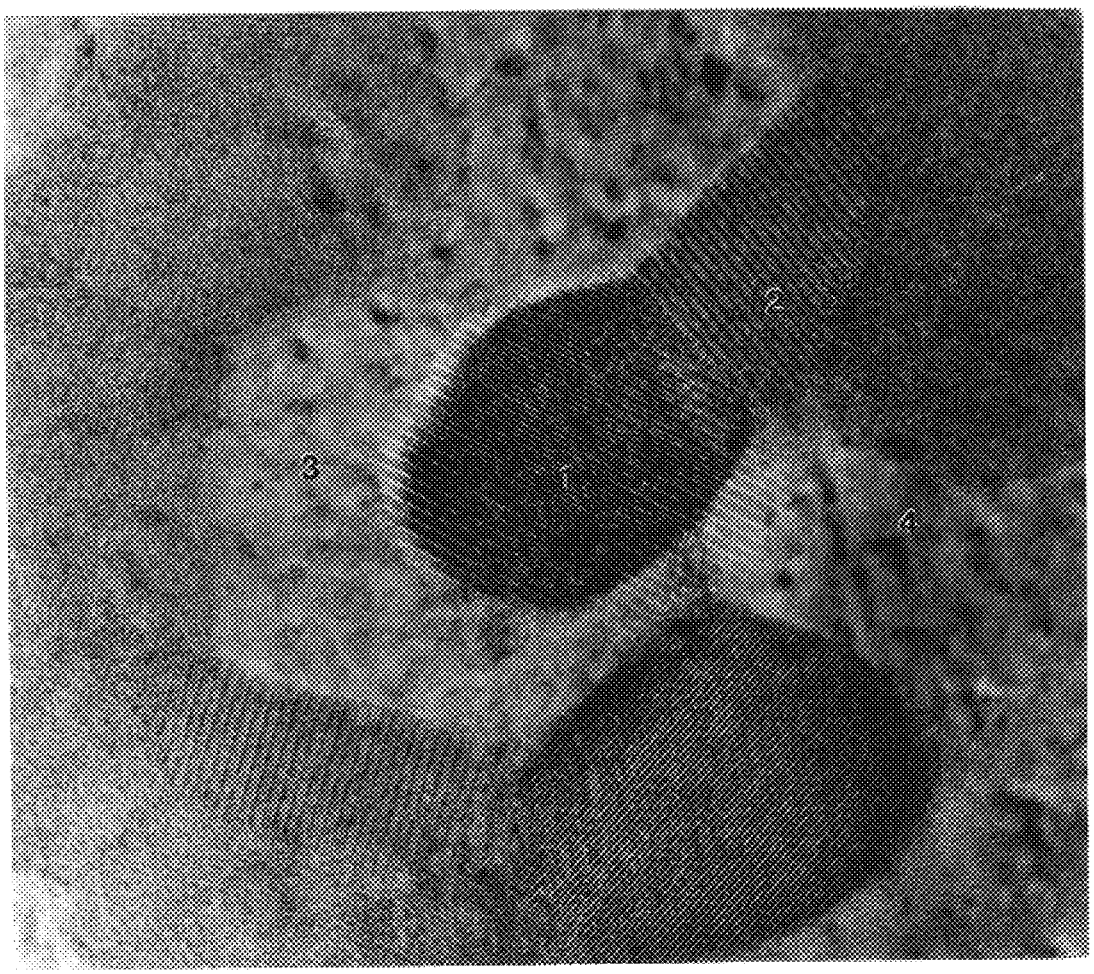
FIG. 41 shows a TEM photograph of the metallic texture of a sample obtained by consolidating a second alloy powder comprising an amorphous phase as a principal phase with a composition of $Fe_{86}Nb_2Pr_7B_5$.
Figure 42:
FIG. 42 shows a TEM photograph of the metal texture of a sample obtained by consolidating a second alloy powder comprising an amorphous phase as a principal phase with a composition of $Fe_{86}Nb_2Pr_5B_5$.
Figure 43:
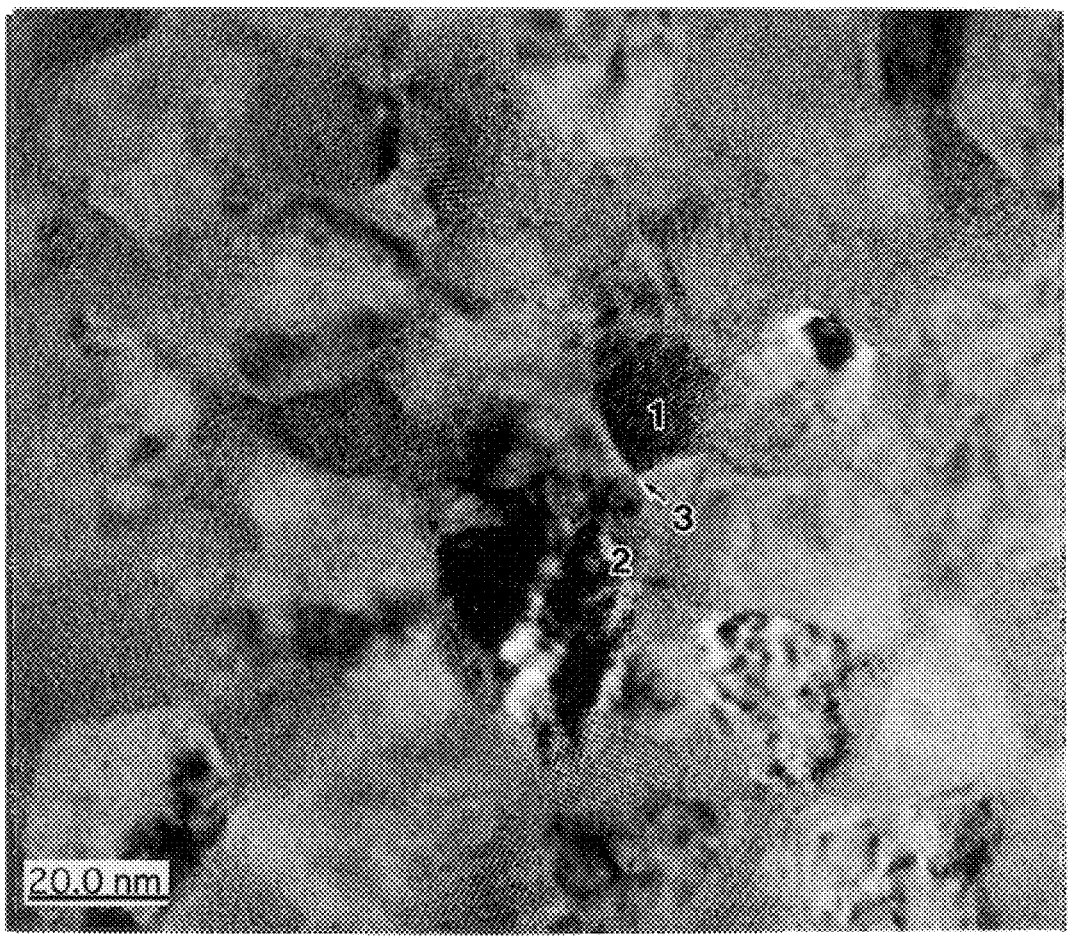
FIG. 43 shows a TEM photograph of the metal texture of a sample obtained by consolidating a second alloy powder comprising an amorphous phase as a principal phase with a composition of $Fe_{86}Nb_2Pr_5B_5$, wherein magnification for TEM observation was changed.
Figure 44:
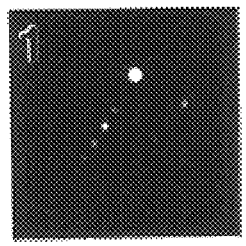
FIG. 44 shows the result of electron diffraction of the crystalline phase 1 in FIG. 41.
Figure 45:
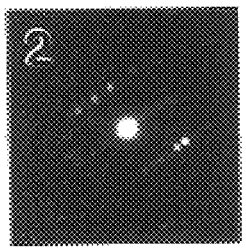
FIG. 45 shows the result of electron diffraction of the crystalline phase 2 in FIG. 41.
Figure 46:
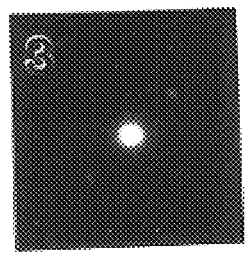
FIG. 46 shows the result of electron diffraction of the crystalline phase 3 in FIG. 41.
Figure 47:
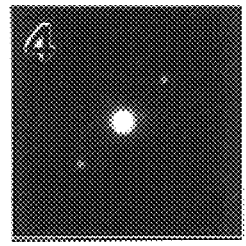
FIG. 47 shows the result of electron diffraction of the crystalline phase 4 in FIG. 41.

FIG. 41 is a TEM photograph of the metallic texture of the sample prepared, by approximately the same method as used in producing the bulk sample in Example 6, by consolidating the second alloy powder comprising an amorphous phase as a principal phase with a composition of $Fe_{86}Nb_2Pr_7B_5$. FIG. 42 and FIG. 43 are TEM photographs of the metallic texture of the sample prepared, by approximately the same method as used in producing the bulk sample in Example 6, by consolidating the second alloy powder comprising an amorphous phase as a principal phase with a composition of $Fe_{88}Nb_2Pr_5B_5$.

Atomic arrangement configurations at near the cites with the numerals 1, 2, 3 and 4 in FIG. 41 were analyzed by electron diffraction. The results are shown in FIG. 44 to FIG. 47.

It can be understood from the diffraction spot distribution configuration in FIG. 44 to FIG. 47 that the cites near the numerals 1, 2, 3 and 4 are in crystalline phases.

The compositions of the crystalline phase 1, and crystalline phase 3 were analyzed by energy-dispersive X-ray diffraction method (EDS: Energy Dispersive Spectrometry). The results are shown in FIG. 48 and FIG. 49.

Figure 48:
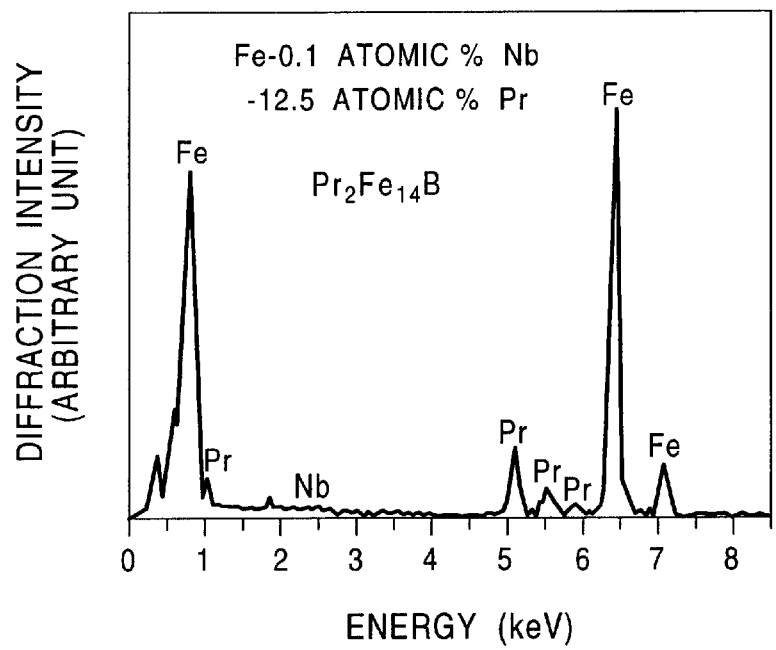
FIG. 48 shows the result of a composition analysis of the crystalline phase 1 in FIG. 41 by the energy-dispersive X-ray diffraction method.

As is evident from FIG. 48, the crystalline phase 1 comprises, like the crystalline phase 2, fine crystals of $Pr_2Fe_{14}B$ phase.

Figure 49:
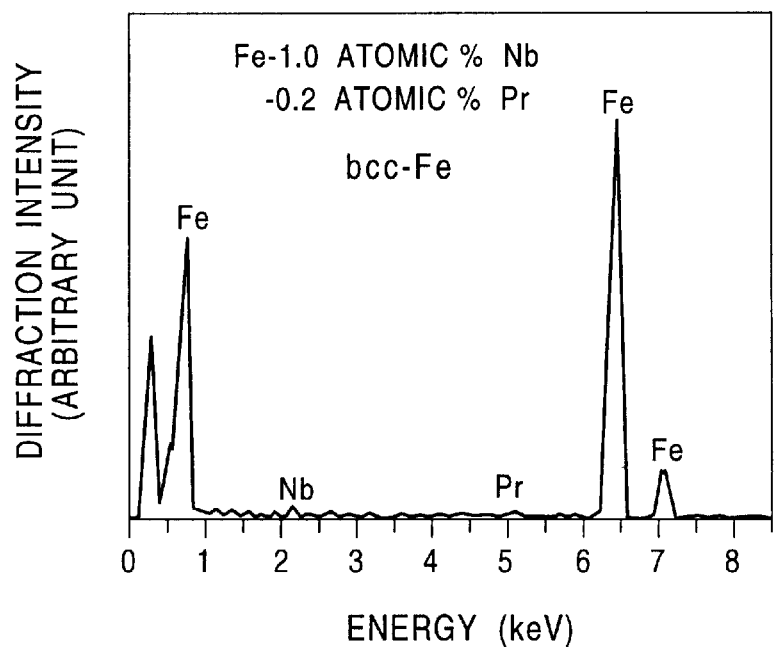
FIG. 49 shows the result of a composition analysis of the crystalline phase 3 in FIG. 41 by the energy-dispersive X-ray diffraction method.

FIG. 49 clearly shows that the crystalline phase 3 comprises, like the crystalline phase 4, fine crystals of bcc-Fe phase.

Atomic arrangement configurations at near the cites with the numerals 1, 2, and 3 in FIG. 42 were analyzed by electron diffraction. The results are shown in FIG. 44 to FIG. 47.

Figure 50:
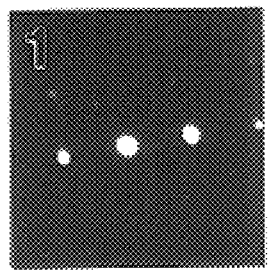
FIG. 50 shows the results of electron diffraction of the crystalline phase 1 in FIG. 42.
Figure 51:
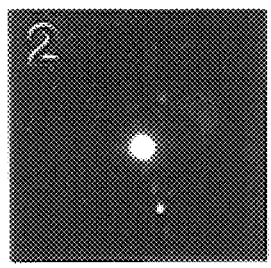
FIG. 51 shows the results of electron diffraction of the crystalline phase 2 in FIG. 42.
Figure 52:
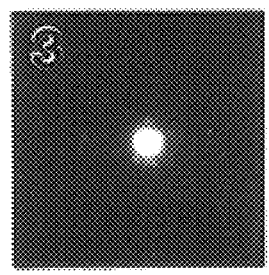
FIG. 52 shows the results of electron diffraction of the amorphous phase 3 in FIG. 42.

The distribution configurations of the electron diffraction spots in FIG. 50 to FIG. 52 evidently shows that the cites near the numerals 1 and 2 are in crystalline phases and the cite near the numeral 3 is in an amorphous phase.

The compositions of the crystalline phase 1 and crystalline phase 2 were analyzed by energy-dispersive X-ray diffraction method (EDS: Energy Dispersive Spectrometry). The results are shown in FIG. 53 and FIG. 54.

Figure 53:
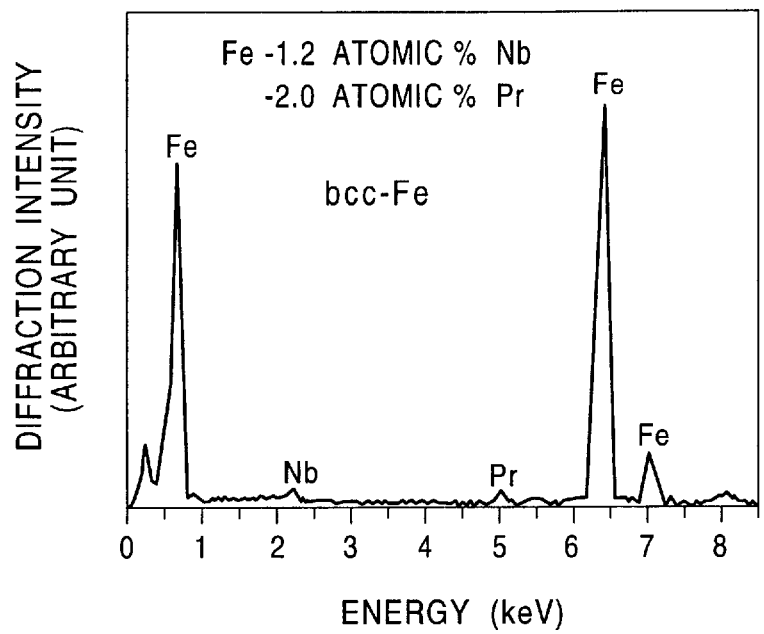
FIG. 53 shows the result of a composition analysis of the crystalline phase 1 in FIG. 42 by the energy-dispersive X-ray diffraction method.

It is clear from FIG. 53 that the crystalline phase 1 comprises fine crystals of the bcc-Fe phase.

Figure 54:
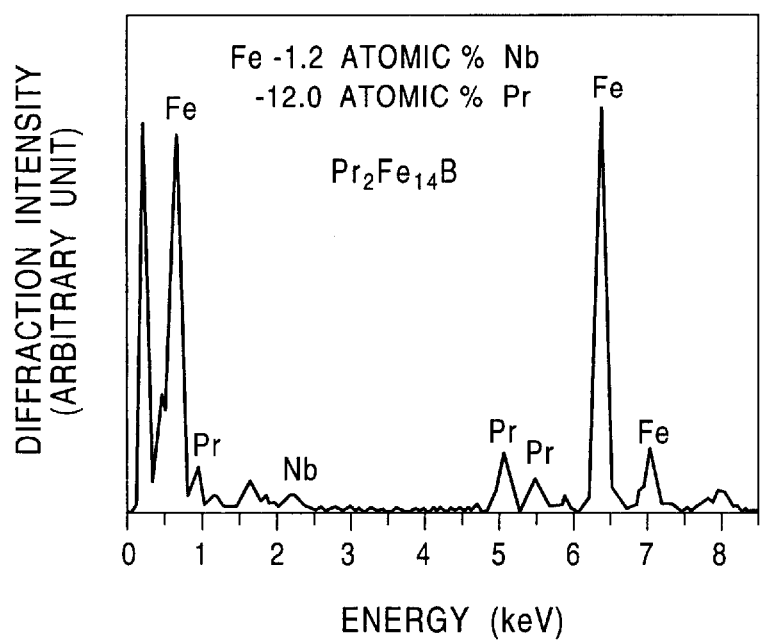
FIG. 54 shows the result of a composition analysis of the crystalline phase 2 in FIG. 42 by the energy-dispersive X-ray diffraction method.

As is evident from FIG. 54, the crystalline phase 2 comprises fine crystals of the $Pr_2Fe_{14}B$ phase.

Atomic arrangement configurations at near the cites with the numerals 1, 2, and 3 in FIG. 43 were analyzed by electron diffraction. The results are shown in FIG. 55 to FIG. 57.

Figure 55:
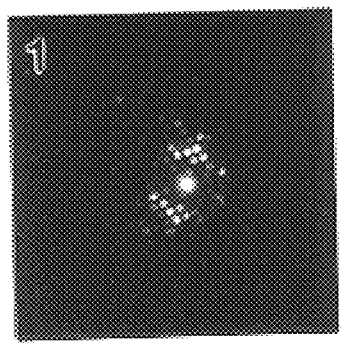
FIG. 55 shows the result of electron diffraction of the crystalline phase 1 in FIG. 43.
Figure 56:
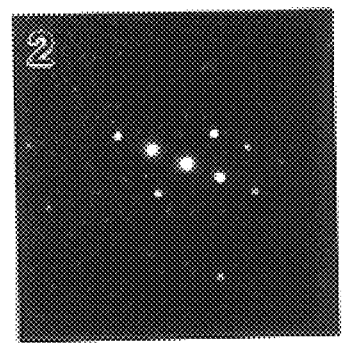
FIG. 56 shows the result of electron diffraction of the crystalline phase 2 in FIG. 43.
Figure 57:
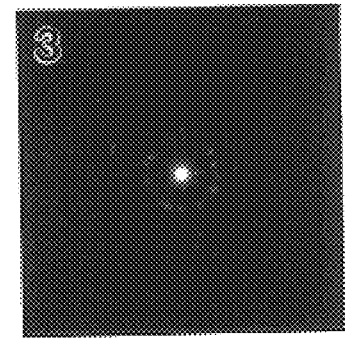
FIG. 57 shows the result of electron diffraction of the amorphous phase 3 in FIG. 43.

The distribution configurations of the electron diffraction spots in FIG. 55 to FIG. 57 evidently shows that the cites near the numerals 1 and 2 are in crystalline phases and the cite near the numeral 3 is in an amorphous phase.

The compositions of the crystalline phases 1 and 2, and amorphous phase 3 were analyzed by energy-dispersive X-ray diffraction method (EDS: Energy Dispersive Spectrometry). The results are shown in TABLE 5.

TABLE 5

| Analysis site | Fe (Atomic %) | Pr (Atomic %) | Nb (Atomic %) |
|---|---|---|---|
| Crystalline phase 1 | 88.1 | 11.8 | 0.0 |
| Crystalline phase 2 | 98.4 | 1.6 | 0.0 |
| Amorphous phase 3 | 78.1 | 4.5 | 17.4 |

TABLE 5 shows that the crystalline phase 1 comprises a $Pr_2Fe_{14}B$ phase as a hard magnetic phase while the crystalline phase 2 comprises fine crystals of a bcc-Fe phase as a soft magnetic phase.

A comparison of the crystalline phase 1 and 2 with the amorphous phase 3 shows that Nb is concentrated at the amorphous phase.

As hitherto described, the composite hard magnetic material according to the present invention contains a phase formed by consolidating the first alloy powder comprising an amorphous phase as a principal phase and the second alloy powder comprising an amorphous phase as a principal phase. The phase formed by consolidating the first alloy powder comprising an amorphous phase as a principal phase is composed of an amorphous nano-composite SmCo hard magnetic alloy powder the magnetic characteristics of which are determined by exchange coupling between at least the $(Fe, CO)_{17}Sm_2$ phase as a hard magnetic phase, and at least $(Fe, CO)_{20}Sm_3B$ phase, bcc-(Fe, Co) phase or a balance of amorphous phases as a soft magnetic phase; and the phase formed by consolidating the second alloy powder comprising an amorphous phase as a principal phase is composed of a nano-composite Fe—M—B hard magnetic alloy powder the magnetic characteristics of which are determined by exchange coupling between at least a $R_2Fe_{14}B$ phase as a hard magnetic phase, and at least a bcc-(Fe, Co) phase as a soft magnetic phase or a balance of amorphous phases as a soft magnetic phase.

Examples 7 and 8

A bulk sample (Example 7) was produced by the same method as in Example 5 using a composite powder prepared by mixing the first alloy powder comprising an amorphous phase as a principal phase with a composition of $Sm_{12}(Co_{60}Fe_{23})_{79}Nb_2B_7$ and the second alloy powder comprising an amorphous phase as a principal phase with a composition of $Fe_{73}Co_{15}Nb_2Nd_5B_5$ in 1:1 in weight ratio. Likewise, a bulk sample (Example 8) was produced using a composite powder prepared by mixing the first alloy powder comprising an amorphous phase as a principal phase with a composition of $Sm_{12}(Co_{60}Fe_{23})_{79}Nb_2B_7$ and the second alloy powders comprising an amorphous phase as a principal phase with a composition of $Fe_{73}Co_{15}Nb_2Nd_5B_5$ in 2:8 in weight ratio. A ribbon with a composition of $Fe_{73}Co_{15}Nb_2Nd_5B_5$ was also prepared as a comparative example.

The changes of coercive force within the external temperature range of 27° C. (300 K) to 177° C. (450 K) in the bulk samples in Examples 7 and 8, and in the ribbon with a composition of $Fe_{73}Co_{15}Nb_2Nd_5B_5$ were measured with VSM (by applying an external magnetic field of 1.5 T). The results are shown in FIG. 58.

Figure 58:
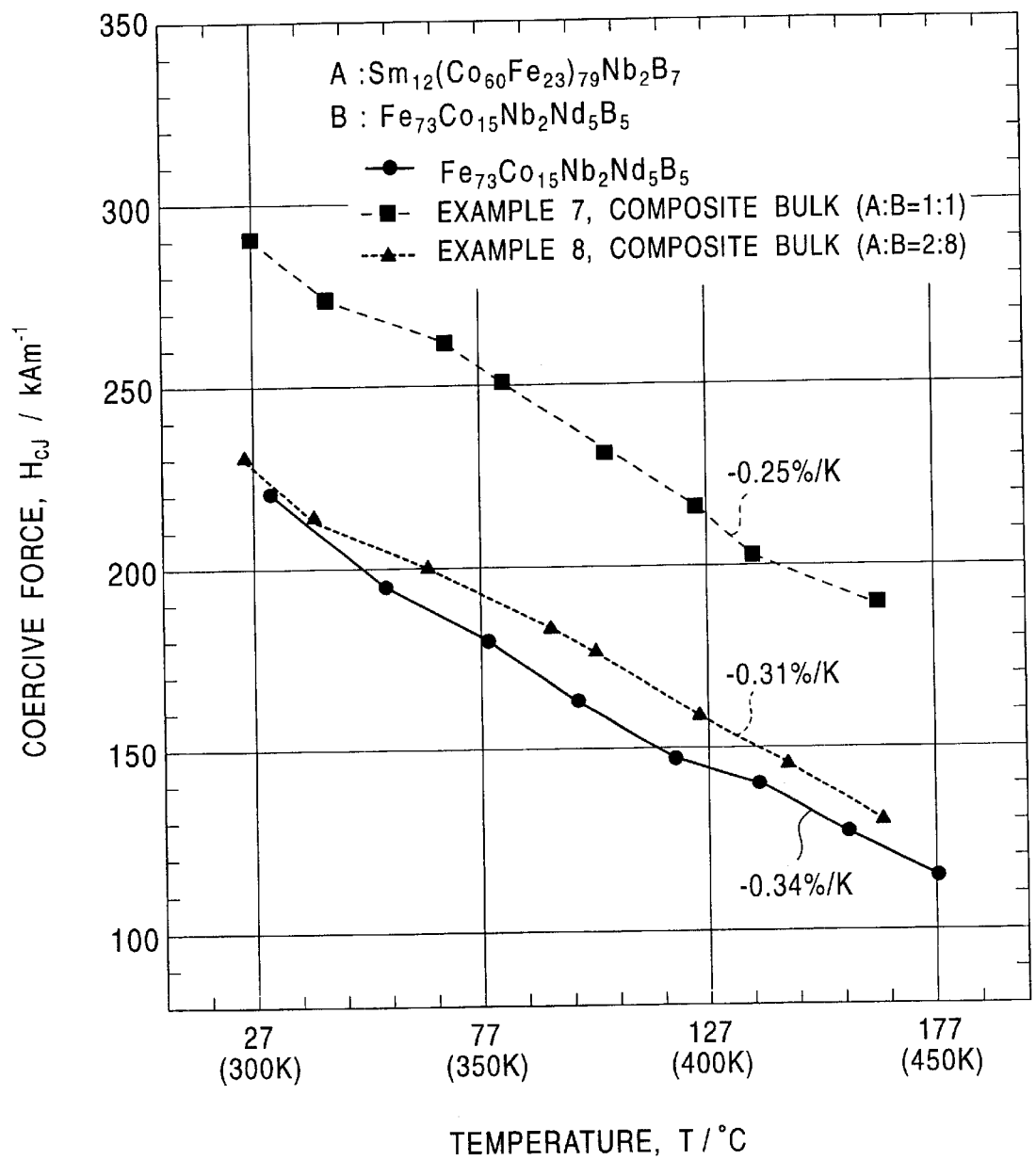
FIG. 58 shows temperature dependency of coercive force of the composite hard magnetic material.

FIG. 58 clearly shows that the decreasing rate of coercive force against temperature changes is lower in the sample in Example 8 than in the ribbon with a composition of $Fe_{73}Co_{15}Nb_2Nd_5B_5$ in which the first powder comprising an amorphous phase as a principal phase is not added at all. Also, when the bulk samples in Example 7 and in Example 8 having different mixing ratios between the first alloy powder comprising an amorphous phase as a principal phase with a composition of $Sm_{12}(Co_{60}Fe_{23})_{79}Nb_2B_7$ and the second alloy powder comprising an amorphous phase as a principal phase with a composition of $Fe_{73}Co_{15}Nb_2Nd_5B_5$ are compared with each other, the decreasing rate of coercive force against temperature changes is lower in the bulk sample in Example 7 that has a higher mixing ratio of the first alloy powder comprising an amorphous phase as a principal phase than in the bulk sample in Example 8 that has a lower mixing ratio of the first alloy powder comprising an amorphous phase as a principal phase. Accordingly, enhancing the mixing ratio of the first alloy powder having the amorphous phase as a main phase allows the absolute value of the rate of temperature change to be smaller, allowing to produce a magnet with excellent heat resistance.

As hitherto described in detail, the composite hard magnetic material according to the present invention was produced by consolidating a composite powder prepared by mixing an alloy powder comprising an amorphous phase as a principal phase and containing at least Co and Sm, and an alloy powder comprising an amorphous phase as a principal phase and containing at least Fe and/or Co, rare earth elements R and B; or by consolidating a mixture of a hard magnetic powder containing a main component Co and at least Sm and comprising a fine crystalline phase as a principal phase with a mean crystal grain size of 100 nm or less, a hard magnetic powder comprising a fine crystalline phase as a principal phase with a mean crystal grain size of 100 nm or less and containing at least Fe and/or Co, rare earth elements R and B. Accordingly, the hard magnetic material is useful for permanent magnets to be used for a sensor such as a throttle position sensor (an angle sensor) being excellent in magnetization characteristics as well as temperature characteristics that can be used at high temperatures.

Excellent temperature characteristics that can not be attained by using merely an alloy powder comprising an amorphous phase as a principal phase and containing Fe and/or Co, rare earth element R and B, or a hard magnetic powder comprising a fine crystalline phase as a principal phase, containing at least Fe and/or Co, rare earth elements R and B, and having a mean crystal grain size of 100 or less, could be obtained in the composite hard magnetic material according to the present invention, because an alloy powder comprising an amorphous phase as a principal phase and containing at least Co and Sm is added into an alloy powder comprising an amorphous phase as a principal phase and containing at least Fe and/or Co, rare earth elements R and B; or a hard magnetic powder comprising a fine crystalline phase with a mean crystal grain size of 100 nm or less and containing Co and at least Sm is added into a hard magnetic powder comprising a crystalline phase as a principal phase with a mean crystal grain size of 100 nm or less and containing at least Fe and/or Co, rare earth elements R and B. The amount of use of expensive rare earth elements and Co can be also saved in the composite hard magnetic material according to the present invention as compared with the hard magnetic material composed of merely an alloy powder having an amorphous phase containing at least expensive rare earth elements as well as Co and Sm, or the hard magnetic powder comprising a fine crystalline phase as a principal phase with a mean grain size of 100 nm or less and containing a main component Co and at least Sm.

The present invention also provide a high density bulk material comprising a composite hard magnetic material by consolidating the composite powder by taking advantage of softening phenomenon occurred when the amorphous phase in the alloy powder comprising an amorphous phase as a principal phase is crystallized.

The bulk material or consolidated body comprising the composite hard magnetic material according to the present invention can be consolidated into various shapes starting from the powder.

The present invention also provides a composite hard magnetic material with good magnetic characteristics as a constructing material of an angle sensor by magnetizing the composite powder along the direction parallel to the consolidation pressure impressing direction.

The composite hard magnetic material according to the present invention has a rate of temperature change of magnetization of $-0.04\%/°$ C. at a permeance coefficient of 1 to 10 in the temperature range from room temperature to 120° C., enabling to prevent output drift caused by the temperature change thereby improving sensing accuracy when the composite hard magnetic material is used for the constituting material of the angle sensor. In other words, when the composite hard magnetic material according to the present invention is used for the constituting material of a magnetic sensor such as a throttle position sensor to be used under an environment with temperature changes, the magnet constituted from the composite hard magnetic material according to the present invention show no temperature characteristic changes even when operation temperatures have changed to diminish sensing error in sensing output voltages, thereby enabling to provide a magnetic sensor with high sensing accuracy.

An alloy powder comprising an amorphous phase as a principal phase and containing at least Co and Sm in the composite powder, and an alloy powder comprising an amorphous phase as a principal phase and containing Fe and/or Co as well as at least rare earth elements R and B are mixed in a weight ratio of 5:95 to 80:20 in the composite hard magnetic material according to the present invention, providing a magnet provided with good magnetic characteristics as well as excellent magnetization and temperature characteristics, thereby the hard magnetic material being suitable for permanent magnets used for various kinds of sensors such as a throttle position sensor (an angle sensor) that is used under an environment with temperature changes or an EGR sensor equipped in an EGR valve.

The present invention also provides a composite hard magnetic material in which an alloy powder comprising an amorphous phase as a principal phase and containing at least Co and Sm, and an alloy powder comprising an amorphous phase containing Fe and/or Co as well as at least rare earth elements R and B in a weight ratio of 1:1, providing excellent magnetization and temperature characteristics as well as good hard magnetic characteristics even when the amount of use of expensive rare earth elements and Co are saved, thereby providing a magnet to be used for magnetic sensors that are used under an environment with temperature changes.

The composite hard magnetic material with forgoing favorable characteristics can be produced by the method for producing the composite hard magnetic material according to the present invention. When the hard magnetic material is magnetized along the direction parallel to the consolidation pressure impressing direction during or after consolidating the powder or the powder and a resin, a composite hard magnetic material magnetized along the direction parallel to the consolidation pressure impressing direction can be favorably obtained.

What is claimed is:

1. A composite hard magnetic material comprising:

a body-centered cubic (bcc) structure selected from the group consisting of a Fe phase of the bcc structure, a FeCo phase of the bcc structure, and combinations thereof a $R_2Fe_{14}B$ phase (wherein R represents one or more elements among rare earth elements), a SmCo phase, and an amorphous phase, at least one crystalline phase comprising a fine crystalline phase, a combination of all fine crystalline phases being at least 50% by volume and each fine crystalline phase having a mean crystal grain size of at most 100 nm;

said composite hard magnetic material formed by consolidating a composite powder, said composite powder containing a first alloy powder comprising at least 50% by weight of an amorphous phase as a principal phase and containing at least Co and Sm, and a second alloy powder comprising at least 50% by weight of an amorphous phase as a principal phase and containing at least one of Fe and Co, and rare earth elements R and B;

said first alloy powder being represented by the following formula:

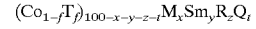
$(Co_{1-f}T_f)_{100-x-y-z-t}M_xSm_yR_zQ_t$ (wherein T is selected from the group consisting of Fe, Ni, and combinations thereof, M is selected from the group consisting of Nb, Zr, Ta, Hf, and combinations thereof;

R is selected from the group consisting of Sc, Y, La, Ce, Pr, Nd, Pm, Eu, Gd, Tb, Dy, Ho, Er, Tm, Yb, Lu, and combinations thereof: and Q is selected from the group consisting of P, C, Si, B, and combinations thereof, f being represented by $0 \leq f \leq 0.5$, x being represented by $0 \leq x \leq 4$, y being represented by $8 \leq y \leq 16$, z being represented by $0 \leq z \leq 5$, t being represented by $0.5 \leq t \leq 10$ and x+y+z being represented by $8 \leq x+y+z \leq 16$ in at %, respectively); and said second alloy powder being represented by the following formula:

$T_gM_hR_jB_k$ (wherein T is selected from the group consisting of Fe, Fe—Co, Fe—Ni, Fe—Co—Ni, Co, and Co—Ni;

M is selected from the group consisting of Zr, Nb, Ta, Hf, Ti, V, Mo, W. and combinations thereof;

R represents one or more elements among rare earth elements; and

B represents boron;

g, h, j and k indicating composition ratios are in the range of $50 \leq g$, $0 \leq h \leq 15$, $3 \leq j \leq 20$ and $2 \leq k \leq 20$, respectively); and said first alloy powder and said second alloy powder being mixed in a proportion of 5:95 to 80:20 in the composite powder.

2. A composite hard magnetic material according to claim 1 having remanent magnetization (Ir) of 0.6 T or more, the ratio between saturation magnetization ($I_S$) and remanent magnetization (Ir) of 0.6 or more and coercive force of 2 to 9 kOe.

3. A composite hard magnetic material according to claim 1, wherein f representing the composition ratio in the powder is in the range of $0.2 \leq f < 0.5$ in at %.

4. A composite hard magnetic material according to claim 1 containing Nb.

5. A composite hard magnetic material according to claim 1, wherein g, h, j and k representing composition ratios in the composition formula of the powder are in the range of $80 \leq g \leq 93$, $0.5 \leq h \leq 5$, $3 \leq j \leq 10$ and $3 \leq k \leq 7$ in at %, respectively.

6. A composite hard magnetic material according to claim 1, wherein g, h, j and k representing composition ratios in the composition formula of the powder are in the range of $86 \leq g \leq 93$, $0.5 \leq h \leq 3$, $3 \leq j \leq 7$ and $3 \leq k \leq 5$ in at %, respectively.

7. A composite hard magnetic material according to claim 1, wherein the rate of temperature change of magnetization at permeance coefficient of 1 to 10 is −0.04%/° C. or less in the temperature range from room temperature through 120° C.

8. A composite hard magnetic material according to claim 7, wherein the alloy powder comprising an amorphous phase as a principal phase and containing at least Co and Sm, and the alloy powder comprising an amorphous phase as a principal phase and containing at least Fe and/or Co, and rare earth elements R and B are mixed in a proportion of 1:1 in the composite powder.

9. A composite hard magnetic material comprising:

a body-centered cubic (bcc) structure selected from the group consisting of a Fe phase of the bcc structure, a FeCo phase of the bcc structure, and combinations thereof, a $R_2Fe_{14}B$ phase (wherein R represents one or more elements among rare earth elements), a SmCo phase, and an amorphous phase, at least one crystalline phase comprising a fine crystalline phase, a combination of all fine crystalline phases being at least 50% by volume, each crystalline phase having a mean crystal grain size of at most 100 nm;

said composite hard magnetic material formed by consolidating a composite powder, said composite powder containing a first alloy powder comprising at least 50% by weight of an amorphous phase as a principal phase and containing at least Co and Sm, and a second alloy powder comprising at least 50% by weight of an amorphous phase as a principal phase and containing at least one of Fe and Co, and rare earth elements R and B;

said first alloy powder being represented by the following formula:

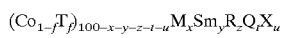

(wherein T is selected from the group consisting of Fe, Ni, and combinations thereof;

M is selected from the group consisting of Nb, Zr, Ta, Hf, and combinations thereof;

R is selected from the group consisting of Sc, Y, La, Ce, Pr, Nd, Pm, Eu, Gd, Tb, Dy. Ho, Er, Tm, Yb, Lu, and combinations thereof;

Q is selected from the group consisting of P, C, Si, B, and combinations thereof; and X is selected from the group consisting of Al, Ge, Ga, Ag, Pt, Au, and combinations thereof;

f being in the range of $0 \leq f \leq 0.5$, x being in the range of $0 \leq x \leq 4$, y being in the range of $8 \leq y \leq 16$, z being in the range of $0 \leq z \leq 5$, t being in the range of $0.5 \leq t \leq 10$; u being in the range of $0 \leq u \leq 5$, and x+y+z being in the range of $8 \leq x+y+z \leq 16$ in at %, respectively); and said second alloy powder being represented by the following formula:

(wherein T is selected from the group consisting of Fe, Fe—Co, Fe—Ni, Fe—Co—Ni, Co, and Co—Ni;

M is selected from the group consisting of Zr, Nb, Ta, Hf, Ti, V, Mo, W, and combinations thereof;

R represents one or more elements among rare earth elements;

B represents boron; and

E is selected from the group consisting of Cr, Al, Pt, Ru, Rh, Pd, Os, Ir, Cu, Ag, Au, Sco Zn, Sn, Re, Mn, and combinations thereof, g, h, j, k and m indicating composition ratios are in the range of $50 \leq g$, $0 \leq h \leq 15$, $3 \leq j \leq 20$, $2 \leq k \leq 20$ and $0 \leq m \leq 10$, respectively); and said first alloy powder and said second alloy powder being mixed in a proportion of 5:95 to 80:20 in the composite powder.

10. A composite hard magnetic material according to claim 9, wherein f representing the composition ratio of the powder is in the range of $0.2 \leq f \leq 0.5$.

11. A composite hard magnetic material according to claim 9 containing Nb.

12. A composite hard magnetic material according to claim 9, wherein g, h, j, k and m representing the composition ratios in the composition formula in the powder are in the range of $80 \leq g \leq 93$, $0.5 \leq h$ 5, $3 \leq j \leq 10$, $3 \leq k \leq 7$ and $m \leq 5$ in at %, respectively.

13. A composite hard magnetic material according to claim 9, wherein g, h, j, k and m representing the composition ratios in the composition formula in the powder are in the range of $86 \leq g \leq 93$, $0.5 \leq h \leq 3, 3 \leq j \leq 7$, $3 \leq k \leq 5$ and $1 \leq m \leq 5$, in at %, respectively.

14. A composite hard magnetic material comprising:

a body-centered cubic (bcc) structure selected from the group consisting of a Fe phase of the bcc structure, a FeCo phase of the bcc structure, and combinations thereof, a $R_2Fe_{14}B$ phase (R represents one or more elements among rare earth elements), a SmCo phase, and an amorphous phase, at least one crystalline phase comprising a fine crystalline phase, a combination of all fine crystalline phases being at least 50% by volume, each fine crystalline phase having a mean crystal grain size of at most 100 nm;

said composite hard magnetic material formed by consolidating a composite powder, wherein said composite powder contains a first alloy powder comprising at least 50% by weight of an amorphous phase as a principal phase containing at least Co and Sm, and a second alloy powder comprising at least 50% by weight of an amorphous phase as a principal phase containing at least one of Fe and Co, and rare earth elements R and B;

said first alloy powder being represented by the following formula:

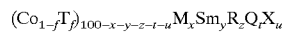

(wherein T is selected from the group consisting of Fe, Ni, and combinations thereof;

M is selected from the group consisting of Nb, Zr, Ta, Ht, and combinations thereof;

R is selected from the group consisting of Sc, Y, La, Ce, Pr, Nd, Pm, Eu, Gd, Tb, Dy, Ho, Er, Tm, Yb, Lu, and combinations thereof;

Q is selected from the group consisting of P, C, Si, B, and combinations thereof; and X is selected from the group consisting of Al, Ge, Ga, Ag, Pt, Au, and combinations thereof;

f being in the range of 0≦f≦0.5, x being in the range of 0≦x≦4, y being in the range of 8≦y≦16, z being in the range of 0≦z≦5, t being in the range of 0.5≦t≦10, u being In the range of 0≦u≦5; and x+y+z being in the range of 8≦x+y+z≦16 in at %, respectively); and said second alloy powder being represented by the following formula:

$T_g M_h R_j B_k G_n$ (wherein T is selected from the group consisting of Fe, Fe—Co, Fe—Ni, Fe—Co—Ni, Co, and Co—Ni;

M is selected from the group consisting of Zr, Nb, Ta, Hf, Ti, V, Mo, W, and combinations thereof;

R represents one or more elements among rare earth elements;

B represents boron; and

G is selected from the group consisting of C, Ga, Ge, P, Sb, In, B, As, and combinations thereof;

g, h, j, k and n indicating composition ratios are in the range of 50≦g, 0≦h≦15, 3≦is 20, 2≦k≦20 and 0≦n≦10, respectively); and said first alloy powder and said second alloy powder being mixed in a proportion of 5:95 to 80:20 in the composite powder.

15. A composite hard magnetic material according to claim 14, wherein f indicating the composition ratio of the powder is in the range of 0.2≦f≦0.5.

16. A composite hard magnetic material according to claim 14, containing Nb.

17. A composite hard magnetic material according to claim 14, wherein g, h, J, k and n indicating the composition ratios in the composition formula are in the range of 80≦g≦93, 0.5≦h≦5, 3≦j≦10, 3≦k≦7 and n≦5 in at %, respectively.

18. A composite hard magnetic material according to claim 14, wherein g, h, J, k and n indicating the composition ratios in the composition formula are in the range of 86≦g≦93, 0.5≦h≦3, 3≦j≦7, 3≦k 5 and 0.1≦n≦5 in at %, respectively.

19. A composite hard magnetic material comprising:

a body-centered cubic (bcc) structure selected from the group consisting of a Fe phase of the bcc structure, a FeCo phase of the bcc structure, and combinations thereof; a $R_2Fe_{14}B$ phase (wherein R represents one or more elements among rare earth elements), a SmCo phase, and an amorphous phase, at least one crystalline phase comprising a fine crystalline phase, a combination of all fine crystalline phases being at least 50% by volume, each fine crystalline phase having a mean crystal grain size of at most 100 nm;

said composite hard magnetic material formed by consolidating a composite powder, said composite powder containing a first alloy powder comprising at least 50% by weight of an amorphous phase as a principal phase and containing at least Co and Sm, and a second alloy powder comprising at least 50% by weight of an amorphous phase as a principal phase and containing at least one of Fe and Co, and rare earth elements R and B;

said first alloy powder being represented by the following formula:

$(Co_{1-f}T_f)_{100-x-y-z-t-u} M_x Sm_y R_z Q_t X_u$ (wherein T is selected from the group consisting of Fe, Ni, and combinations thereof;

M is selected from the group consisting of Nb, Zr, Ta, Hf, and combinations thereof;

R is selected from the group consisting of Sc, Y, La, Ce, Pr, Nd, Pm, Eu, Gd, Tb, By, Ho, Er, Tm, Yb, Lu, and combinations thereof;

Q is selected from the group consisting of P, C, Si, B, and combinations thereof, and X is selected from the group consisting of Al, Ge, Ga, Ag, Pt, Au, and combinations thereof;

f being in the range of 0≦f≦0.5, x being in the range of 0≦x≦4, y being in the range of 8≦y≦16, z being in the range of 0≦z≦5, t being in the range of 0.5≦t≦10; u being in the range of 0≦u≦5; and x+y+z being in the range of 8x+y+z≦16 in at %, respectively), and said second alloy powder being represented by the following formula:

$T_g M_h R_j B_k E_m G_n$ (wherein T is selected from the group consisting of Fe, Fe—Co, Fe—Ni, Fe—Co—Ni, Co, and Co—Ni;

M is selected from the group consisting of Zr, Nb, Ta, Hf, Ti, V, Mo, W, and combinations thereof;

R represents one or more elements among rare earth elements;

B represents boron;

E is selected from the group consisting of Cr, Al, Pt, Ru, Rh, Pd, Os, Ir, Cu, Ag, Au, Sc, Zn, Sn, Re, Mg, and combinations thereof; and G is selected from the group consisting of C, Ga, Ge, P, Sb, In, B, As, and combinations thereof;

g, h, j, k, m and n indicating composition ratios are in the range of 50≦g, 0≦h≦15, 3≦j≦20, 2≦k≦20 and 0≦m≦10 and 0≦n≦10, respectively); and said first alloy powder and said second alloy powder being mixed in a proportion of 5:95 to 80:20 in the composite powder.

20. A composite hard magnetic material according to claim 19, wherein f indicating the composition ratio of the powder is in the range of 0.2≦f≦0.5.

21. A composite hard magnetic material according to claim 19, containing Nb.

22. A composite hard magnetic material according to claim 19, wherein g, h, j, k, m and n indicating the composition ratios in the composition formula are in the range of 80≦g≦93, 0.5≦h≦5, 3≦j≦10, 3≦k≦7, m≦5 and n≦5 in at %, respectively.

23. A composite hard magnetic material according to claim 19, wherein g, h, J, k, m and n indicating the composition ratios in the composition formula are in the range of 86≦g≦93, 0.5≦h≦3, 3≦j≦7, 3≦k≦5, 0.1≦m≦5 and 0.1 5n≦5 in at %, respectively.

24. A composite hard magnetic material according to claim 1, consisting essentially of the body-centered cubic (bcc) structure, the $R_2Fe_{14}B$ phase, the SmCo phase, and the amorphous phase.

25. A composite hard magnetic material according to claim 1, consisting of the body-centered cubic (bcc) structure, the $R_2Fe_{14}B$ phase, the SmCo phase, and the amorphous phase.

26. A composite hard magnetic material according to claim 9, consisting essentially of the body-centered cubic (bcc) structure selected from the group consisting of the Fe phase of the bcc structure, the FeCo phase of the bcc structure, and combinations thereof, the $R_2Fe_{14}B$ phase, the SmCo phase, and the amorphous phase.

27. A composite hard magnetic material according to claim 9, consisting of the body centered cubic (bcc) structure selected from the group consisting of the Fe phase of the bcc structure, the FeCo phase of the bcc structure, and combinations thereof, the $R_2Fe_{14}B$ phase, the SmCo phase, and the amorphous phase.

28. A composite hard magnetic material according to claim 14, consisting essentially of the body-centered cubic (bcc) structure selected from the group consisting of the Fe phase of the bcc structure, the FeCo phase of the bcc structure, and combinations thereof, the $R_2Fe_{14}B$ phase, the SmCo phase, and the amorphous phase.

29. A composite hard magnetic material according to claim 14, consisting of the body-centered cubic (bcc) structure selected from the group consisting of the Fe phase of the bcc structure, the FeCo phase of the bcc structure, and combinations thereof, the $R_2Fe_{14}B$ phase, the SmCo phase, and the amorphous phase.

30. A composite hard magnetic material according to claim 19, consisting essentially of the body-centered cubic (bcc) structure selected from the group consisting of the Fe phase of the bcc structure, the FeCo phase of the bcc structure, and combinations thereof, the $R_2Fe_{14}B$ phase, the SmCo phase, and the amorphous phase.

31. A composite hard magnetic material according to claim 19, consisting of the body-centered cubic (bcc) structure selected from the group consisting of the Fe phase of the bcc structure, the FeCo phase of the bcc structure, and combinations thereof, the $R_2Fe_{14}B$ phase, the SmCo phase, and the amorphous phase.

* * * * *

UNITED STATES PATENT AND TRADEMARK OFFICE
CERTIFICATE OF CORRECTION

PATENT NO. : 6,425,961 B1
DATED : July 30, 2002
INVENTOR(S) : Akinori Kojima et al.

It is certified that error appears in the above-identified patent and that said Letters Patent is hereby corrected as shown below:

Column 40,
Line 5, immediately after "thereof" insert -- , -- (comma).
Line 26, immediately after "thereof" delete "," (comma) and substitute -- ; -- (semicolon) in its place.
Line 31, immediately after "combinations thereof" delete ":" (colon) and substitute -- ; -- (semicolon) in its place.
Line 47, delete "W. and" and substitute -- W, and -- in its place.

Column 42,
Line 9, after "Au," delete "Sco" and substitute -- Sc, -- in its place.
Line 30, delete "$0.5 \leqq h \leqq 3, 3 \leqq j \leqq 7$," and substitute -- $0.5 \leqq h \leqq 3, 3 \leqq j \leqq 7$, -- in its place.

Column 43,
Line 39, delete "$3 \leqq k\ 5$" and substitute -- $3 \leqq k \leqq 5$ -- in its place.

Column 44,
Line 50, delete "J, k," and substitute -- j, k, -- in its place.
Line 52, delete "$0.1\ 5n \leqq 5$" and substitute -- $0.1 \leqq n \leqq 5$ -- in its place.

Signed and Sealed this

Sixth Day of July, 2004

JON W. DUDAS
*Acting Director of the United States Patent and Trademark Office*